(12) United States Patent
Bor-Yaliniz et al.

(10) Patent No.: US 10,892,958 B2
(45) Date of Patent: Jan. 12, 2021

(54) METHODS AND FUNCTIONS OF NETWORK PERFORMANCE MONITORING AND SERVICE ASSURANCE

(71) Applicant: HUAWEI TECHNOLOGIES CO., LTD., Shenzhen (CN)

(72) Inventors: Remziye Irem Bor-Yaliniz, Ottawa (CA); Hang Zhang, Nepean (CA); Chengchao Liang, Ottawa (CA); Nimal Gamini Senarath, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/526,170

(22) Filed: Jul. 30, 2019

(65) Prior Publication Data
US 2020/0044943 A1 Feb. 6, 2020

Related U.S. Application Data

(60) Provisional application No. 62/714,438, filed on Aug. 3, 2018.

(51) Int. Cl.
G06F 15/173 (2006.01)
H04L 12/24 (2006.01)

(52) U.S. Cl.
CPC .......... *H04L 41/5009* (2013.01); *H04L 41/18* (2013.01); *H04L 41/5067* (2013.01)

(58) Field of Classification Search
USPC ....... 709/203, 206, 217, 219, 223, 224, 226, 709/228, 230, 232, 238; 707/722;
(Continued)

(56) References Cited

U.S. PATENT DOCUMENTS 7,565,610 B2 * 7/2009 Li ........................... H04L 41/22
709/223
2005/0223091 A1 * 10/2005 Zahavi ................ H04L 41/0631
709/224
(Continued)

FOREIGN PATENT DOCUMENTS

CN 108028780 A 5/2018
WO 2018128894 A1 7/2018

OTHER PUBLICATIONS

3GPP TR 28.801 V15.1.0 (Jan. 2018), 3rd Generation Partnership Project; Technical Specification Group Services and System Aspects; Telecommunication management;Study on management and orchestration of network slicing for next generation network (Release 15), 75 pages.

*Primary Examiner* — Quang N Nguyen

(57) ABSTRACT

A communication service manager (CSM) apparatus for monitoring a communication network is provided. The CSM receives configuration instruction message from a higher-level device, and creates or modifies a set of tasks based on the configuration instruction message. The CSM is thus configured to interact with data provider devices to obtain specific information, process the information, and report the results of the processing operations toward a specified device or database. The data provider devices monitor network operations and may include network functions and data analytics manager (DAM) functions. A format for configuration instruction messages, for configuring the CSM, is also provided.

20 Claims, 45 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2005/0223092 A1* | 10/2005 | Sapiro | H04L 41/0681 709/224 |
| 2005/0223264 A1* | 10/2005 | Arden | H04L 41/22 714/4.1 |
| 2006/0023642 A1* | 2/2006 | Roskowski | H04L 43/12 370/254 |
| 2016/0103887 A1* | 4/2016 | Fletcher | H04L 41/22 707/722 |
| 2016/0352924 A1 | 12/2016 | Senarath et al. | |
| 2017/0078157 A1 | 3/2017 | Zhang | |
| 2017/0083585 A1* | 3/2017 | Chen | G06F 11/323 |
| 2018/0132138 A1 | 5/2018 | Senarath et al. | |

* cited by examiner (cont'd in FIG. 7B)

| F1 | F2 | F3 | F4 | F5 | F6 | | | | | |
|---|---|---|---|---|---|---|---|---|---|---|
| | | | | | F6-1 | F6-2 | F6-3 | F6-4 | F6-5 | F6-6 |
| 1100 | 1105 | 1110 | 1115 | 1120 | 1125 | | | | | |
| | | | | | 1130 | 1135 | 1140 | 1145 | 1150 | 1155 |

FIG. 11

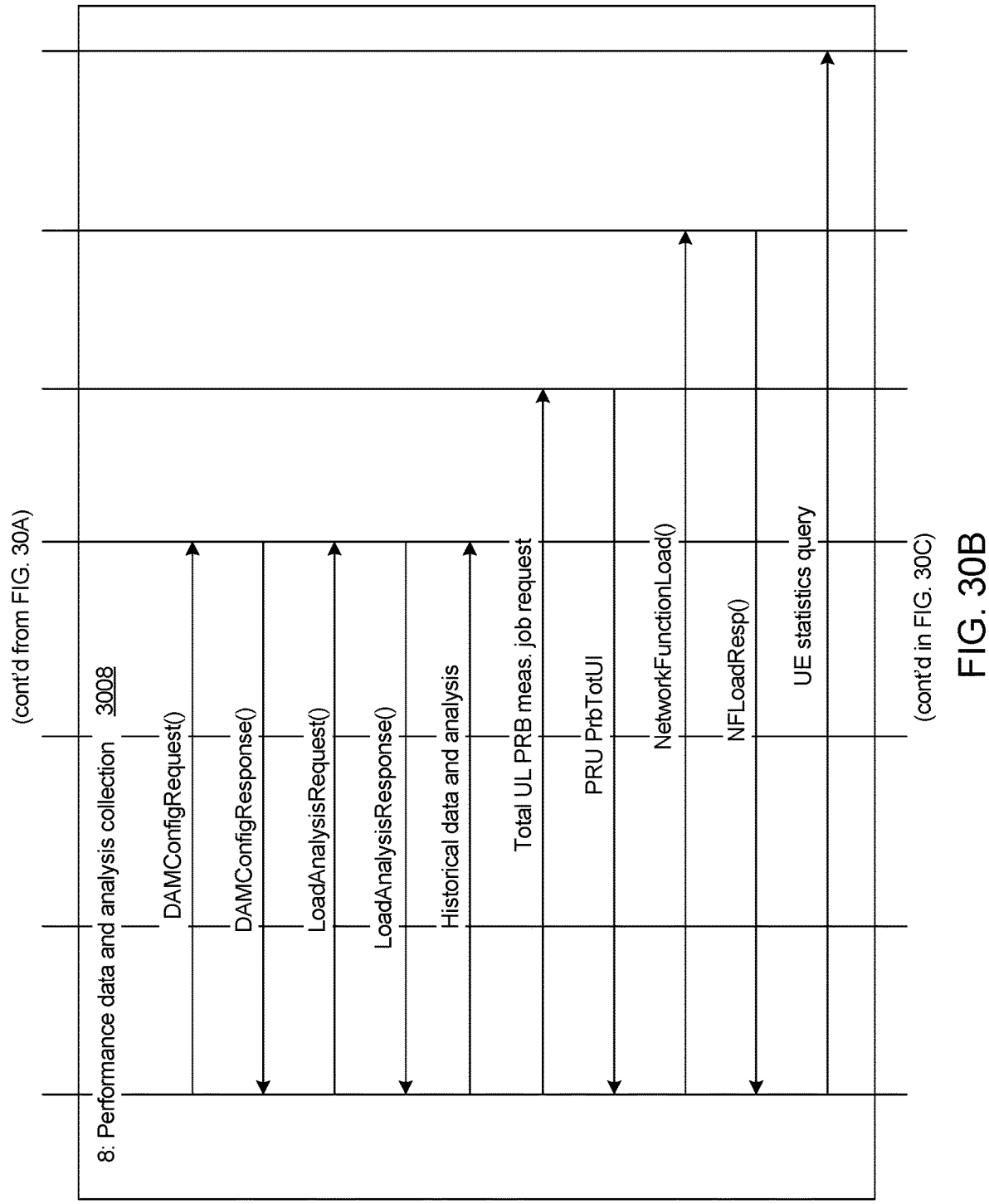

METHODS AND FUNCTIONS OF NETWORK PERFORMANCE MONITORING AND SERVICE ASSURANCE

CROSS-REFERENCE TO RELATED APPLICATIONS

This application claims the benefit and priority from U.S. Provisional Patent Application No. 62/714,438 filed Aug. 3, 2018, the contents of which are incorporated herein by reference in their entirety.

FIELD OF THE INVENTION

The present invention pertains to the field of network communications, and in particular to a method and an apparatus for monitoring a communication network.

BACKGROUND

To ensure adequate network service, a communication network, such as a fifth-generation (5G) currently under development by organizations such as the third generation partnership project (3GPP), should be able to provide enough communication and related resources to support all of its traffic. To improve network operations, accurate and appropriate allocation of the network resources is important. As such, a monitoring of the network is desirable. Through this monitoring, information can be generated and used to modify the network and improve its service.

Therefore, there is a need for a method and an apparatus to monitor communication networks that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An objective of embodiments of the present invention is to provide a method and apparatus for monitoring of a communication network, for example to provide performance feedback usable in adjusting communication network resource allocations.

According to embodiments of the present invention, there is provided a communication service manager (CSM) apparatus for use in monitoring of a communication network. The apparatus includes a computer processor, a memory and a network interface. The apparatus is configured to collect performance data indicative of performance of a network slice provided by the communication network. The apparatus is configured to determine, based on the performance data, whether a first trigger condition is satisfied, the first trigger condition indicative of a deficiency in performance of the network slice. The apparatus is configured, in response to the first trigger condition being satisfied, to transmit a first event report to a network slice controller. The apparatus is configured to determine, based on the performance data, whether a second trigger condition is satisfied, the second trigger condition indicative of failure of the network slice controller to mitigate an undesired network circumstance related to the deficiency in performance of the network slice. The apparatus is configured, in response to the second trigger condition being satisfied, to transmit a second event report to a network slice manager.

According to embodiments of the present invention, there is provided a system comprising: the apparatus as described above; the network slice controller; and the network slice manager. The network slice controller is further configured to adjust operation of the network slice in response to the first event report. The network slice manager is further configured to modify the network slice in response to the second event report.

According to embodiments of the present invention, there is provided a method for monitoring of a communication network. The method is performed by a communication service manager (CSM). The method includes collecting performance data indicative of performance of a network slice provided by the communication network. The method includes determining, based on the performance data, whether a first trigger condition is satisfied, the trigger condition indicative of a deficiency in performance of the network slice. The method includes, in response to the first trigger condition being satisfied, transmitting a first event report to a network slice controller. The method includes determining, based on the performance data, whether a second trigger condition is satisfied, the second trigger condition indicative of failure of the network slice controller to mitigate an undesired network circumstance related to the deficiency in performance of the network slice. The method includes, in response to the second trigger condition being satisfied, transmitting a second event report to a network slice manager.

According to embodiments of the present invention, there is provided a network slice manager (NSM) apparatus managing a network slice in a communication network. The apparatus includes a computer processor, a memory and a network interface. The apparatus is configured to receive, from a communication service manager (CSM) monitoring the network slice, an event report indicative of a deficiency in performance of the network slice. The event report is subsequent to a previous event report sent by the CSM to a network slice controller (NSC) and the event report is also subsequent to a determined failure, by the CSM, of the NSC to mitigate an undesired network circumstance related to the network slice. The apparatus is configured to adjust the network slice to mitigate the undesired network circumstance in response to the event report.

According to embodiments of the present invention, there is provided a communication service manager (CSM) apparatus for facilitating resource utilization performance for a network slice instance of a communication network. The apparatus includes a computer processor, a memory and a network interface. The apparatus is configured to obtain resource and service requirements for a communication service instance (CSI) for the network slice. The apparatus is configured to determine one or more service thresholds with respect to the resource and service requirements. The apparatus is configured to collect performance data indicative of performance of the network slice with respect to the CSI. The apparatus is configured to determine, based the performance data, whether a first trigger condition is satisfied, the first trigger condition indicative of failure of the performance data to satisfy a corresponding one of the service thresholds. The apparatus is configured, in response to the first trigger condition being satisfied, to transmit a first event report to a network slice controller service provider. The apparatus is configured to determine, based on the performance data, whether a second trigger condition is satisfied, the second trigger condition indicative of failure of the performance data to satisfy another corresponding one of the service thresholds following the first event report. The apparatus is configured, in response to the second trigger condition being satisfied, to transmit a second event report to a network slice manager service provider.

BRIEF DESCRIPTION OF THE FIGURES

FIG. 11 is an illustration of a general format of a message for communicating the monitoring policy, according to embodiments of the present invention.

FIGS. 30A to 30D illustrate a call flow for an example use case involving NSI resource allocation optimization, according to an embodiment of the present invention.

DETAILED DESCRIPTION

Figure 1A:
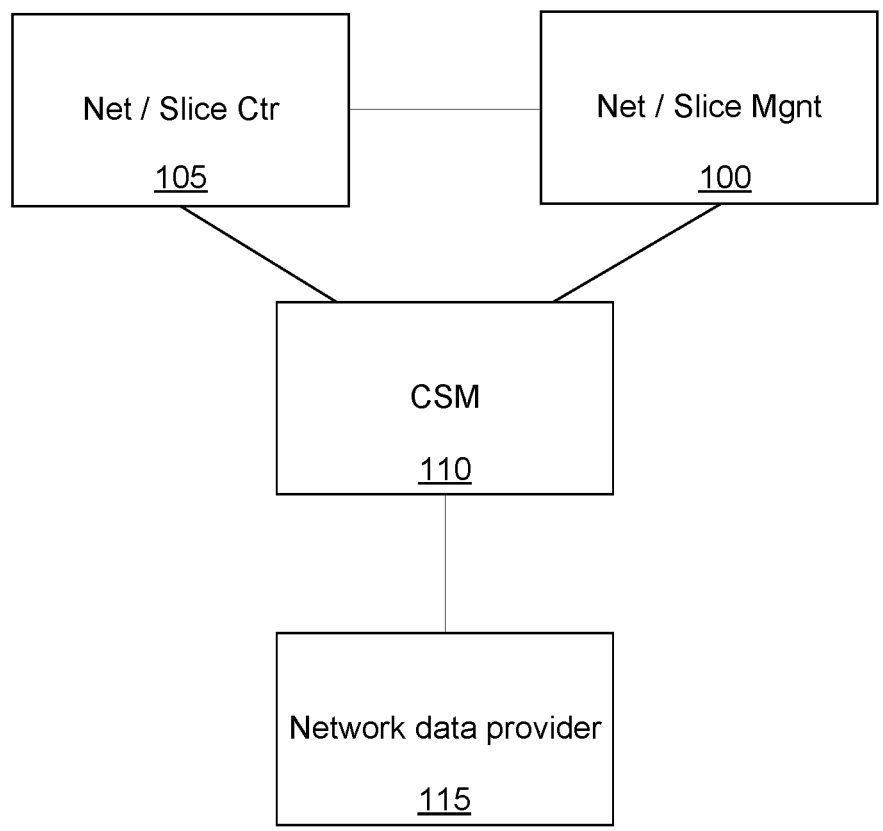
FIG. 1A is a reference point representation of the network behavior management, according to embodiments of the present invention.

Embodiments of the present invention relate to monitoring of network operations involving a network slice, also referred to as a "slice." Network slicing is a known technology in 5G networks, by which a common physical network infrastructure is used to support multiple, substantially separate, virtual networks. The virtual networks can be created and customized dynamically in response to current requirements. Network slices can be isolated from one another, for example in that each network slice is guaranteed a given amount of resources, independent of the operation of other network slices. Since a slice can be considered as an entity that provides the same logic functions as a network, in this invention, the terms of "slice" and "network" are used interchangeably, unless mentioned otherwise.

Unless defined otherwise, all technical and scientific terms used herein have the same meaning as commonly understood by one of ordinary skill in the art to which this invention belongs.

To ensure desired operation of a network/slice service, a network should be able to provide enough and appropriate resources for the actual or expected network traffic demand. Also, to improve the utilization of network resources, the accurate allocation of resources is significant. That is, the amount of network resources allocated to support a network slice or corresponding service should be roughly equal to the amount of resources required to support the current traffic demand. Real-time network monitoring can be used to provide feedback for adjusting network resource allocations in order to support efficient network resource utilization. To support this, a network should be able to monitor and evaluate the performance of the network. Performance indicators may include: quality of service (QoS) indicators for individual traffic flows, a protocol data unit (PDU) session, subscribers and user equipments (UEs); status and resource usage of network elements that may include functions and links; subscribers behavior that may include mobility patterns, traffic patterns, or both; network slice status; and charging related measurements.

Generally speaking, a function or multiple functions that perform a network monitoring job can monitor and evaluate performance of the network. The monitored and evaluated performance may relate to the performance indicators such as those mentioned above. The one or more functions that perform this monitoring work can be referred to as a communication service manager (CSM).

By using the monitoring results, the network controller, such as Session Management Function (SMF) and Policy Control Function (PCF), and management systems, such as Over-the Air Management (OAM) systems, can dynamically adjust the behaviors of the network/slice. This can be done, for example, by optimizing the steering of traffic, modifying resource allocated to the slices, modifying policies. Such actions can be performed for example so that the following operation can be achieved: QoS improvement; users-oriented traffic steering; accurate resource allocation; and customized event detection.

FIG. 1A is a reference point representation of the network behavior management. The functions of Network/Slice Management 100 may include: managing the fault, configuration, accounting, performance, and security, (FCAPS) of the relevant network/slice (refer to operations of existing 5G network management and orchestration infrastructure); configuring CSM 110 with monitoring policies; creating/modifying/terminating monitoring job; receiving reports/alarms from the CSM 110; and reacting to the reports/alarms. The functions of Network/Slice Controller 105 may include: controlling the network/slice (this may refer to 5G system (5GS)); creating/modifying/terminating monitoring jobs; receiving reports or alarms from the CSM 110; and reacting to the reports/alarms. The functions of Network data provider 115 may include: collecting data required for evaluation; providing data to the CSM 110; and providing access methods to the CSM 110 to allow the CSM 110 access the data in a relevant database (DB), if DB is used for data collection.

FIG. 1A further shows the involved network systems with the monitoring entities in the network. The monitoring entities will use one or more data providers to collect/log network data. The data providers may include: databases (DB) where related data may be stored; data analytical management (DAM) functions that are responsible for collecting data, such as latency, packet drop rate, virtual resource usage, link usage, requested by monitoring entities; and operations, administration and management (OAM) systems that are used to monitor the network performance. It should be noted that DAM is a function that can be co-located with network elements such as functions, links, or cloud-based elements. By using the collected data, the monitoring entities evaluate them with pre-defined requirements/design/performance to verify that the networks/slices work appropriately (meet the requirements). The evaluation results may trigger some alarms and reports to be sent to the monitoring entities service consumers (i.e., event-triggered). These reports or alarms may lead to some changes of the monitoring entities service consumers. For example, the network controller may change the network operation policy to enforce new QoS requirements or optimize the routing strategies. Another example can be that the network management system (network management) adjusts the resources allocated to the corresponding slice/network to satisfy the requirements. It should be noted that the network controllers can be one or more of: SDN controllers, central units (CUs) and distributed units (DUs) in Radio Access Network (RAN), 5G control plane functions (CPFs) such as session management function (SMF), policy control function (PCF), Access and Mobility Management function (AMF), network slice selection function (NSSF). Moreover, the network management system can be an OAM system, for example SA5 in 3GPP.

Figure 1B:
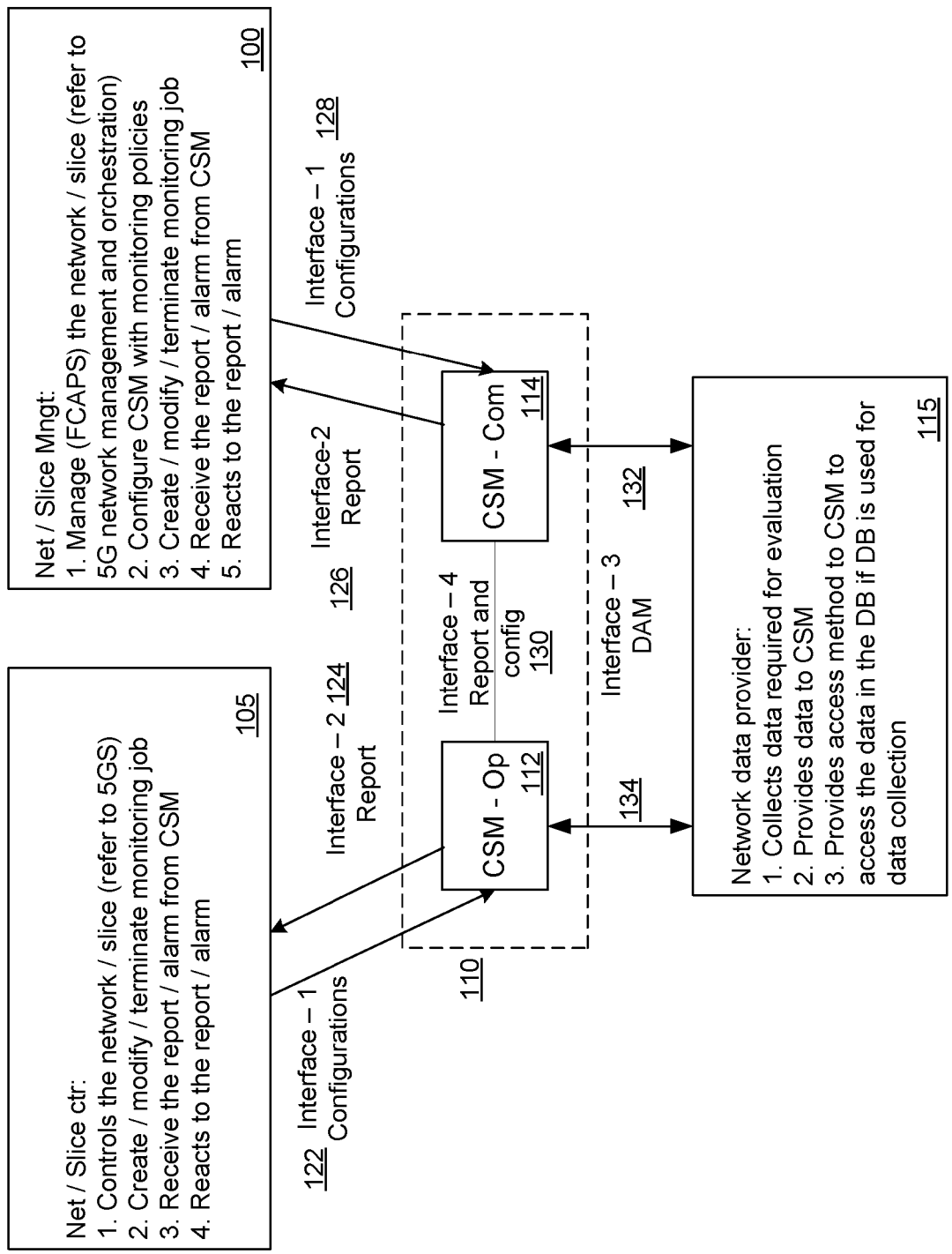
FIG. 1B is a representation of the network behaviour management, according to other embodiments of the present invention.

FIG. 1B illustrates another representation for FIG. 1A, for example a more detailed or explanatory representation of FIG. 1A. The CSM 110 is a single logical entity which includes two components, namely CSM-Op 112 and CSM-Com 114. CSM-Op is responsible for slice operations while CSM-Com is responsible for slice composition. Alternatively, CSM-Op and CSM-Com can be integrated together rather than separate components.

FIG. 1B also illustrates several interfaces involving the CSM 110. The interfaces can comprise particularly formatted messages and/or particular contents of fields of such messages. Such messages are described for example with respect to FIG. 11. Interface-1 elements 122, 128 are used to configure monitoring policies. Interface-1 element 122 is between the Network/Slice Controller 105 and the CSM-Op 112, while Interface-1 element 128 is between the Network/Slice Manager 100 and the CSM-Com 114. The CSM monitoring policies can be configured by the Network/Slice Controller 105 via first Interface-1 element 122, by the Network/Slice Manager 100 via second Interface-1 element 128, or via a combination of the two Interface-1 elements. Details of the configuration procedures can be found in FIGS. 4, 6 (first part) and 7, for example. Details of the messages/interface for Interface-1 are described for example with respect to FIG. 11 and FIGS. 14-18.

Interface-2 elements 124, 126 are used to deliver monitoring reports from the CSM 100 to the Network/Slice Controller 105 and the Network/Slice manager 100. Interface-2 element 124 is between the Network/Slice Controller 105 and the CSM-Op 112, while Interface-2 element 126 is between the Network/Slice Manager 100 and the CSM-Com 114. Details of the report messages are described for example with respect to FIGS. 19-23.

Interface-3 elements 132, 134 are used to request, query, or both request and query data analytics from data analytics entities of the Network Data Provider 115. Interface-3 element 132 is between the Network Data Provider(s) 115 and the CSM-Op 112, while Interface-3 element 134 is between the Network Data Provider(s) 115 and the CSM-Com 114. Details of the messages are described for example with respect to Tables 28-45. Details of the procedures are described for example with respect to FIGS. 12 and 13.

Interface-4 130 is used by CSM-Com 114 to configure CSM-Op 112, and to communicate reports from CSM-Op 112 to CSM-Com 114. Interface-1 and Interface-2 applies to this interface, in case it is not internal. Configuration and reporting can be performed via Interface-1 and Interface-2, or via Interface-4. Interface-4 can be internal or external, depending on the degree of separation of CSM-Op 112 and CSM-Com 114.

Embodiments of the present invention provide for a Communication Service Manager (CSM) computerized device that serves at device levels, network slice levels, service level, or a combination thereof, and which is configured by a network management system. The configuration may involve configuring the CSM with security level, connection information and access ID(s). The access information may include one or more of: network ID, CSM ID, slice ID, NSI ID, tenant ID and other necessary IDs.

Embodiments of the present invention provide for the onboarding of (configuring of the CSM to operate using) policies to the CSM at both device and network slice levels by a network management system, where the policy includes a network slice specification. The network slice specification may include some or all of: the slice IDs, NF types, topology, link and NF capacities, service areas, user IDs, user types, tenant IDs, exposure levels, traffic priority and other network slice instance operation policies, and other network slice characteristics that are necessary to operate (device level) and monitor the slice.

Some embodiments provide for monitoring job creation at the slice level that is configured for example with SliceId, UserId and PolicyMonitoring fields. The monitoring job may be provided with and configured to use information via such fields.

Various embodiments of the present invention provide for and relate to one or more of: monitoring job modification; monitoring job event reporting; monitoring job data streaming; monitoring job data querying; monitoring job data storage; monitoring job termination; and exposed interfaces used for communication in performing monitoring jobs.

One embodiment of the present invention provides for a use case in which CSM-Com operates for NSI resource allocation, and in which CSM-Com interacts with network management service providers and core network entities.

Embodiments of the present invention may provide for some or all of: (1) the establishment of monitoring in networks with different policies; (2) the collaboration between network entities to perform monitoring, including signaling and interfaces; and (3) a procedure for performing monitoring on different network entities.

Accordingly, embodiments of the present invention provide some or all of: (1) an entity to perform monitoring in the network intra- and inter levels (e.g., slice, UE, traffic flow); (2) a unified and extendable monitoring policy format to assist the network in monitoring; and (3) a method of creating a monitoring job; (4) a format and protocol for message exchange between involved entities, in support of the above.

Embodiments of the present invention operate to collect data from data providers that may include an OAM system, NFs, and DB. The present invention may use the collected data to detect violations to pre-defined requirements. Violations are reported to entities such as network/slice managers and controllers.

Embodiments of the present invention provide for a network performance monitoring entity, namely a communication service manager (CSM). The CSM is an entity that is configured to monitor, record, analyze and evaluate the network/slice/device/traffic flow performance and behaviors based on pre-defined policies and methodologies. Some or all of the CSM services may be supported in a single instance of a CSM. In general, the functions in a CSM include some or all of: function 1, related data collection (e.g. collection of data relevant to current monitoring tasks); function 2, related data analysis; function 3, monitoring relevant network-related performance, status, and behaviors; function 4: notifying corresponding network components; function 5: storing relevant data to a designated database. Examples of collected data for function 1 may include end-to-end (E2E) latency, throughput, and data rate. An example of function 2 (related data analysis) may include traffic distribution analysis. Examples of function 3 may include monitoring for violation of a pre-defined threshold. Examples of network components notified in function 4 may include network controllers and OAMs. An example of a designated database in function 5 is a common database (DB).

For the purpose of assuring the performance and service, CSM offers several services. For example, Service 1, Real-time QoS monitoring functionality, may be provided. This service provides for monitoring of QoS metrics in the network slice. This service may include: traffic flow QoS related data collection; traffic flow experienced QoS analysis based on policies; monitoring the traffic flow QoS enforcement based on policy; traffic flow QoS control notification; and traffic flow QoS data storage. Examples of traffic flow QoS related data collection may include E2E latency, throughput, and data rate. Examples of monitoring the traffic flow QoS enforcement based on policy include monitoring for violation of the traffic flow QoS requirements; and determining that a pre-defined monitoring event has been triggered. The monitoring event trigger may be based on predetermined thresholds, conditions, and time criteria. An example of traffic flow QoS control notification may include reporting to the network controller. The traffic flow QoS control notification may be used to help the network controller to generate new network policy, and to help the network controller for steering traffic flows, scheduling and resource allocation.

Another example of a service that CSM offers is Real-time network slice status monitoring functionality that may include: network slice status related data collection; network slice status analysis based on policies; monitoring of the network slice status based on policy; network slice status control notification; and network slice status data storage. Examples of network slice status related data may include link usage, traffic distribution, and node load. The monitoring may be configured to determine, for example, that network or network slices components status, such as load or congestion levels are violated. The monitoring may be configured to detect that pre-defined monitoring events (e.g. based on threshold, conditions, time) are triggered. An example of network slice status control notification may include reporting to the network controller. The network slice status control notification may be used to help the network controller generate to new network policy, and to help the network controller in performing load balancing, steering traffic flows, scheduling, and resource allocation.

Another example of a service that CSM may be configured to provide is Subscriber context statistic (enhanced trace management) that may include one or more of: subscriber context related data collection; subscriber context analysis based on policies; monitoring of the subscriber context based on policy; subscriber context control notification; and subscriber context statistic data storage. Examples of subscriber context related data collection may include signaling message, mobility pattern, traffic types. The subscriber context control notification may be used to help the network controller generate new network policy and help the network controller implement load balancing, steering traffic flows, scheduling, resource allocation, or a combination thereof.

Another example of a service that CSM offers is Slice performance (KPI) assurance that may include one or more of: network slice key performance indicator (KPI) related data collection; network slice KPI analysis based on policies; monitoring of the network slice KPI based on policies; network slice KPI control notification; and network slice KPI data storage. Examples of collected network slice KPI related data include E2E latency, throughput, and data rate. Examples of monitoring the network slice KPIs include: monitoring to determine whether network or network slices components status, such as indications that load and congestion levels are violated; and monitoring for pre-defined events (e.g. based on threshold, conditions, and time). An example of the network slice KPI control notification may include reporting to network management. The network slice KPI control notification may be used to help the network management modify the configuration of the network slice and adjust the network slice resources.

Another example of a service that CSM offers is Slice resource usage statistic generation and reporting that may include: network slice resource usage related data collection; network slice KPI analysis based on policies; monitoring the Slice resource usage statistic based on policy; slice resource usage statistic control notification; and slice resource usage statistic data storage. Examples of network slice resource usage related data collection may include traffic pattern, user distribution, and resource usage distribution data collection. Examples of monitoring the Slice resource usage statistics may include: monitoring for network slice resource usage overload; and monitoring for network slice resource usage overprovisioning. An example of the slice resource usage statistic control notification may include reporting a violation to a network management node or function. The slice resource usage statistic control notification may be used to help the network management modify the configuration of the network slice and adjust the network slice resources.

In various embodiments, the CSM apparatus comprises a plurality of component CSM sub-apparatuses arranged in a hierarchical manner. The component CSM sub-apparatuses may include a global CSM sub-apparatus, one or more CSM sub-apparatuses associated with one or more different respective subnets of the communication network, and optionally one or more CSM sub-apparatuses associated with one or more different nodes, links or functions located within the one or more different respective subnets.

Similarly, in embodiments of the present invention, a system comprising a plurality of CSM apparatuses may be provided. Each of the CSM apparatuses is referred to as a CSM sub-apparatus, and the CSM sub-apparatuses are arranged in a hierarchical manner such that higher-level CSM sub-apparatuses obtain specified information from lower-level CSM sub-apparatuses, and lower-level CSM sub-apparatuses perform the respective set of tasks to provide the specified information to the higher-level CSM sub-apparatuses. In some embodiments, higher-level CSM sub-apparatuses transmit configuration instruction messages to lower-level CSM sub-apparatuses.

Figure 2A:
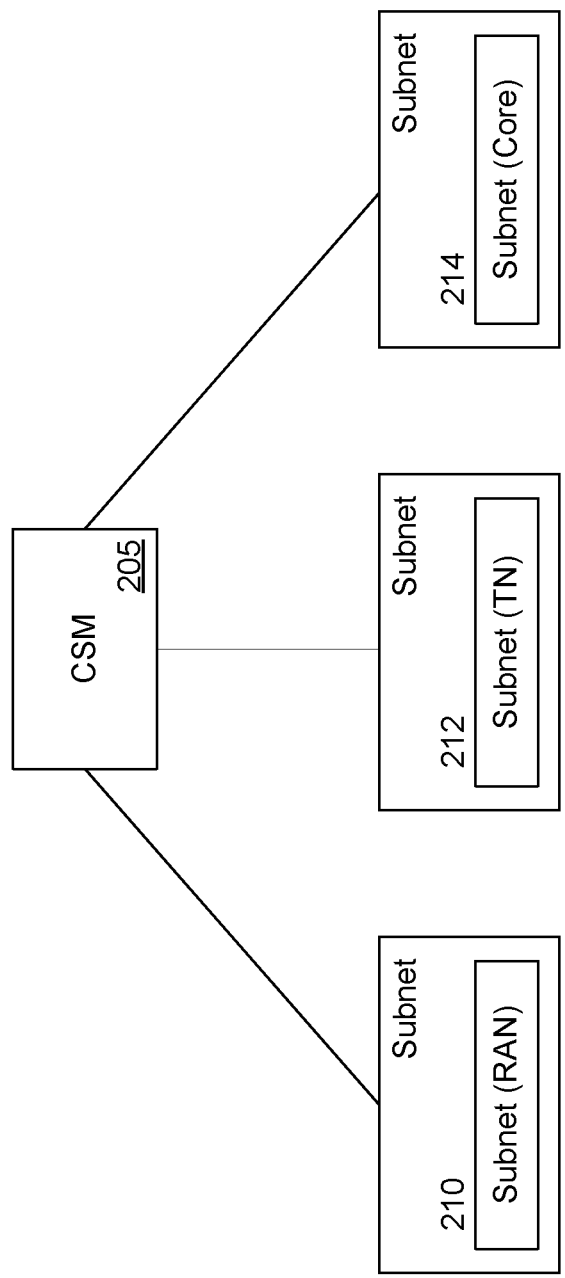
FIG. 2A is an illustration of a centralized communication service manager (CSM) architecture, according to embodiments of the present invention.
Figure 2B:
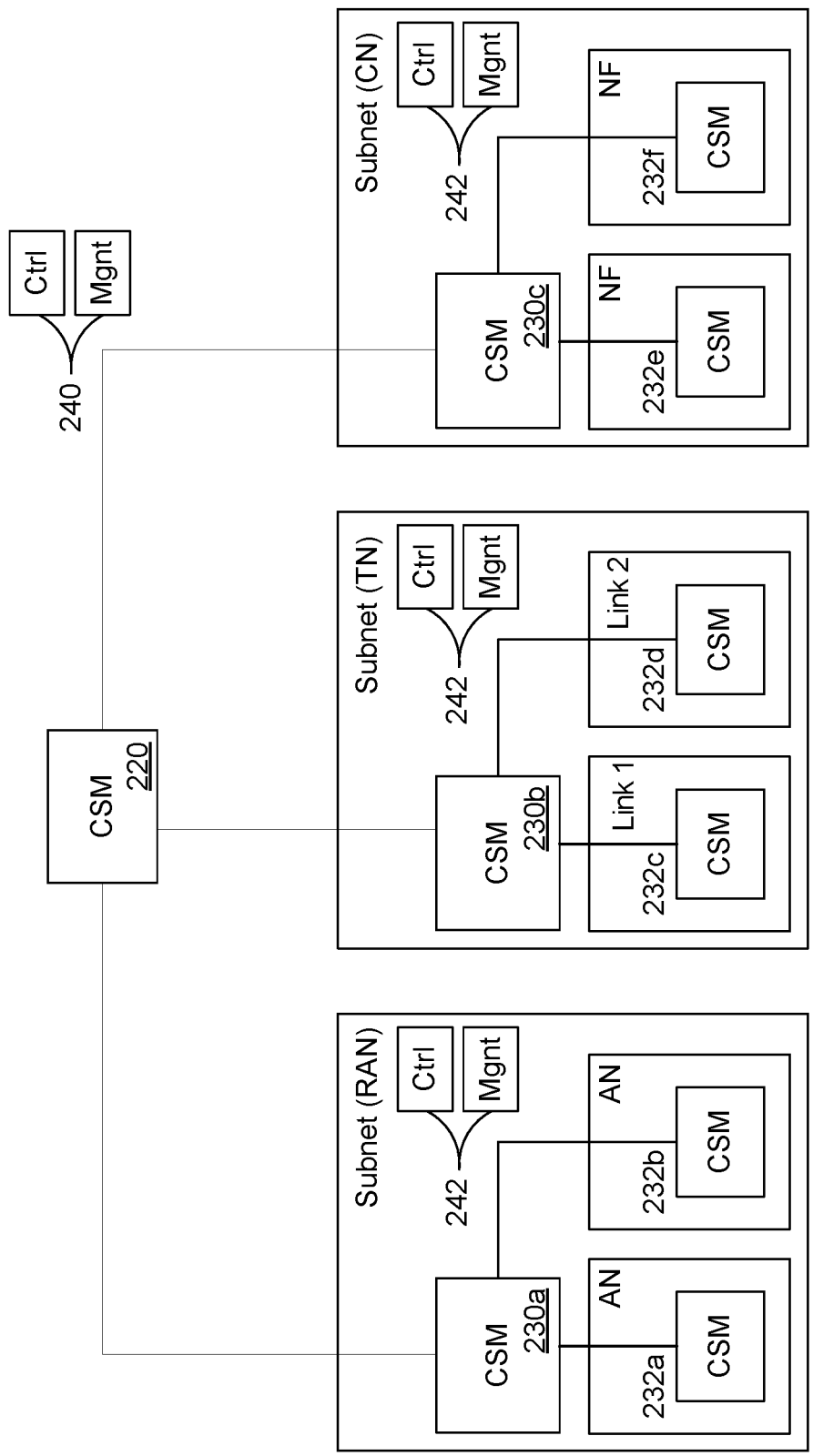
FIG. 2B is an illustration of a distributed CSM architecture, according to embodiments of the present invention.

Accordingly, the CSM may be implemented in centralized or distributed way. It should be noted that the terms of centralized and distributed architectures refer to the logical function. The implementation method of the CSM is not discussed here. In other words, even in centralized way, a CSM may have multiple instances deployed at multiple locations. FIG. 2A is an illustration of a centralized architecture. A centralized CSM 205 is used in a pre-defined administration domain. In the centralized deployment mechanism, all monitoring jobs are managed and performed by a single logical CSM entity. The CSM monitors subnets including RAN Subnet 210, Transport Network Subnet 212, and Core Subnet 214. FIG. 2B is an illustration of a distributed architecture. In the distributed deployment mechanism, multiple CSMs are used to perform and manage the monitoring jobs. Each CSM may take responsibility of a subnet, and coordination among CSMs are allowed. A global CSM (sub-apparatus) 220 is used in a pre-defined administration domain to monitor global pre-defined performance, such as E2E latency, and status such as traffic distribution. A local CSM (sub-apparatus) 230*a*, 230*b*, 230*c*, 232*a*, 232*b*, 232*c*, 232*d*, 232*e*, 232*f* is used to monitor local pre-defined performance, such as air interface latency, and status, such as link congestion. Multiple local CSMs are provided in multiple levels of hierarchy. Depending on the monitoring job, a local CSM may notify a corresponding local network control and management system 242. Also, a global CSM 220 may coordinate among multiple local CSMs to: re-use the data/evaluation results; distribute monitoring jobs; and provide more accurate notifications indicating locations or parts of the network to the corresponding global and local network control and management system 240. As illustrated, Local CSMs may be deployed in RAN, TN or CN subnets, Access Nodes, Links, or network functions, or a combination thereof.

Figure 3:
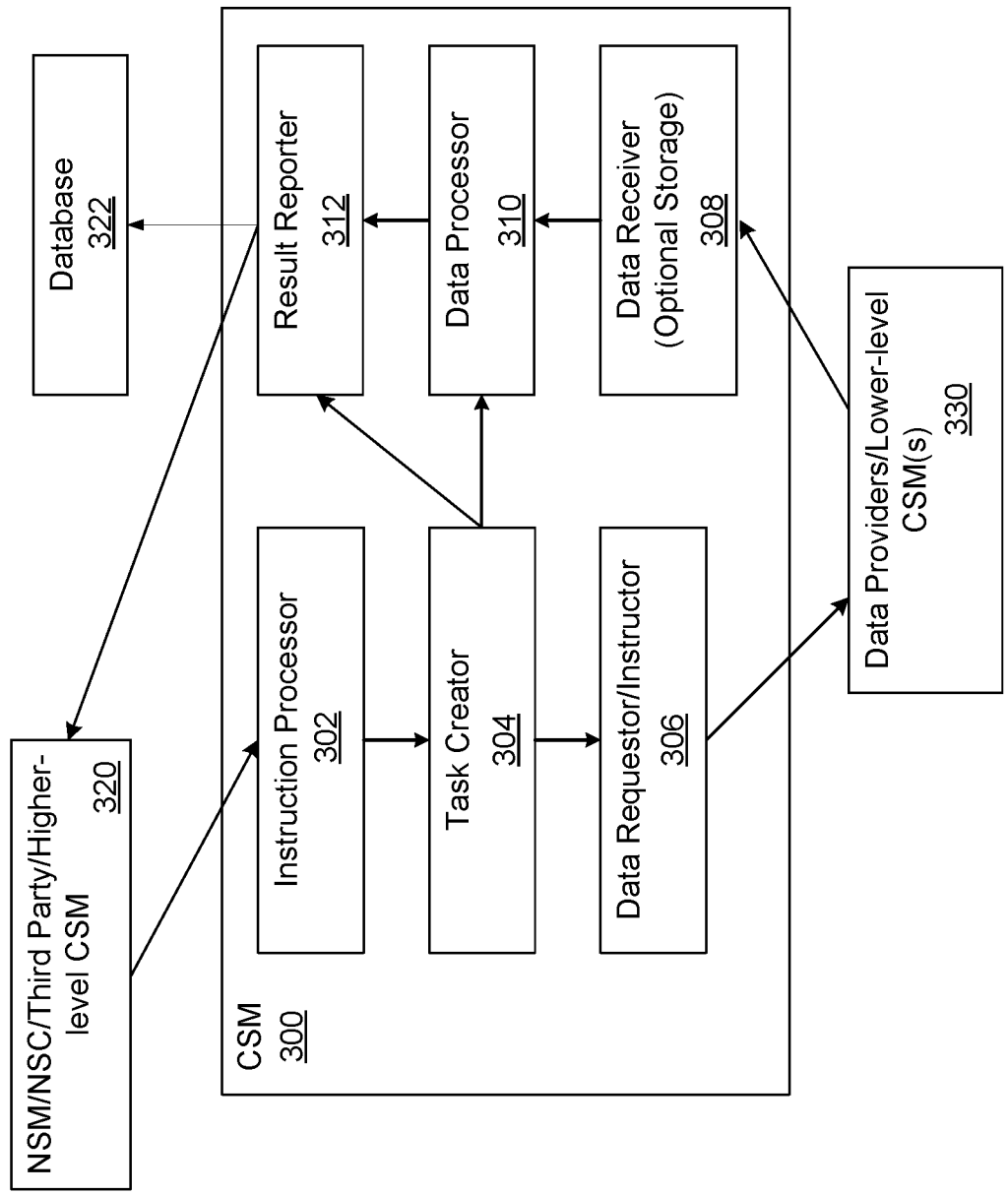
FIG. 3 is an illustration of a CSM, according to embodiments of the present invention.

FIG. 3 is an illustration of the CSM, according to an embodiment. The CSM 300 includes an instruction processor 302, a task (job) creator 304, a data requestor/instructor 306, a data receiver 308 with optional data storage for temporary storage of received data, a data processor 310, and a result reporter 312. The various components of the CSM can be provided by a computer processor executing program instructions stored in memory, and operation of associated components, such as a network interface, as directed by the computer processor.

Referring to FIG. 3, the instruction processor 302 receives and parses configuration instruction messages from entities 320 such as an NSM, NSC, $3^{rd}$ party device, or a higher-level CSM of a hierarchical CSM arrangement of which the CSM 300 is a part. The configuration instruction messages are communicated in a predetermined format with specified fields as described elsewhere herein. Multiple stages of configuration instruction messages can be provided. For example, a first set of configuration instruction messages can be received and processed to perform general configuration and initial setup or subsequent re-configuration of the CSM. A second set of configuration instruction messages can be subsequently received and processed to cause the CSM to carry out specific monitoring operations. Multiple monitoring operations corresponding to multiple instruction messages can be carried out concurrently.

Referring to FIG. 3, the task creator 304 creates or modifies a set of one or more tasks for carrying out a monitoring operation conveyed in a configuration instruction message. When appropriate pre-existing tasks are established, these tasks can be re-used or modified by the task creator to support the monitoring operation. The task creator can generate a number of separate tasks for carrying out the monitoring operation, such as querying different data providers. The task creator can configure the tasks based on contextual information.

Referring to FIG. 3, the data requestor/instructor 306 transmits requests to entities 330 including data providers (e.g. databases, network nodes, network functions etc.), lower-level CSMs in a hierarchical CSM arrangement, or both. The requests may be requests for information held at or available to these entities 330. The data requestor/instructor 306 may transmit instructions to the entities 330, which cause these entities 330 to begin collecting specified data, obtain specified data from elsewhere, process collected data in a defined manner, or a combination thereof. The instructions may cause the entities 330 to report the data back to the CSM 300 or hold the data locally or in a database for subsequent retrieval. The data from the entities 330 is received at the CSM via the data receiver 308, which may optionally store received data locally when not required immediately, or for aggregation with further data.

Referring to FIG. 3, the data requestor/instructor 306 is configured by the task creator 304. For example, the task creator may specify the data to be retrieved, the entities to retrieve the data from, the frequency at which the data is to be retrieved periodically, trigger conditions under which data is to be retrieved, or a combination thereof.

Referring to FIG. 3, the data processor 310 processes data received at the data receiver 308 according to a set of processing operations. The data processor 310 is configured by the task creator 304 to perform specific processing operations in support of the monitoring operation indicated in the configuration instruction message. For example, data can be processed to determine if a particular trigger condition is met, or to aggregate data, generate statistics based on data, generate indications of data trends, etc.

Referring to FIG. 3, the results of processing operations performed by the data processor 310 are provided to the result reporter 312. The result reporter transmits the results of the processing operations toward one of the entities 320 or toward a database 322 for storage and subsequent retrieval by a concerned entity. The result reporter 312 is configured by the task creator 304 to transmit the results to specified entities or databases, at specified times, in response to specified trigger conditions, or a combination thereof.

In various embodiments of the present invention, the functions of the above-described CSM may be provided by network functions proposed or existing, for example in 5G networks such as 5GS. These network functions may include, for example, CPF and OAM. This embodiment proposes several options.

In the following, functions 1 through 5 are as described above (function 1, related data collection; function 2, related data analysis; function 3, monitoring relevant network-related performance, status, and behaviors; function 4: notifying corresponding network components; function 5, storing relevant data to a designated database), and the network functions are those currently proposed or accepted in the relevant 5G standard. An example of implementing CSM in 5GS from the functions aspect may include: implementing function 1 using network controller and OAM; implementing function 2 using network controller and OAM; implementing function 3 using network controller and OAM; implementing function 4 using network controller and OAM; and implementing function 5 using network controller and OAM. Examples of the network controller for function 1 may include RAN-CP (RAN control plane) including CU-CP (CU control plane) and DU-CP (DU control plane), SMF, PCF and NWDAF. Examples of the network controller for function 2 may include RAN-CP including CU-CP and DU-CP, SMF, PCF and NWDAF. Examples of the network controller for function 3 may include RAN-CP including CU-CP and DU-CP, AMF, SMF, PCF and NWDAF. Examples of the network controller for function 4 may include RAN-CP including CU-CP and DU-CP, AMF, SMF, PCF and NWDAF. Examples of the network controller for function 5 may include RAN-CP including CU-CP and DU-CP, AMF, SMF, PCF and NWDAF.

Another example of implementing CSM in 5GS from the functions aspect may include: implementing function 1 using OAM; implementing function 2 using RAN-centric BigData Collection and Utilization for RAN and NWDAF; implementing function 3 using RAN-centric BigData Collection and Utilization for RAN and NWDAF; implementing function 4 using RAN-centric BigData Collection and Utilization for RAN and NWDAF and OAM; and implementing function 5 using OAM.

An example of implementing CSM in 5GS from the services aspect may include: implementing function 1 using network controller; implementing function 2 using network controller; implementing function 3 using network controller; implementing function 4 using OAM; implementing function 5 using OAM. Examples of the network controller for function 1 may include RAN-CP including CU-CP and DU-CP, SMF, PCF and NWDAF. Examples of the network controller for function 2 may include RAN-CP including CU-CP and DU-CP, SMF, PCF and NWDAF. Examples of the network controller for function 3 may include RAN-CP including CU-CP and DU-CP, AMF, SMF, PCF and NWDAF.

An example of implementing CSM in 5GS from the services aspect may include: implanting function 1 using NWDAF; implementing function 2 using NWDAF; implementing function 3 using NWDAF; implementing function 4 using NWDAF; implementing function 5 using NWDAF.

An example of implementing CSM in 5GS from the services aspect may include: implementing function 1 using RAN-centric BigData Collection and Utilization and NWDAF; implementing function 2 using RAN-centric BigData Collection and Utilization and NWDAF; implementing function 3 using RAN-centric BigData Collection and Utilization and NWDAF; implementing function 4 using RAN-centric BigData Collection and Utilization and NWDAF;

implementing function 5 using RAN-centric BigData Collection and Utilization and NWDAF.

An example of implementing CSM in 5GS from the services aspect may include: implementing function 1 using RAN-centric BigData Collection and Utilization and NWDAF; implementing function 2 using RAN-centric BigData Collection and Utilization and NWDAF; implementing function 3 using RAN-centric BigData Collection and Utilization and NWDAF; implementing function 4 using OAM; implementing function 5 using OAM.

An example of implementing CSM in 5GS from the services aspect may include: implementing function 1 using OAM; implementing function 2 using OAM; implementing function 3 using OAM; implementing function 4 using OAM; implementing function 5 using OAM.

Figure 4:
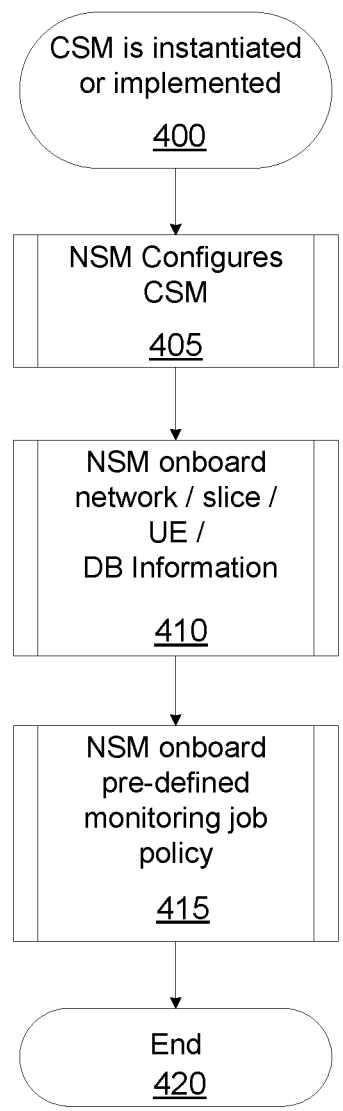
FIG. 4 is an illustration of a procedure for configuring the CSM, according to embodiments of the present invention.

FIG. 4 is an illustration of a procedure for configuring the CSM, according to an embodiment of the present invention. Referring to FIG. 4, the CSM is initially instantiated or implemented 400. Subsequently, the NSM configures 405 the CSM. NSM then onboards 410 (e.g. causes the CSM to obtain and use) network/slice/UE/DB information. The NSM then onboards 415 one or more pre-defined monitoring job policies. The CSM configuration then ends 420.

It should be noted that before the NSM/NSC creates the job at CSM, the CSM typically needs to be configured to work appropriately. The CSM's configuration may include two parts. One part is for CSM parameters configuration such as authorization information (e.g., key), connectivity information (e.g., network identification). Another part is for network/slice/UE/services information and policies to instruct the work of CSM by sending profiles and specifications. The CSM can be first be configured in a general way in order to interact with a particular network environment. The CSM can then subsequently be configured in a particular way to perform one or a plurality of particular monitoring tasks (jobs).

The above-mentioned profiles and specifications can include, for example, one or more of: QoS requirements, service-level agreement (SLA) requirements, network requirements such as end-to-end (e2e) latency, segment-based latency, RAN latency, CN latency, N6 latency, NF chain requirements, network/slice topology including NF and link capacities; service types and IDs; tenant types and IDs; NSI and NSSI IDs; NF and other element IDs; S-NS-SAI(s); CSI IDs; exposure (e.g., data exposure, management exposure, monitoring exposure, management capability exposure) and isolation levels (e.g., slice used exclusively for one service or for multiple services); service area; user capacity; user types and priorities; and any other specification that is need to manage (via CSM-Com) and operate (via CSM-Op) the network/slice (instance(s)).

Figure 5:
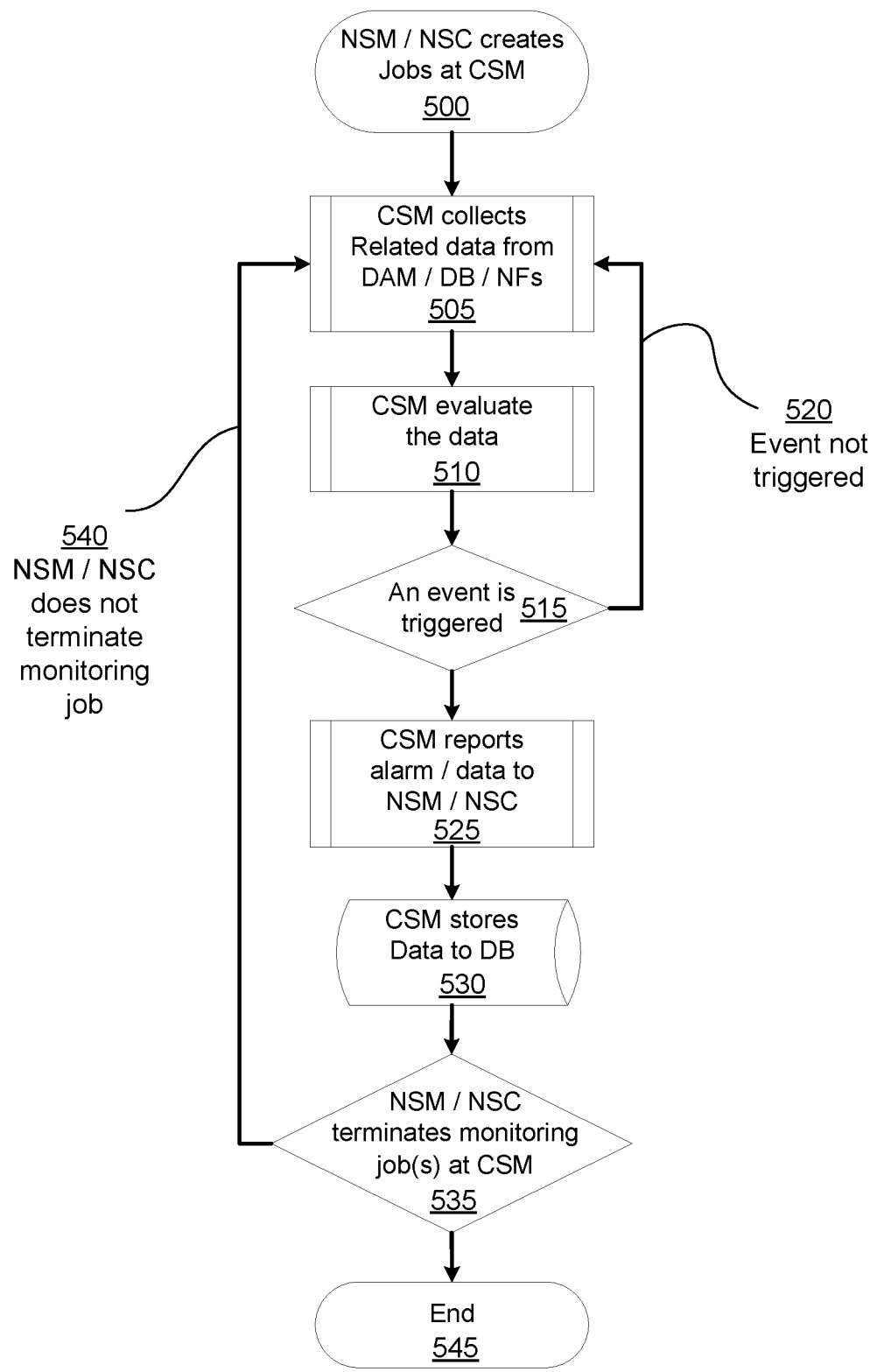
FIG. 5 is an illustration of a general procedure for configuring a CSM, according to embodiments of the present invention.

FIG. 5 is an illustration of the general procedure of job creation and execution at a CSM. Referring to FIG. 5, the NSM/NSC creates 500 a monitoring job at the CSM, for example by sending a message thereto (the message format defined elsewhere herein). The message may include a monitoring policy for creating the monitoring job. The CSM, acting according to the created job, collects 505 related required data from data provider devices such as DAMs, OAMs, DBs and NFs. The data may include performance measures, for example. The data collection may involve the CSM sending requesting messages to the data provider devices. The CSM then evaluates 510 the collected data. Concurrently with the (e.g. ongoing) data collection, the CSM determines 515 whether a predetermined event is triggered. The determination is made based on a processing of the data so far. If the event is triggered, the CSM reports 525 an alarm (and optionally provides the relevant data) to the NSM/NSC. The CSM may also store 530 all data, or only the data relevant to the triggered event, to a DB. The CSM also determines 535 whether the NSM/NSC has signaled to terminate the monitoring job. If so, the monitoring job ends 545. If, according to the determination 515, an event is not triggered 520, the CSM continues to collect 505 the related data. If NSM/NSC does not terminate the monitoring job at the CSM, the CSM continues 540 to collect 505 related data from DAM/DB/NFs, for example for monitoring aspects such as performance, status and QoS.

In more detail, and in some embodiments, if the monitoring job is event-triggered, the CSM compares the collected data, which may be indicative of performance, status, QoS or a combination thereof, with thresholds which are pre-defined in the monitoring policy. When a violation event happens (i.e. when the thresholds are exceeded), the CSM reports the violation event with corresponding data to NSM/NSC system and stores the event with data in a DB. If the monitoring job is streaming, CSM reports the corresponding data to NSM/NSO system and stores the data in a DB.

Figure 6:
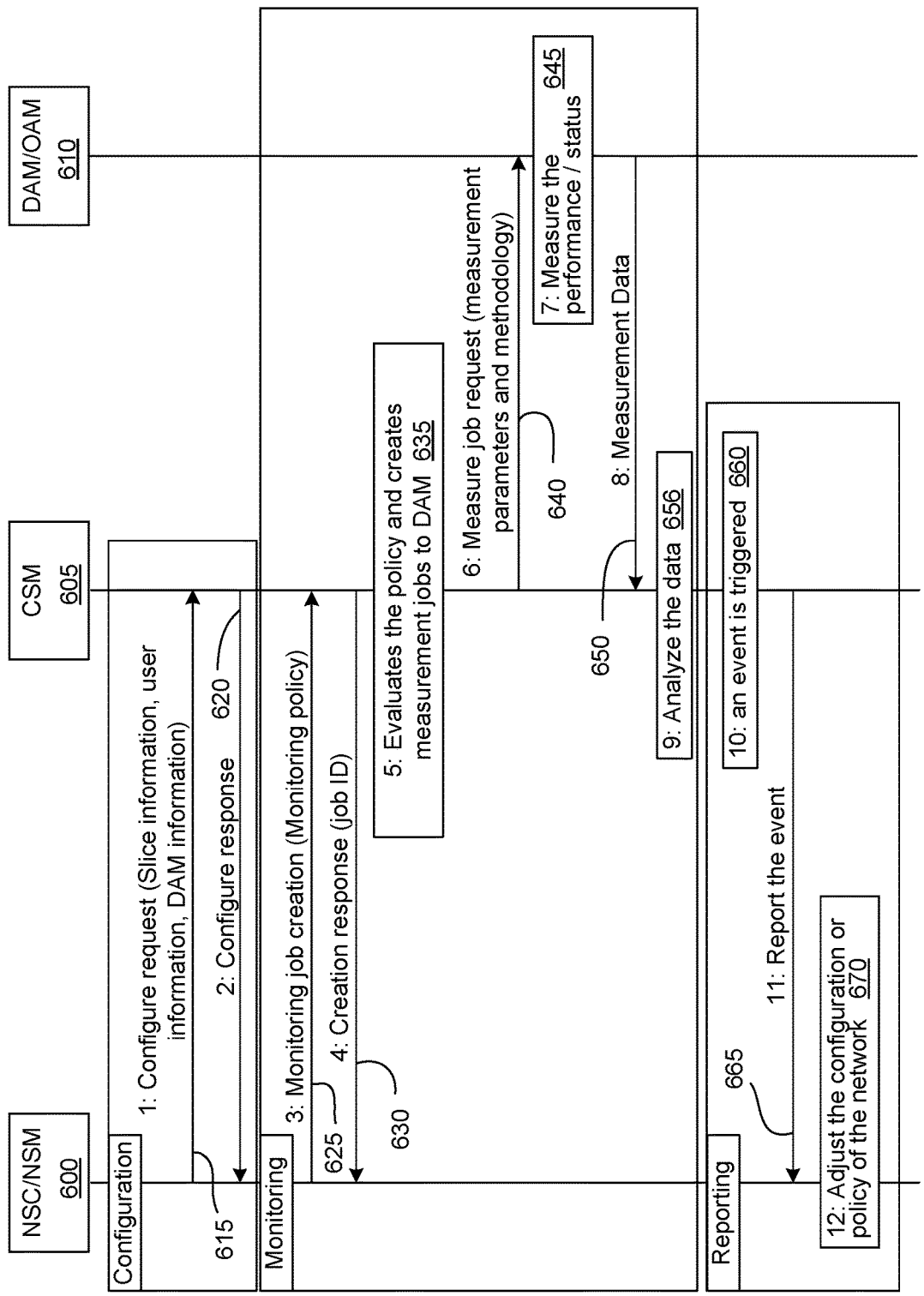
FIG. 6 is an illustration of the signaling exchange related to creation and execution of a CSM monitoring job, and subsequent network reconfiguration, according to embodiments of the present invention.

FIG. 6 is an illustration of the signaling exchange related to a CSM monitoring job. In the signaling exchange, NSC/NSM 600 sends 615 a configuration request with slice information, user information, DAM information to CSM 605. CSM self-configures according to the content of the request. CSM 605 also sends a configuration response 620 to NSC/NSM 600. Subsequently, NSC/NSM 600 sends 625 a monitoring job creation message (including a defined monitoring policy) to CSM 605. In response, CSM 605 sends 630 a job creation response (including a job ID) to NSC/NSM 600. CSM 600 evaluates 635 the monitoring policy and creates measurement jobs to submit to one or more DAMs or other data providers. CSM 600 then sends 640 requests for the created measurement jobs, with measurement parameters and methodologies, to DAMs/OAMs 610. Accordingly, the DAMs/OAMs 610 measure 645a deformed performance/status according to the measurement jobs. DAMs/OAMs 610 subsequently send 650 measurement data to CSM 605. CSM 605 receives and analyzes 655 the measurement data. If an event is triggered 660 due to analysis of the received data (e.g. as a result of the measurement data analysis exceeding a threshold), then CSM 605 reports 655 the event to NSC/NSM 600. NSC/NSM may then adjust 670 the configuration or policy of the network to mitigate undesired network circumstances represented by the reported event.

Figure 7A:
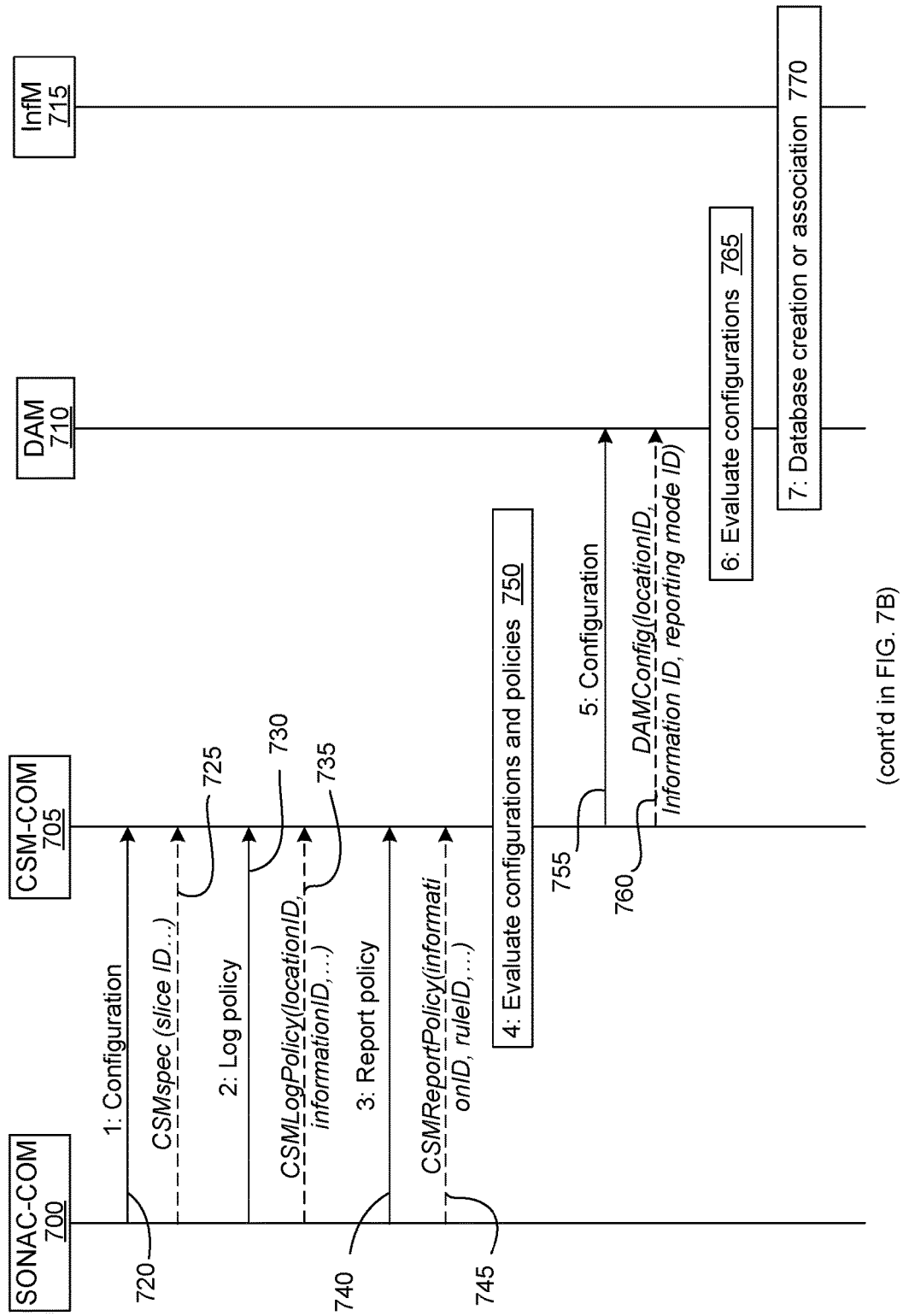
FIGS. 7A and 7B illustrate the signaling exchange of another general procedure for configuring a CSM, according to embodiments of the present invention.
Figure 7B:
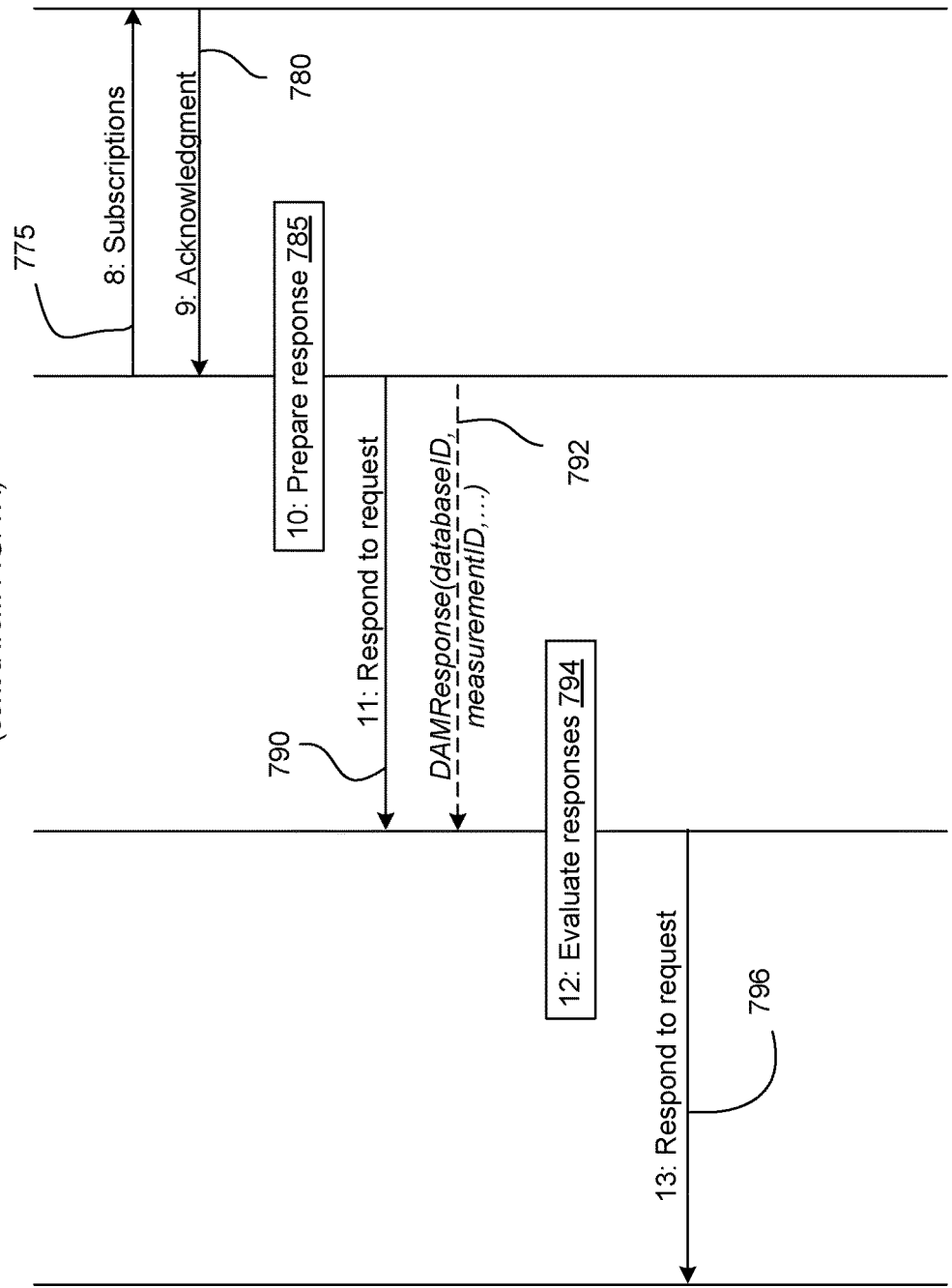

FIGS. 7A and 7B illustrate another signaling exchange for configuring the CSM, according to an embodiment of the present invention. Referring to FIGS. 7A and 7B, the SONAC-COM 700 initiates 720 configuration of CSM 705 by sending CSMConfigRequest; the request may include or be (subsequently) accompanied by details such as: SONAC-COM 700 may send CSMspec(sliceID . . . ) 725 to CSM 705; SONAC-COM 700 may send Log Policy 730 to CSM 705; SONAC-COM 700 may send CSMlogPolicy(locationID, informationID, . . . ) 735 to CSM 705; SONAC-COM 700 may send Report Policy 740 to CSM 705; SONAC-COM 700 may send CSMReportPolicy(informationID, ruleID, . . . ) 745 to CSM 705. As such, the monitoring targets, logging policies, reporting policies, processing operations, and other information directing monitoring operation of the CSM is specified by SONAC-Com. Subsequently, CSM 705 evaluates 750 configurations and policies to decompose them into constituent components and operations. This can include determining data providers, such as DAMs, InfMs, and constituent CSM sub-apparatuses to request data from and what data to request. The CSM 705 accordingly configures (755, 760) the DAM 710, for example by requesting the DAM report defined information according to a defined reporting rule. DAM 710 evaluates 765 configurations to determine the required infrastructure. Alternatively, if the configuration request already includes this information, evaluation is not needed. DAM 710 initiates 770 database creation or association with existing databases, from which required information is to be obtained. DAM 710 subscribes 775 to InfM 715 for data collection therefrom. DAM 710 receives 780 an acknowledgement from InfM 715 in response to the subscription. Based on received acknowledgements and created entities, DAM 710 prepares 785 a response for CSM 705 with IDs of newly created entities, or the ones that sent an acknowledgement. DAM 710 sends 790, 792 the response in a report to CSM 705. CSM 705 evaluates 794 the response from the DAM 710 based on policies and requirements. CSM 705 may also prepare a report for SONAC-Com 700 with the configuration information. CSM 705 responds 796 to the configuration request of SONAC-Com 700 based on (e.g. including) the prepared report.

Figure 8:
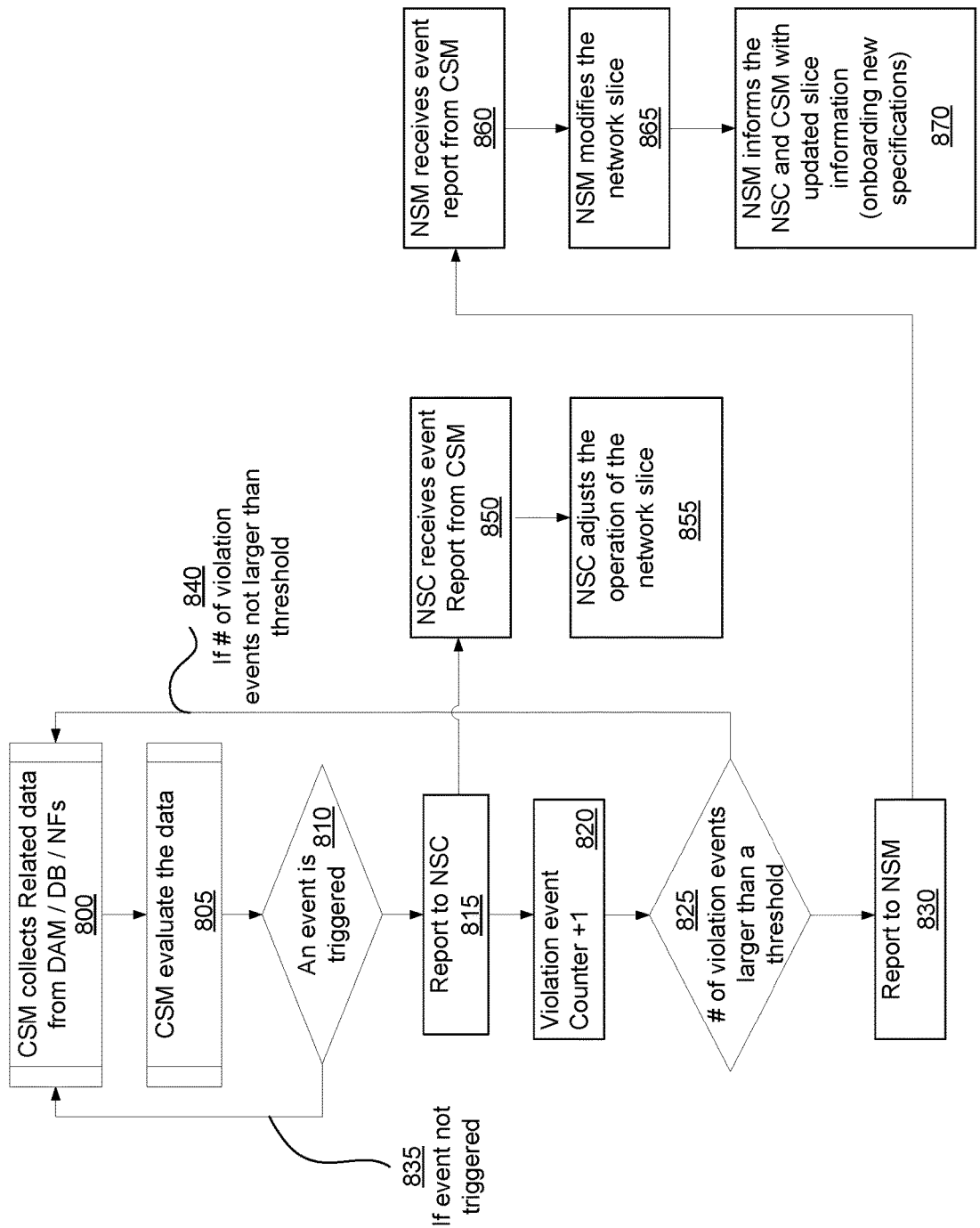
FIG. 8 is an illustration of CSM reporting to a network slice controller (NSC) and a network slice manager (NSM), and subsequent NSC and NSM behavior, according to embodiments of the present invention.

FIG. 8 is an illustration of CSM reporting behavior and NSC and NSM's behavior after receiving a report from CSM. CSM collects 800 performance data from DAM/DB. CSM evaluates 805 the performance/status/user context data. Based on the evaluation, a determination 810 is made as to whether an event is triggered (e.g. if the evaluation yields a numerical result above a threshold). If an event is triggered CSM reports 815 a violation event to NSC. Additionally, a violation event counter is incremented 820. If a determination 825 is made that the violation event counter value is larger than a threshold 825, the violation event is also reported 830 to the NSM. If an event is not triggered, CSM continues 835 to collect related data from DAM/DB 800. If the violation event counter value is not larger than a threshold, CSM continues 840 to collect related data from DAM/DB 800.

The performance data may be indicative of performance of a network slice and/or a communication service (e.g. CSI) provided by the communication network. Performance may be in terms of satisfying one or more metrics such as QoS metrics, ability to perform required tasks and deliver requested services, etc. For example, if delivery of services is deficient relative to a service level agreement, the performance may be deemed deficient from a customer service point of view. An example service level metric is a number (e.g. proportion or percentage) of satisfied users, where a user is satisfied if the user's QoE or QoS requirements (completely or partially) are met as indicated in the agreement between the communication service provider and that user. As another example, if excessive resources (relative to an expected baseline) are required to deliver a service, the performance may be deemed deficient from an operational and network management point of view.

Further referring to FIG. 8, when CSM reports 815 the violation to NSC, NSC receives the event report from CSM 850. NSC then adjusts 855 the operation of the network slice in an attempt to mitigate the event.

Further referring to FIG. 8, when CSM reports 830 the violation to NSM, NSM receives 860 an event report from the CSM. NSM then modifies 865 the network slice. NSM also informs 870 the NSC and CSM with updated slice information (onboarding new specifications). In this way, the CSM monitors for violations, and first prompts the NSC to address the underlying problem. If the NSC does not adequately address the underlying problem and the violations persist, the CSM detects this via repeated violations and escalates the reporting to the NSM. Alternatively, the CSM may predict or obtain one or more predictions from DAM entities indicating possible violation or network performance deficiency, or another triggering condition may be satisfied, e.g., an alarm is received (event trigger). The NSM may have more latitude to address the underlying problem by adjusting the network slice itself, rather than adjusting operation of the network slice only. For example, the NSM can adjust factors such as amounts of resources allocated to the network slice. In contrast, the NSC may only be able to adjust how a fixed allocation of resources is used by the network slice.

In some embodiments, and in support of the above, the NSM/NSC creates a monitoring job at the CSM. According to the policy and network/slices/users information, the CSM collects required data, such as performance measures from the DAM. If the monitoring job is event-triggered, the CSM compares the data, for example performance/status/QoS, with the thresholds pre-defined in the monitoring policy. When a violation event happens, the CSM reports the event with corresponding data to the NSM/NSC system and stores the event with data in a DB. If the monitoring job includes streaming results (i.e. the monitoring job is to provide predetermined data to the CSM on an ongoing basis), the CSM reports the corresponding data to the NSM/NSC system and stores the data in a DB. If the NSM/NSC terminates the monitoring job, the procedure ends. If not, the CSM keeps monitoring the performance/status/QoS.

Further as represented for example in FIG. 8, embodiments of the present invention provide for a combined dual-loop network slice control and management. In an inner control loop, the CSM reports information to the NSC, which responds by attempting to address problems by controlling operations under its purview, such as usage (e.g. rebalancing) of already-allocated resources. This can include, for example, adjusting traffic routing, adjusting admission control, and adjusting associated policies. In an outer control loop, if the NSC fails to adequately address a problem in a given number of iterations or after a given time, the CSM reports information to the NSM, which responds by attempting to address the problems instead. The NSM may, for example, adjust overall resources allocated to the network slice. Events which cause triggers (event-based triggers) in FIG. 8 can be time-based events, measurement-based events, evaluation results-based events, performance-based events, or other events indicative or reflective of undesired network slice circumstances.

Operation of the CSM can include the following. The CSM receives and configures slice policy and SLA parameters. Next, the CSM implements network slice performance monitoring, for example by invoking one or more DAM functions. Next, if a first trigger condition is met, a first event report is sent to the NSC. The NSC takes action, if possible, to attempt to address a negative performance issue underlying the first trigger condition. The CSM then performs further monitoring. If the first trigger condition is still met after the NSC taking action a predetermined number of times (e.g. once, twice, etc.) or a predetermined time after the NSC taking action, a second trigger condition is determined to exist, and a second even report indicative of the condition is sent to the NSM. The NSM takes action, if possible, to attempt to address the negative performance issue. Actions can include resource control/modification and informing the CP.

It is noted that trigger conditions can incorporate (be combined from) multiple sub-conditions in different ways.

For example, a trigger condition can be satisfied if two or more sub-conditions exist concurrently (logical AND), or if two or more alternative sub-conditions exist (logical OR), or a combination thereof.

Figure 9:
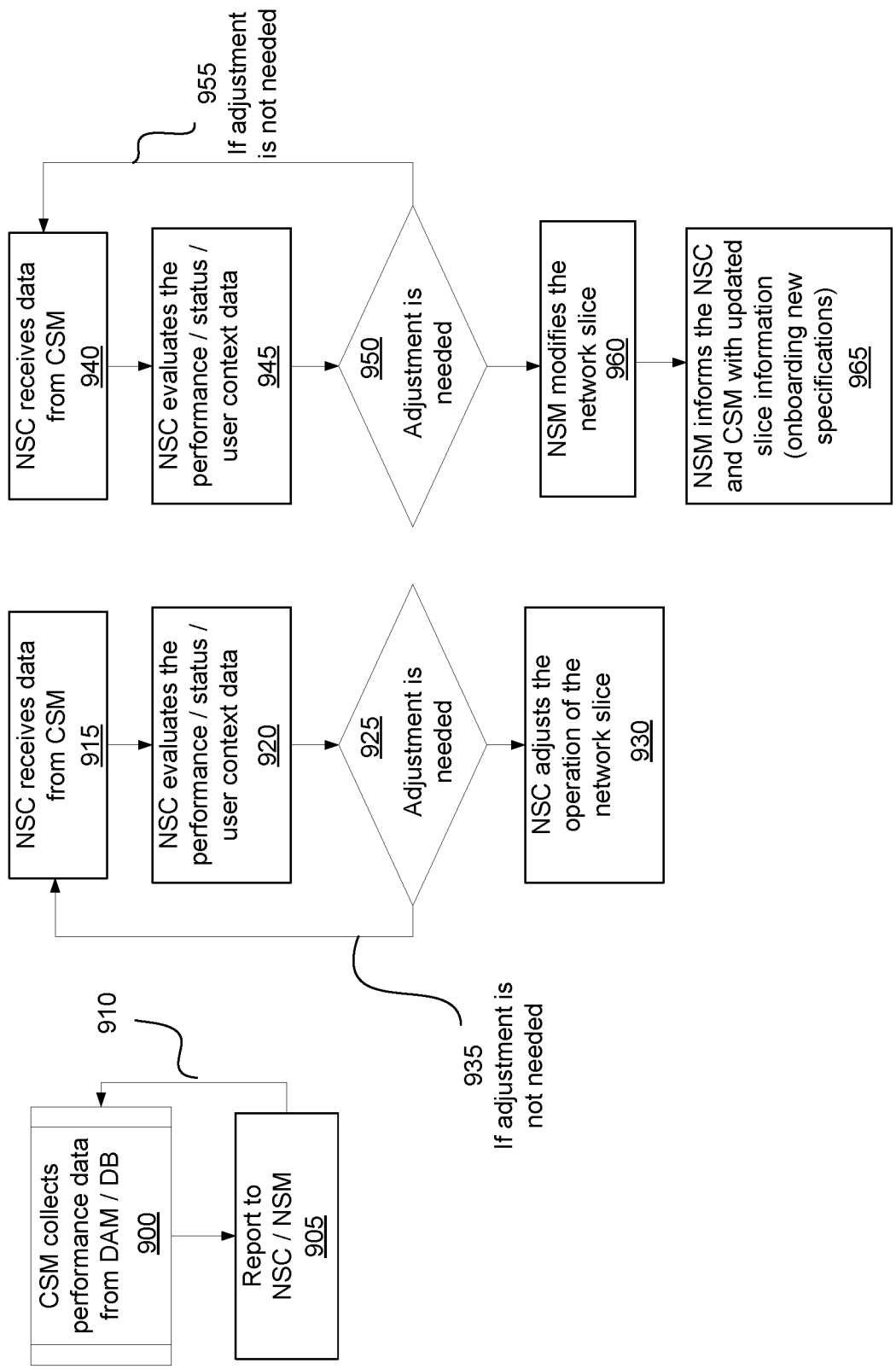
FIG. 9 is another illustration of CSM reporting to a network slice controller (NSC) and a network slice manager (NSM), and subsequent NSC and NSM behavior, according to embodiments of the present invention.

FIG. 9 is an illustration of CSM, NSC and NSM's behavior according to another embodiment. The CSM collects 900 performance data from the DAM/DB and reports 905 to the NSC/NSM. The collection and reporting may be as already described above. The CSM continues 910 to (e.g. periodically) collect 905 performance data from the DAM/DB and report 905 it to the NSC/NSM until a stopping condition is reached.

Further referring to FIG. 9, the NSC receives 915 data from the CSM via the reports. The NSC then evaluates 920 the performance/status/user context data. If a determination 925 indicates that adjustment of network slice operations is required, the NSC adjusts 930 the operation of the network slice. If such adjustment is not needed 935, the NSC continues to another round of receiving 915 data from the CSM 915.

Further referring to FIG. 9, the NSM also receives 940 data from CSM. The NSM evaluates 945 the performance/status/user context data. If a determination 950 indicates that adjustment of the network slice is required, the NSM modifies 960 the network slice. The NSM informs 965 the NSC and the CSM regarding the updated slice information (on-boarding new specification). If such adjustment is not needed 955, the NSM continues to another round of receiving 940 data from the CSM.

Figure 10:
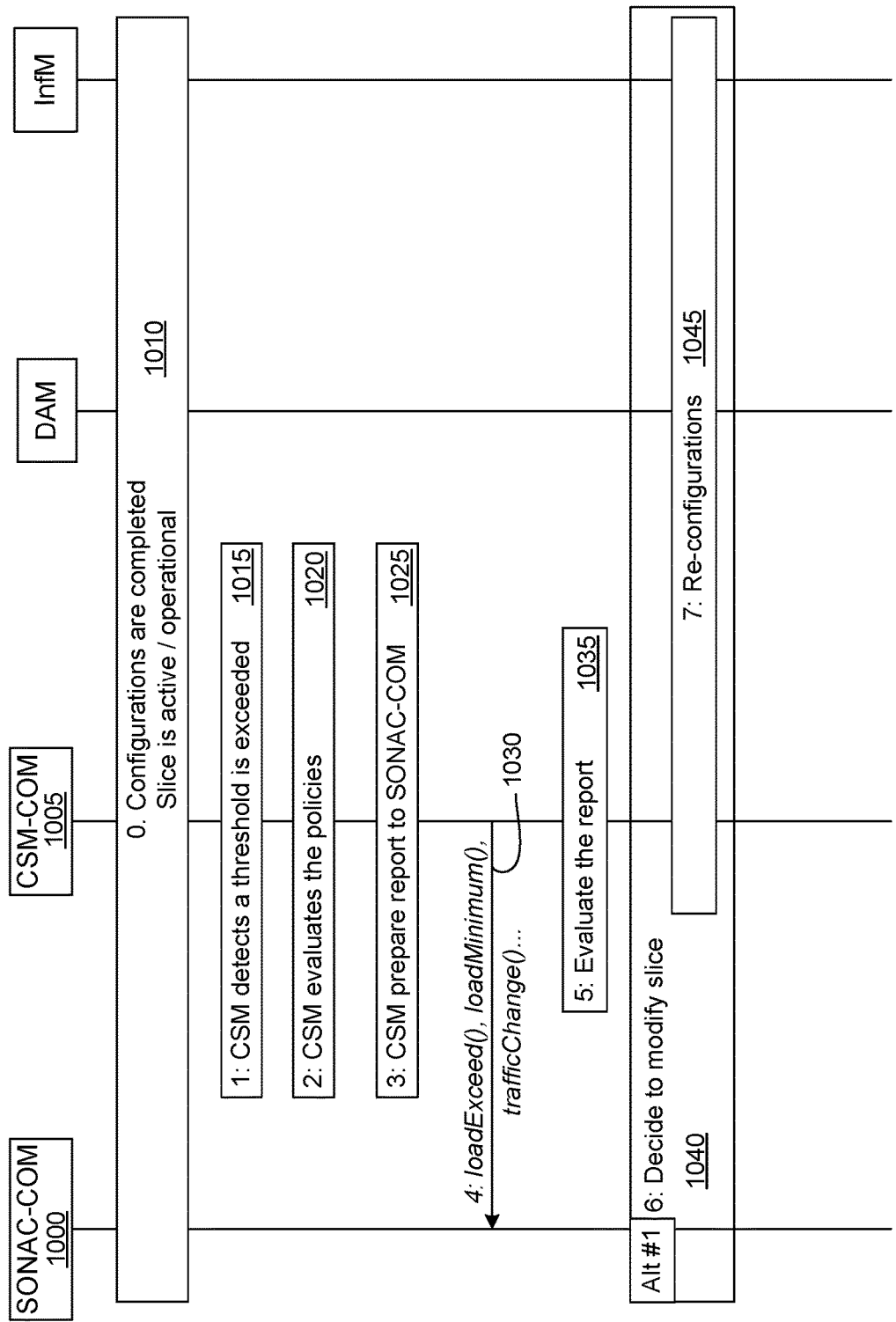
FIG. 10 is an illustration of CSM operations and network component signaling exchange related to monitoring job reporting, according to embodiments of the present invention.

FIG. 10 is an illustration of signaling exchange of monitoring job reporting operations according to another embodiment. Initially, it is assumed that monitoring and operating configurations are complete and the subject network slice is active/operational 1010. The CSM subsequently detects 1015 (due to monitoring operations) that a threshold is exceeded for a monitored performance parameter. The CSM evaluates 1020 its monitoring policies and, when the monitoring policies dictate, prepares 1025 a report to SONAC-COM 1000. The CSM 1005 then sends 1030 a reporting message, e.g. including fields such as loadExceed( ), loadMinimum( ), trafficChange( ) . . . to SONAC-COM 1000. CSM 1005 may also evaluate 1035 the report. Based on the report, SONAC-COM 1000 may be triggered 1040 to modify the network slice. Slice re-configuration occurs 1045 subsequently.

Embodiments of the present invention comprise creating, transmitting, receiving and processing configuration instruction messages. An entity such as an NSM, NSC, SONAC, higher-level CSMs, or other entity (instantiated as a networked computing device) in the network can create, configure and transmit such a message in order to initiate a desired monitoring. One or more CSMs receive and process the message to establish and perform the required monitoring operations based on the message. The format of the configuration instruction message, including its fields, are described with examples below.

FIG. 11 is an illustration of a general format of a message for communicating a monitoring policy, e.g. to a CSM for implementation. The message for communicating a monitoring policy may include: F1 1100, the monitoring type field; F2 1105, the agent ID field; F3 1110, the monitoring trigger condition field; F4 1115, the network component indicator field; F5 1120, the reporting type field; and F6 1125, the customizable value field. The F6 1125, the customizable value field, may have subfields including: F6-1 1130, the analyze method field; F6-2 1135, the collect method field; F6-3 1140, the report frequency field; F6-4 1145, the threshold field; F6-5 1150, the triggered reporting condition field; and F6-6, the reserved field. It should be noted that not all the fields are required for a monitoring job. According to different monitoring jobs, some fields can be omitted if the values are by default set in CSM or the network.

Briefly, the Monitoring Type field indicates a particular attribute of the communication network to be monitored. The Agent ID field indicates of a particular object of the communication network to be monitored and optionally a particular level of the communication network at which monitoring is to be performed. The Monitoring Trigger Condition field indicates conditions under which the network monitoring operations are to begin. The Network Component Indicator field indicates a particular part or group of particular parts of the communication network to be monitored, for example, a radio access sub-network, a sub-network, a backhaul sub-network. The Network Component Indicator may also indicate a particular device or a group of particular devices, for example a gNB, a base station, a logical link, of the communication network at which monitoring is to be performed. Other aspects that may be monitored may relate to the data provider network devices which may be queried directly or indirectly by the CSM apparatus as part of the network monitoring operations. The Reporting Type field indicates of one or more of: a recipient to be informed by the CSM apparatus of results of the network monitoring operations; conditions under which the results of the network monitoring operations are to be reported by the CSM apparatus; and a manner in which the results of the network monitoring operations are to be reported by the CSM apparatus. The Analyze Method field indicates a method of data analysis to be performed by the CSM apparatus or a subordinate apparatus as part of the network monitoring operations. The Collect Method field indicates a method of requesting data by the CSM apparatus or a subordinate apparatus as part of the network monitoring operations. The Report Frequency field indicates a time frequency at which results of the network monitoring operations are to be periodically reported when time-triggered reporting is implemented. The Threshold field indicates a threshold value at which reporting of the results of the network monitoring operations is triggered when event-triggered reporting is implemented. The Report Condition or Trigger Condition field indicates a condition to be evaluated by the CSM apparatus for triggering reporting of the results of the network monitoring operations, when event-triggered reporting is implemented.

It is noted that content of some of the fields may be interpreted based at least partially on content of another one or more of the fields. That is, the meaning of a value carried in a given field may depend on the value carried in another given field. This allows the configuration instruction message fields to be context-based, thus allowing for fewer fields, because some fields can be re-used for different purposes.

Referring to FIG. 11, the monitoring type field 1100 is used to indicate the metric/data/KPI/status that NSM/NSC/$3^{rd}$ party wants CSM to monitor. By using the value in this field, the CSM is able to request corresponding data, such as data rate of a unique user or the distribution of the users, from data providers, which may include DB, DAM, OAM. That is, the CSM configures its data acquisition and processing operations to acquire and process the data relevant to the monitoring task. Request messages containing the parameters (generated based on the content of the monitoring type field) that the CSM wants to measure are generated by the CSM to send to data providers. One monitoring type may be decoupled to multiple measurement parameters if needed. That is, the CSM may generate multiple request messages sent to different data providers to collect multiple pieces of information to process to generate the desired measurements. The Monitoring Type field may be 8 bits. Example values for this field may include values indicative of the following monitoring types: latency; Data rate; Packet drop rate; queuing delay; slice throughput; slice RB; link congestion; block rate; number of users; NE overall remaining resource such as computation resources, wireless resources/bandwidth; NE throughput.

The agent ID 1105 field is used to indicate the object of this monitoring job, which may include, for example: the ID of an end-to-end (E2E) network; ID of a slice; ID of a user or a group of users; ID of a traffic flow; ID of a PDU session, etc. By using this value, the CSM is able to identify the object for tracking. This value also helps the CSM to identify, for example, the corresponding DB, DAM or OAM to receive the measurement/analytical request. If, for example, data needs to be retrieved from a DB, DAM or OAM, the CSM may use this value as the index for accessing and retrieving the DB or requesting measurement jobs from DAM or OAM.

The monitoring trigger condition field 1110 is used to indicate conditions under which the monitoring should start. For example, this field can indicate a specific monitoring start time or an event such as, the traffic arrives at the network; or a message is sent from an entity. The CSM configures monitoring operations so that they begin when the trigger condition is satisfied.

The network component indicator field 1115 is used to indicate the network area, part, domain of interest, i.e. to be monitored. Based on this value, the CSM is configured to, for example, identify the monitored area from which to request measurements from DAM or OAM devices thereof and retrieve data from DBs thereof. This value may also help the CSM to, for example, identify the corresponding DB, DAM or OAM to query to obtain the measurements/analysis results, or other data. This field may have two sub-fields that are segment type and segment ID. Example values of the first sub-field may include values indicative of: network ID, subnet ID, slice ID, NF ID, Link ID, [ID, ID]. It should be noted, if the monitored area is comprised of multiple components of the network, end points IDs may be necessary. Network Component Indicator has one or more functions that may include: indicating the segment or particular parts, for example, one or more network functions and devices, of the network; the measurement or performance data of those particular parts may be recorded and stored by corresponding entities, for which, the Network Component Indicator may be used to locate those entities for the purposes of requesting or accessing data.

The reporting type field 1120 is used to indicate the type of report that the CSM is to provide. This field may also indicate the report receiver (designated recipient of the report), if the receiver is different from the monitoring job creator. For example, the OAM system may create a latency monitoring job for a specific traffic and requires the CSM to report the events to control plane functions. The types of report may be event-triggered, time-triggered, or a combination thereof. In some embodiments, for an event-triggered report, the CSM reports a monitoring event to NSM/NSC/$3^{rd}$ party if the value or status of the monitored object violates a pre-defined condition. In some embodiments, for a time-triggered report, the CSM reports a monitoring event to NSM/NSC/$3^{rd}$ party at a pre-defined frequency, for example, once per second. It should be noted that a CSM job can be event-triggered and time-triggered at the same time.

The customizable value field 1125 is used to indicate the policy of this monitoring job. Based on contents of this field, the CSM is configured to understand the methodology of the monitoring job and generate the report. In some embodiments, this field can have six sub-fields.

The analyze field 1130 is used to indicate the methodology to be used by the CSM (or other related entities) in analyzing the data. It should be noted that if the function of analyzing is implemented in analytical service providers such as DAM or OAM or other functions, this value may be used by CSM to indicate the analyzing method to the analytical service providers. That is, the CSM may base its instructions to the analytical service providers based on the analyze field. If CSM has its own analytical function, this value is used to configure the methodology of analyzing the data by the CSM. Types of analyzing methods may include, for example: sampling, filter, derivation, classification, and regression. An example of the sampling type of the analyzing methodology may include sampling the data with a certain time interval or sampling frequency. Examples of the filter type of the analyzing methodology may include determining maximum, minimum, or both maximum and minimum values of an observed characteristic at a certain time such as when traffic arrived or at 10:00 pm. An example of the derivation type of analyzing methodology may include computing a mean and standard variance. Examples of the classification type of analyzing methodology may include classifying traffic type components as normal or abnormal. Examples of the regression type of analyzing methodology may include: determining aspects of a certain (statistical) distribution, or determining a trend (increase, decrease with variables) in obtained time-series data. As such, monitoring results can be reported as a statistical distribution (or as defining parameters of a predetermined type of statistical distribution), or as a trend in network-descriptive variables (e.g. trends over time, geography, etc.) or a combination thereof.

The collect method field 1135 is an optional field which may be used to indicate the method of requesting data. The value conveyed by this field helps the CSM determine the appropriate method to use to obtain the data. For example, the value can indicate an OAM, DB, or other function to obtain the data from. If this field is blank, default or pre-defined collection methods can be applied.

The report frequency field 1140 is an optional field which may be used to indicate the periodicity to use for repeatedly reporting event data. In some embodiments, the value in this field is only valid or relevant when time-triggered report type is selected.

The threshold field 1145 is an optional field which may be used to indicate the threshold of triggering an event. When specified processing operations produce a value above the threshold, an event is triggered. The event may cause the CSM to transmit a report of a violation condition to another device. By using this value, the CSM compares the collected and analyzed data with the indicated threshold. in some embodiments, the value in this field is only valid or relevant when the event-triggered report type is selected. The interpretation of this field depends on the monitoring type. Some examples of thresholds may include: 5 ms for maximum latency; 10 Mbps for average data rate; 5% of blocking rate for network slice load; 0.2 ms queuing delay for link congestion; number of users for base station load; 100 Mbps (average throughput of a slice, for slice KPI).

The triggered reporting condition field 1150 is an optional field which may be used to indicate the condition of triggering an event. The field can be referred to as a report condition field or a trigger condition field. By using this value, the CSM is able to detect if an event (e.g. threshold violation event) is happening or not. If an event is detected, the CSM may send a report/alarm/message to corresponding entities indicated in the reporting type field. The types of conditions may be hard and soft. The hard condition means that an event will be triggered once a condition violation happens. Examples of hard conditions may include when threshold is violated such as: user E2E latency is larger than the threshold; NF load is larger than the threshold; a congestion report is received; slice load exceeds the threshold; the parameters of a distribution do not match the threshold. Other examples of hard conditions may include predefined trigger such as: an unknown packet arrives; an unknown trend of network performance/status or users behavior/distribution/locations are detected.

The soft condition means that an event will be triggered once a condition violation happens a certain predetermined number of times or the condition violation persists for a certain predetermined length of time. Examples of soft condition may include when threshold is violated such as: user E2E latency is larger than the threshold for 10 seconds; NF load is larger than the threshold for one hour; the number of the same congestion reports is reached a threshold; slice load exceed the threshold for a day; the parameters of a distribution do not match the threshold for an hour. Other examples of soft condition may include predefined trigger such as: the number of unknown packet arrives has reached a threshold; an unknown trend of network performance/status or users behavior/distribution/locations are detected for one hour.

Since charging in networks is normally based on monitoring, for example based on usage, duration, application types, user types and traffic type, FIG. 11 and related methods mentioned in the embodiments above are applicable for the purposes of charging. There can be various charging strategies that are applicable to UEs, slice instances, or network elements. Charging strategies may include: per usage, quota based, online, offline. Examples of per usage may include: static and feedback (cooperate with user). Examples of quota based may include: static, active (based on network load/remaining resources), and feedback (cooperate with user).

Referring to FIG. 11, the reserved field is an optional field which may be is reserved for other future usage.

Embodiments of the present invention may relate to the requesting, collecting and retrieving of data (information) from data (information) providers by using the information provided by the monitoring policy. Various solutions supporting this are described below. (Refer to FIG. 4 where a monitoring job is created by NSM/NSC.) Certain embodiments in which the CSM operates to obtain (collect) data from data provider network devices (also referred to as data service providers), based on an instructed monitoring job, are described below.

By using the network component indicator in the configuration instruction message, the CSM identifies the specific data service providers from which data is to be obtained. This identification may include one or multiple type of operations: (1) If a data provider entity such as NF, DAM, OAM, or DB can directly provide the required data of the indicated network component, CSM can send a request to such an entity; (2) If the indicated network component is comprised of multiple components and at least two of them require different entities, such as NF, DAM, OAM, DB, to collect/provide the data, the CSM may to identify and send request to all required entities. In other words, the CSM can identify multiple data providers holding different parts of the required data, collect data from each of the multiple data providers, and combine or process together the collected data.

To collect the performance measurement or metrics or status indicators, the CSM may be configured to generate messages with appropriate attribute contents to request information from data providers such as NF, DAM, OAM, DB. To facilitate this, the following operations may be performed by the CSM.

The measurement types can be mapped or decoupled to, for example, the performance or KPI or metrics that can be collected from data providers. The CSM may identify the performance or KPI or metrics that can be collected from data providers. This identification may include one or multiple types of operations, such as mapping and decoupling operations. In mapping operations, the CSM may map the monitoring type to the measurement or metric(s) that is (are) supported by the data providers. For example, the traffic load (unitless) may be mapped to link usage (having units such as bits per second (bps)). In decoupling operations, the CSM may decouple the monitoring operation into multiple measurement or monitoring sub-operations. For example, a QoS monitoring operation may be decoupled to latency and data rate monitoring sub-operations. The results of the sub-operations can be combined prior to reporting.

By using the agent ID field of the configuration instruction message, the CSM can indicate the object, such as a UE, a traffic flow, a slice, an application, to the data provider devices. The data provider devices may then return data specifically related to this indicated object.

Generally speaking, the network component indicator field of the configuration instruction message indicates the service providers. When the CSM sends the message to the identified data provider(s), for example OAM and DB, the monitoring type and agent ID are used to generate the attribute contents of the message.

Figure 12:
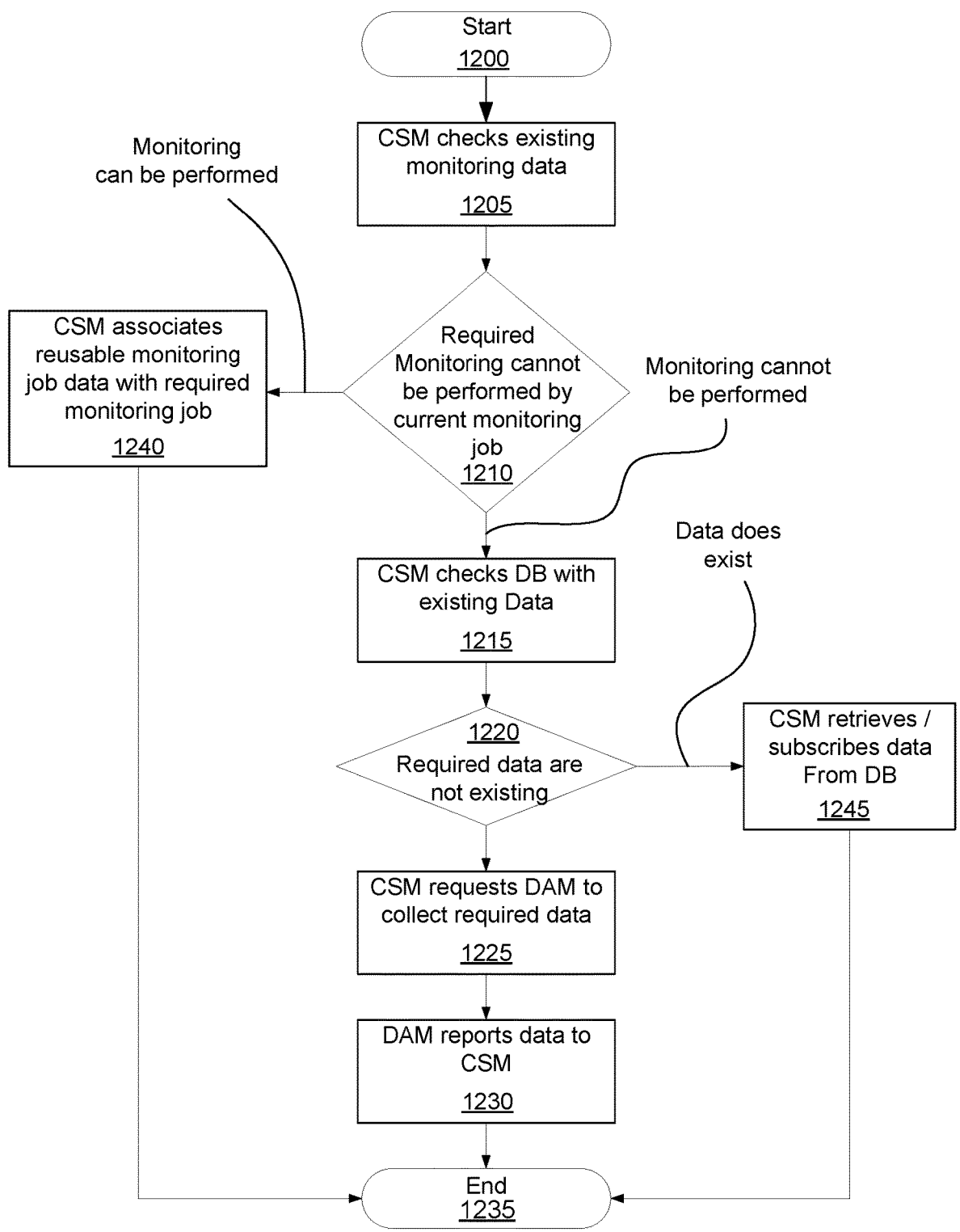
FIG. 12 is an illustration of data collection operations by a CSM, according to embodiments of the present invention.

FIG. 12 is an illustration of data collection operations performed by the CSM, according to an embodiment of the invention. Following start 1200 of data collection (e.g. in response to a trigger), CSM checks existing monitoring data 1205. Where a determination 1210 indicates that the required monitoring cannot be performed by the current monitoring job 1210, CSM checks a DB with existing data 1215. Where a determination 1220 indicates that the required data does not exist in the DB, CSM requests 1225 a DAM to collect the required data. The DAM subsequently reports the data to CSM, and data collection configuration ends 1235.

According to embodiments, where the determination 1210 indicates that required monitoring can be performed by current monitoring job 1210, the CSM associates 1240 reusable monitoring job data with the required monitoring job, and data collection configuration ends 1235. That is, if data is already being retrieved by the CSM which is sufficient to complete the monitoring job, the CSM can re-use this data without making any new requests to obtain additional data from data provider devices.

Referring still to FIG. 12, when the determination 1220 indicates that the required data does exist in the DB, CSM retrieves 1245 the data from the DB or subscribes to the DB to obtain the data from the DB, and data collection configuration subsequently ends 1235. That is, if an already subscribed-to or connected-to database has the required data, the CSM does not have to search elsewhere for the subscribed data, but simply retrieves it from the database.

Figure 13:
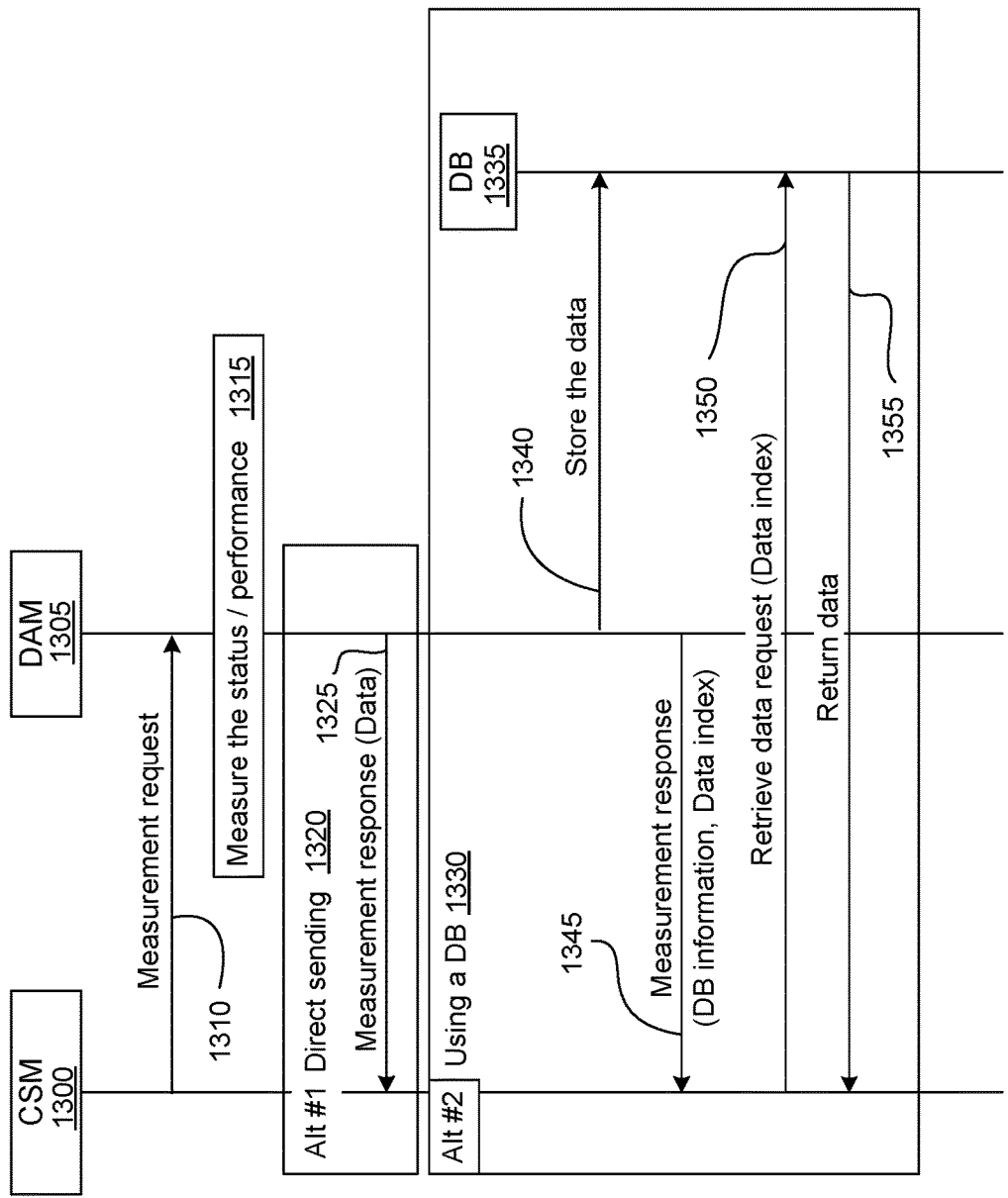
FIG. 13 is an illustration of the signaling exchange for data acquisition, by a CSM from a data analytics management (DAM) function, according to embodiments of the present invention.

FIG. 13 is an illustration of signaling exchange for requesting and obtaining data as initiated by the CSM, according to an embodiment of the present invention. In this embodiment, CSM 1300 sends 1310 a measurement requests to DAM 1305. In response, DAM 1305 measures 1315 the status/performance of an entity or aspect indicated in the measurement request.

Referring to FIG. 13, in some cases a direct sending alternative 1320 can be used. In this case, DAM 1305 sends 1325 a measurement response, including the relevant measured data, to CSM 1300 in response to the request 1310.

In some cases, a database utilization alternative 1330 can be used. In this case, DAM 1305 stores 1340 the relevant measured data in a DB 1335 in response to the request 1310. DAM 1305 also sends 1345 a measurement response to CSM 1300. This response includes the database location information and an index of the database usable for retrieving the measured data therefrom. CSM then sends 1350 a Retrieve data request (including the data index) to the DB 1335. DB 1335 responds by returning 1355 the corresponding data at the index location to CSM 1300.

In more detail and with further reference to the embodiment illustrated in FIG. 13, by using the configuration information, (the information being configured by NSM and delivered by the NSM/NSC), the CSM can locate the responsible DAM and send measurement requests to the DAM. The DAM may send a response back to confirm the request. The request may contain some or all of the following information to instruct the DAM to measure the corresponding data (performance or status or behaviors): data type, which may refer to policy format; time intervals, which may refer to policy format; measurement methods; analytical method, which may refer to policy format; etc. Examples of data type may include: latency, throughput, load, user distribution, traffic pattern. An example of time intervals may include a reporting frequency.

The above information can be configured at the DAM in advance (this may be a default setting). To return the requested measurement, the DAM may have two options, as shown in FIG. 13. One option is to return the measurement directly to CSM. Another option is to store the measurements at a DB and return the DB information including data index to CSM so that CSM can use them to retrieve data from the DB.

In some embodiments, the interface exposed by CSM can be used for operations that may include some or all of: CSM configuration; specification onboarding; monitoring policy onboarding; monitoring job creation; monitoring job modification; monitoring event reporting; monitoring data reporting; monitoring data/event query; monitoring data storage; and monitoring job termination.

By using the CSM configuration interface, a slice manager, such as the SONAC-Com, can configure the CSM with the following information: access information (ID, network ID); Security level; Connection.

Figure 14:
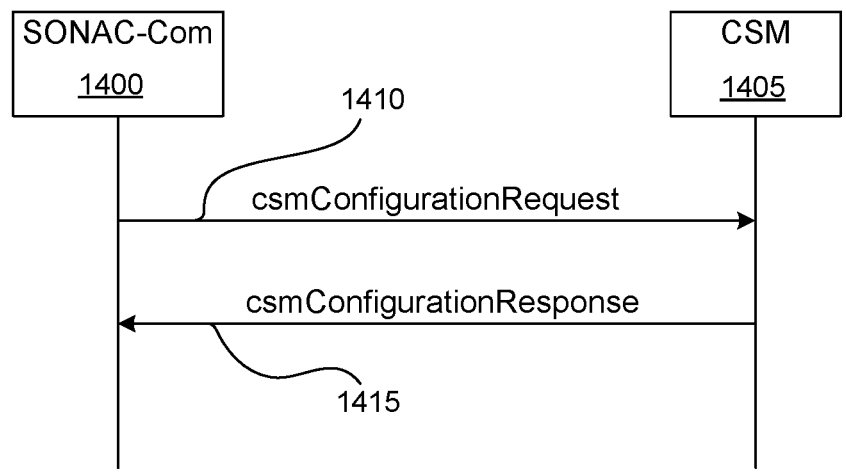
FIG. 14 is an illustration of the signaling exchange for CSM configuration, involving a Service-Oriented (Virtual) Network Auto-Creation for Slice Composition (SONAC-Com) device, according to embodiments of the present invention.

FIG. 14 is an illustration of the signaling exchange for CSM configuration. SONAC-Com 1400 sends csmConfigurationRequest 1410 to CSM 1405. CSM 1405 sends csmConfigurationResponse 1415 to SONAC-Com 1400.

Table 1 provides information on the message, requirement, and direction for CSM configuration. The "Message" indicates the name signaling send by the entity. The "Requirement" and the "Qualifier" means that this message is necessarily to perform the required job. "Direction" indicates the sender and the receiver of the message. This description is applicable to all tables as follows. A message named csmConfigurationRequest is transmitted from SONAC-Com to CSM. csmConfigurationRequest is a message that is used to request for a CSM configuration. A response named csmConfiguationResponse is transmitted by CSM to SONAC-Com to notify SONAC-Com that CSM has received SONAC-Com's configuration message. When SONAC-Com requests a CSM configuration, these messages are mandatory and thus which function can be realized and which technical effect can be achieved.

TABLE 1

| Message | Requirement | Direction |
| --- | --- | --- |
| csmConfigurationRequest | Mandatory | SONAC-Com -> CSM |
| csmConfigurationResponse | Mandatory | CSM -> SONAC-Com |

Table 2 provides information on the input parameters for CSM configuration. For example, the AccessInformation information in Table 2 can be understood as follows. AccessInformation is transmitted by SONAC-Com to CSM as a part of CSM's configuration. The content of AccessInformation is a string of characters with qualifier M and cardinality 1. The "Cardinality" indicates the number of values. The "Content" indicates the format or a pre-defined data type. This description is applicable to all tables.

TABLE 2

| Parameter | Qualifier | Cardinality | Content | Description |
| --- | --- | --- | --- | --- |
| AccessInformation | M | 1 | string | The access information of the CSM |
| SecurityLevel | M | 1 | string | The security level of the CSM |
| Connection | M | 1 | string | The connectivity of the CSM |

Table 3 provides information on the output parameters for CSM configuration. For example, the ConfigarationResponse information in Table 3 can be understood as follows. ConfigarationResponse is transmitted by CSM to SONAC-Com as a part of CSM's configuration. ConfigarationResponse is a response to the CSM configuration request with qualifier M and cardinality 1.

TABLE 3

| Parameter | Qualifier | Cardinality | Content | Description |
| --- | --- | --- | --- | --- |
| ConfigarationResponse | M | 1 | response | |

By using the CSM specification onboarding interface, a slice manager, such as the NSM, the SONAC-Com, can onboard the CSM with some or all of the following specifications: network slice (NS) specification; user equipment (UE) specification; database (DB) specification; data analytics function (DAM) specification. Network slice specification may include: slice topology, requirements, resource information (infrastructure). User equipment specification may include: subscribed services identification information; subscribed services requirements. Database specification may include: access method, location, authorization information. Data analytics function specification may include: DAM connectivity information, access methods, authorization information.

Figure 15:
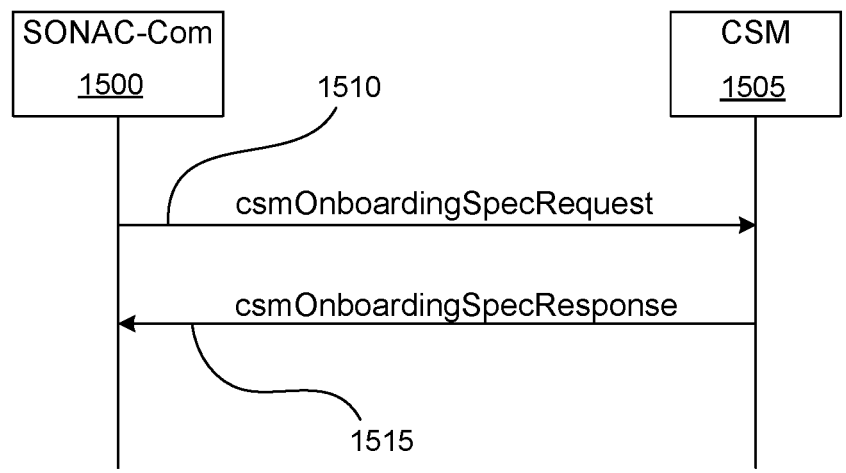
FIG. 15 is an illustration of the signaling exchange for CSM specification onboarding, according to embodiments of the present invention.

FIG. 15 is an illustration of the signaling exchange for specification onboarding. SONAC-Com 1500 sends csmOnboardingSpecRequest 1510 to CSM 1505. CSM 1505 sends csmOnboardingSpecResponse 1515 to SONAC-Com 1500.

Table 4 provides information on the message, requirement, and direction for specification onboarding. A message named csmOnboardingSpecRequest is transmitted from SONAC-Com to CSM. csmOnboardingSpecRequest is a message that is used to request specification onboarding. A response named csmOnboardingSpecResponse may be transmitted by CSM to SONAC-Com to notify SONAC-Com that CSM has received a specification onboarding request message. When SONAC-Com request specification onboarding, these messages are mandatory and thus which function can be realized and which technical effect can be achieved.

TABLE 4

| Message | Requirement | Direction |
| --- | --- | --- |
| csmOnboardingSpecRequest | Mandatory | SONAC-Com -> CSM |
| csmOnboardingSpecResponse | Mandatory | CSM -> SONAC-Com |

Table 5 provides information on the input parameters for specification onboarding. For example, the NsSpecification information in Table 5 can be understood as follows. NsSpecification is transmitted by SONAC-Com to CSM as a part of specification onboarding. The content of NsSpecification is a Spec. with qualifier M and cardinality 1 ... M. "Spec" is the profile, such as of a NS, UE, Data Base and the DAM. NsSpecification is used for describing a network slice.

TABLE 5

| Parameter | Qualifier | Cardinality | Content | Description |
| --- | --- | --- | --- | --- |
| NsSpecification | M | 1 ... M | Spec. | The profile of a network slice |
| UeSpecification | O | 1 ... M | Spec. | The profile of a UE |
| DbSpecification | M | 1 ... M | Spec. | The profile of a DB |
| DamSpecification | M | 1 ... M | Spec. | The profile of a DAM |

Table 6 provides information on the output parameters for specification onboarding. For example, the csmOnboardingSpecResponse information in Table 6 can be understood as follows. csmOnboardingSpecResponse is transmitted by CSM to SONAC-Com as a part of specification onboarding. The content of csmOnboardingSpecResponse is a response with qualifier M and cardinality 1.

TABLE 6

| Parameter | Qualifier | Cardinality | Content | Description |
| --- | --- | --- | --- | --- |
| csmOnboardingSpecResponse | M | 1 | response | | csmOnboardingPolicyRequest 1610 to CSM 1605. CSM 1605 sends csmOnboardingPolicyResponse 1615 to SONAC-Com 1600.

Table 7 provides information on the message, requirement, and direction for monitoring policy onboarding. A message named csmOnboardingPolicyRequest is transmitted from SONAC-Com to CSM. csmOnboardingPolicyRequest is a message that is used to request policy onboarding. A response named csmOnboardingPolicyResponse may be transmitted by CSM to SONAC-Com to notify SONAC-Com that CSM has received a policy onboarding request message. When SONAC-Com request policy onboarding, these messages are mandatory and thus which function can be realized and which technical effect can be achieved.

TABLE 7

| Message | Requirement | Direction |
| --- | --- | --- |
| csmOnboardingPolicyRequest | Mandatory | SONAC-Com -> CSM |
| csmOnboardingPolicyResponse | Mandatory | CSM -> SONAC-Com |

Table 8 provides information on the input parameters for monitoring policy onboarding. For example, the MonitoringPolicy information in Table 8 can be understood as follows. MonitoringPolicy is transmitted by SONAC-Com to CSM as a part of policy onboarding. The content of MonitoringPolicy is a Spec. with qualifier M and cardinality 1.

TABLE 8

| Parameter | Qualifier | Cardinality | Content | Description |
| --- | --- | --- | --- | --- |
| MonitoringPolicy | M | 1 | Spec. | The monitoring policy described in FIG. 11 |

Table 9 provides information on the output parameters for monitoring policy onboarding. For example, the csmOnboardingPolicyResponse information in Table 9 can be By using the CSM monitoring policy onboarding interface, a slice manager, such as the SONAC-Com, can onboard the CSM with one or multiple monitoring policy for NS(s) or UE(s).

Figure 16:
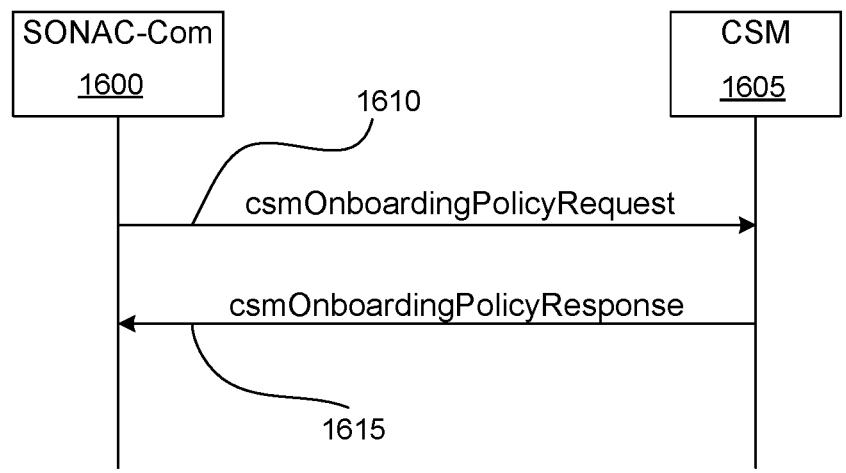
FIG. 16 is an illustration of the signaling exchange for CSM monitoring policy onboarding, according to embodiments of the present invention.

FIG. 16 is an illustration of the signaling exchange for monitoring policy onboarding. SONAC-Com 1600 sends understood as follows. csmOnboardingPolicyResponse is transmitted by CSM to SONAC-Com as a part of specification onboarding. csmOnboardingPolicyResponse is a response with qualifier M and cardinality 1. csmOnboardingPolicyResponse is transmitted when all CSM configuration operations have been completed.

TABLE 9

| Parameter | Qualifier | Cardinality | Content | Description |
|---|---|---|---|---|
| csmOnboardingPolicyResponse | M | 1 | response | All Configurations are completed |

Figure 17:
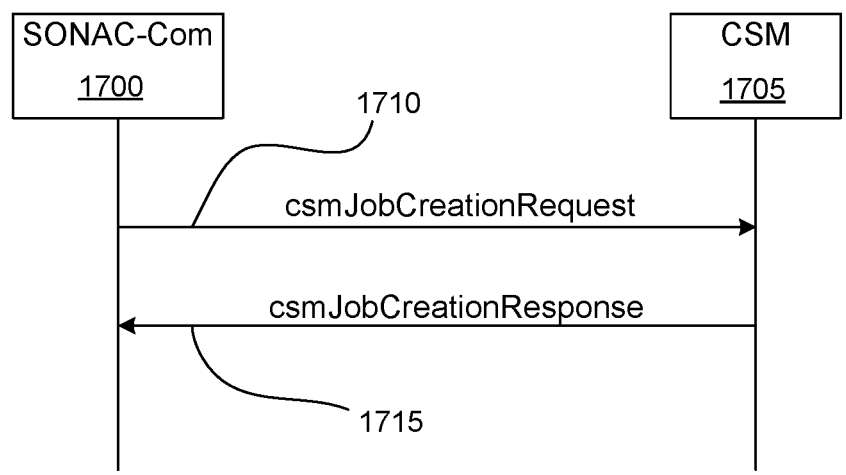
FIG. 17 is an illustration of the signaling exchange for CSM monitoring job creation, according to embodiments of the present invention.

FIG. 17 is an illustration of the signaling exchange for monitoring job creation. SONAC-Com 1700 sends csmJobCreationRequest 1710 to CSM 1705. CSM 1705 sends csmJobCreationReponse 1715 to SONAC-Com 1700.

Table 10 provides information on the message, requirement, and direction for monitoring job creation. A message named csmJobCreationRequest is transmitted from SONAC-Op to CSM. csmJobCreationRequest is a message that is used to request monitoring job creation. A response named csmJobCreationResponse may be transmitted by CSM to SONAC-Op to notify SONAC-Op that CSM has received a monitoring job creation request message. When SONAC-Op requests monitoring job creation, these messages are mandatory and thus which function can be realized and which technical effect can be achieved.

TABLE 10

| Message | Requirement | Direction |
|---|---|---|
| csmJobCreationRequest | Mandatory | SONAC-Op -> CSM |
| csmJobCreationResponse | Mandatory | CSM -> SONAC-Op |

Table 11 provides information on the input parameters for monitoring job creation. For example, the SliceId information in Table 11 can be understood as follows. SliceId is transmitted by SONAC-Op to CSM as a part of a job monitoring creation request. SliceId contains an Id, with qualifier M and cardinality 1 . . . *. SliceId is used to indicate slices to be monitored.

TABLE 11

| Parameter | Qualifier | Cardinality | Content | Description |
|---|---|---|---|---|
| SliceId | M | 1 . . . * | Id | Indicate slices to be monitored |
| UserId | O | 1 . . . * | Id | Indicate users to be monitored |
| PolicyMonitoring | M | 1 . . . * | Policy | Indicate the selected monitoring policy onboarded before |

Table 12 provides information on the output parameters for monitoring job creation. For example, the csmJobId information in Table 12 can be understood as follows. csmJobId is transmitted by CSM to SONAC-Op as a part of a job monitoring creation request. csmJobId contains an Id, with qualifier M and cardinality 1. csmJobId is the ID used to indicate the monitoring job.

TABLE 12

| Parameter | Qualifier | Cardinality | Content | Description |
|---|---|---|---|---|
| csmJobId | M | 1 | Id | The ID used to indicate the monitoring job |

Figure 18:
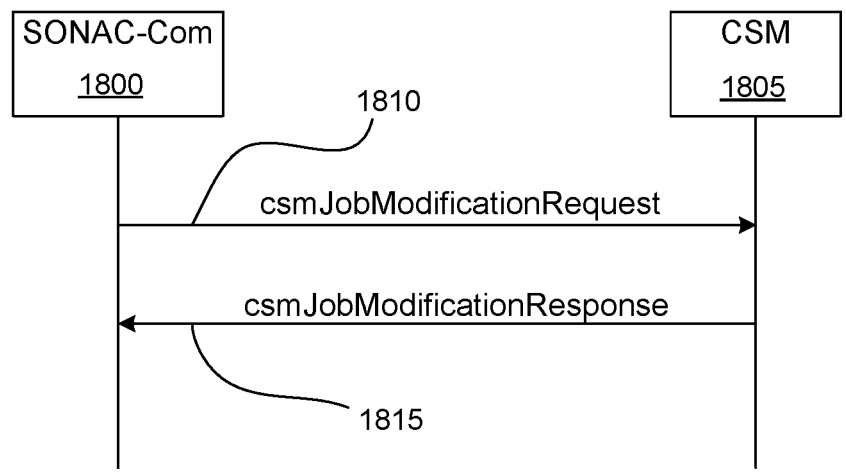
FIG. 18 is an illustration of the signaling exchange for CSM monitoring job modification, according to embodiments of the present invention.

FIG. 18 is an illustration of the signaling exchange for monitoring job modification. SONAC-Com 1800 sends csmJobModificationRequest 1810 to CSM 1805. CSM 1805 sends csmJobModificationReponse 1815 to SONAC-Com 1800.

Table 13 provides information on the message, requirement, and direction for monitoring job modification. A message named csmJobModificationRequest is transmitted from SONAC-Com to CSM. csmJobModificationRequest is a message that is used to request monitoring job modification. A response named csmJobModificationResponse may be transmitted by CSM to SONAC-Com to notify SONAC-Com that CSM has received a monitoring job modification request message. When SONAC-Com requests monitoring job modification, these messages are mandatory and thus which function can be realized and which technical effect can be achieved.

TABLE 13

| Message | Requirement | Direction |
|---|---|---|
| csmJobModificationRequest | Mandatory | SONAC-Com -> CSM |
| csmJobModificationResponse | Mandatory | CSM -> SONAC-Com |

Table 14 provides information on the input parameters for monitoring job modification. For example, the JobId information in Table 14 can be understood as follows. JobId is transmitted by SONAC-Com to CSM as a part of a job monitoring modification request. JobId contains an Id, with qualifier M and cardinality 1 . . . *. "*" indicates the value can be (any). JobId indicates the slices to be monitored.

TABLE 14

| Parameter | Qualifier | Cardinality | Content | Description |
|---|---|---|---|---|
| JobId | M | 1 . . . * | Id | Indicate slices to be monitored |
| PolicyMonitoring | M | 1 . . . * | policy | Described in FIG. 11 |

Table 15 provides information on the output parameters for monitoring job modification. For example, the csmJobId information in Table 15 can be understood as follows. csmJobId is transmitted by CSM to SONAC-Com as a part of a job monitoring modification request. csmJobId contains an Id, with qualifier M and cardinality 1. csmJobId is the new ID used to indicate the monitoring job.

TABLE 15

| Parameter | Qualifier | Cardinality | Content | Description |
|---|---|---|---|---|
| csmJobId | M | 1 | Id | The new ID used to indicate the monitoring job |

By using the CSM monitoring event reporting interface, the CSM can report the event with associated data to SONAC. The report may include: event triggered time; event duration; event position; differences between threshold and actual performance.

Figure 19:
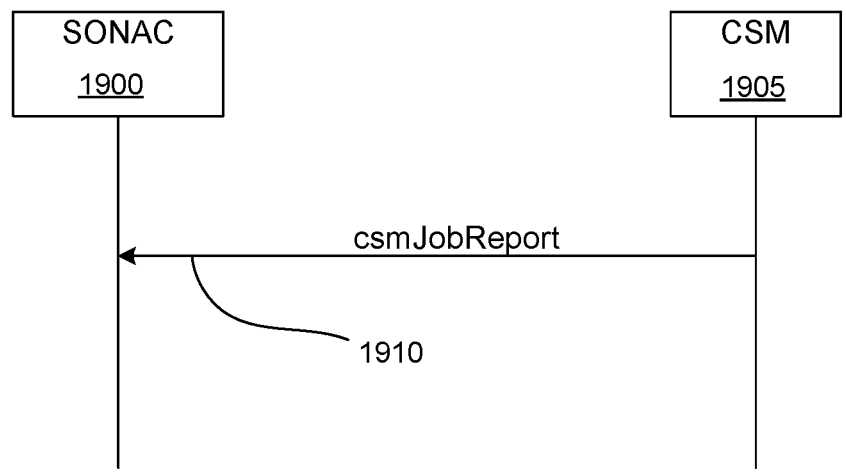
FIG. 19 is an illustration of the signaling exchange for CSM monitoring event reporting to a Service-Oriented (Virtual) Network Auto-Creation (SONAC) device, according to embodiments of the present invention.

FIG. 19 is an illustration of the signaling exchange for monitoring event reporting. The CSM 1905 sends csmJobReport 1910 to SONAC 1900.

Table 16 provides information on the message, requirement, and direction for monitoring event reporting. A message named csmJobReport is transmitted from CSM to SONAC. csmJobReport is a message that is used to request monitoring event reporting. When CSM requests monitoring event reporting, this message is mandatory and thus which function can be realized and which technical effect can be achieved.

TABLE 16

| Message | Requirement | Direction |
|---|---|---|
| csmJobReport | Mandatory | CSM -> SONAC |

Table 17 provides information on the input parameters for monitoring event reporting. For example, the JobId information in Table 17 can be understood as follows. JobId is transmitted by CSM to SONAC as a part of a monitoring event reporting request. JobId contains an Id, with qualifier M and cardinality 1 . . . *. JobId indicates slices to be monitored.

TABLE 17

| Parameter | Qualifier | Cardinality | Content | Description |
|---|---|---|---|---|
| JobId | M | 1 . . . * | Id | Indicate slices to be monitored |
| MonitoringReport | M | 1 . . . * | Report | The content in monitoring report depends on the monitoring policy. Examples are given in [0086]-[0088] |

By using the CSM monitoring data streaming interface, the CSM can report the event with or without associated data to, for example, SONAC.

Figure 20:
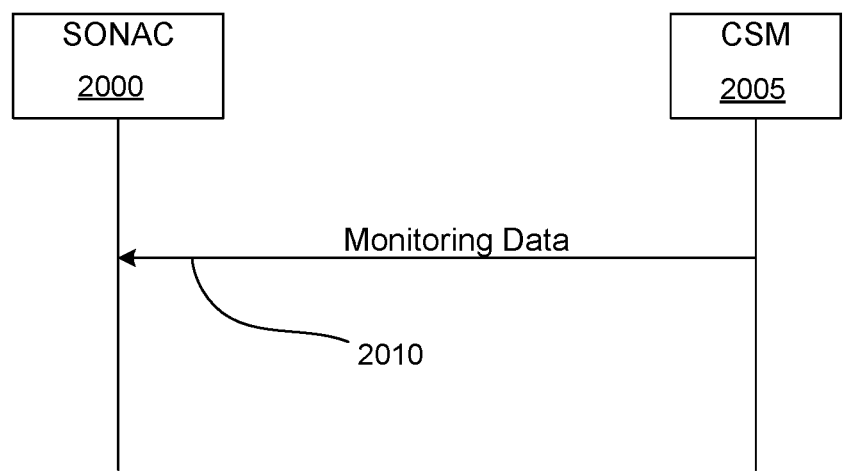
FIG. 20 is an illustration of the signaling exchange for monitoring data streaming from the CSM to SONAC, according to embodiments of the present invention.

FIG. 20 is an illustration of the signaling exchange for monitoring data streaming. CSM 2000 sends Monitoring Data 2010 to SONAC 2000.

Table 18 provides information on the message, requirement, and direction for monitoring data streaming. A message named csmMonitoringData is transmitted from CSM to SONAC. csmMonitoringData is a message that is used to request monitoring of data streaming. When CSM requests monitoring of data streaming, this message is mandatory and thus which function can be realized and which technical effect can be achieved.

TABLE 18

| Message | Requirement | Direction |
|---|---|---|
| csmMonitoringData | Mandatory | CSM -> SONAC |

Table 19 provides information on the input parameters for monitoring data streaming. For example, the JobId information in Table 19 can be understood as follows. JobId is transmitted by CSM to SONAC as a part of a monitoring of data streaming request. JobId contains an Id, with qualifier M and cardinality 1 . . . *. JobId indicates slices to be monitored.

TABLE 19

| Parameter | Qualifier | Cardinality | Content | Description |
|---|---|---|---|---|
| JobId | M | 1 . . . * | Id | Indicate slices to be monitored |
| StreamingData | M | 1 . . . * | Streaming Data | The monitoring results presented by streaming data |

By using the CSM monitoring data and event query interface, the CSM monitoring data can be requested/queried by SONAC or other potential consumer.

Figure 21:
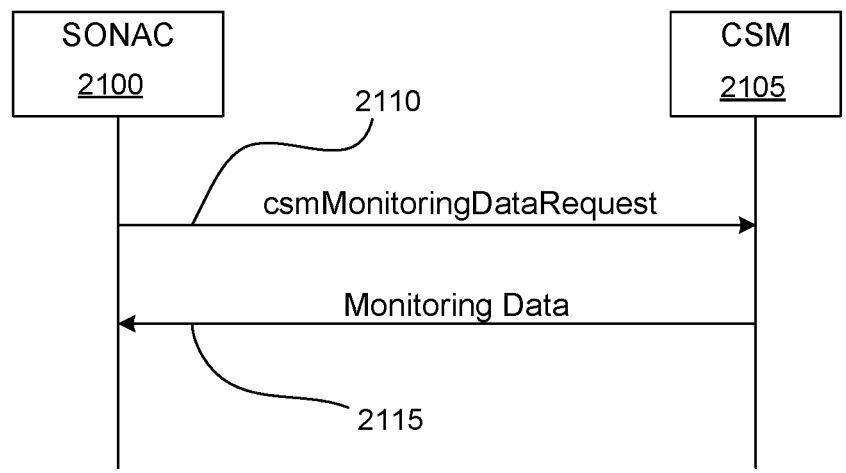
FIG. 21 is an illustration of the signaling exchange for executing a monitoring data/event query, according to embodiments of the present invention.

FIG. 21 is an illustration of the signaling exchange for monitoring data/even query. SONAC 2100 sends csmMonitoringDataRequest 2110 to CSM 2105. CSM 2105 sends Monitoring Data 2115 to SONAC 2100.

Table 20 provides information on the message, requirement, and direction for monitoring data/even query. A message named csmMonitoringDataRequest is transmitted from SONAC to CSM. csmMonitoringDataRequest is a message that is used to request monitoring data/even query. When SONAC requests monitoring data/even query, this message is mandatory and thus which function can be realized and which technical effect can be achieved.

TABLE 20

| Message | Requirement | Direction |
|---|---|---|
| csmMonitoringDataRequest | Mandatory | SONAC -> CSM |
| MonitoringData | Mandatory | CSM->SONAC |

Table 21 provides information on the input parameters for monitoring data/even query. For example, the JobId information in Table 21 can be understood as follows. JobId is transmitted by SONAC to CSM as a part of a monitoring data/even query request. JobId contains an Id, with qualifier M and cardinality 1 . . . *. JobId indicates slices to be monitored.

TABLE 21

| Parameter | Qualifier | Cardinality | Content | Description |
|---|---|---|---|---|
| JobId | M | 1 . . . * | Id | Indicate slices to be monitored |

Table 22 provides information on the output parameters for monitoring data/even query. For example, the JobId information in Table 22 can be understood as follows. JobId is transmitted by CSM to SONAC as a part of a monitoring data/even query request. JobId contains an Id, with qualifier M and cardinality 1 . . . *. JobId indicates slices to be monitored.

TABLE 22

| Parameter | Qualifier | Cardinality | Content | Description |
|---|---|---|---|---|
| JobId | M | 1 . . . * | Id | Indicate slices to be monitored |
| Monitoring Data | M | 1 . . . * | Monitoring Data | The data used by CSM to perform the monitoring. |

By using the CSM monitoring data storage interface, the CSM monitoring data storage interface can be requested/queried by SONAC or other potential consumer.

Figure 22:
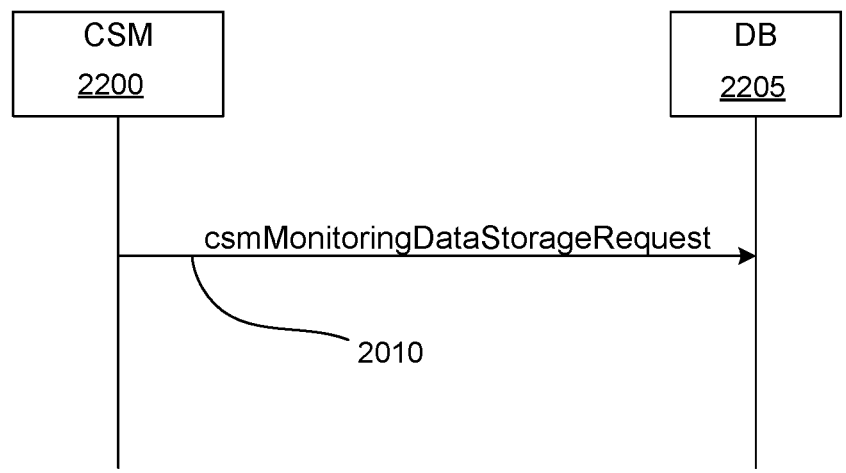
FIG. 22 is an illustration of the signaling exchange for executing a monitoring data storage operation, according to embodiments of the present invention.

FIG. 22 is an illustration of the signaling exchange for monitoring data storage. SONAC 2200 sends csmMonitoringDataStorageRequest 2210 to CSM 2205.

Table 23 provides information on the message, requirement, and direction for monitoring data storage. A message named csmMonitoringDataStorageRequest is transmitted from CSM to DB. csmMonitoringDataStorageRequest is a message that is used to request/query monitoring data storage interface. When CSM requests/queries monitoring data storage, this message is mandatory and thus which function can be realized and which technical effect can be achieved.

TABLE 23

| Message | Requirement | Direction |
|---|---|---|
| csmMonitoringDataStorageRequest | Mandatory | CSM -> DB |

Table 24 provides information on the input parameters for monitoring data storage. For example, the Monitoring Data information in Table 24 can be understood as follows. Monitoring Data is transmitted by CSM to DB as a part of a request/query monitoring data storage interface. Monitoring Data contains Monitoring Data, with qualifier M and cardinality 1 . . . *.

TABLE 24

| Parameter | Qualifier | Cardinality | Content | Description |
|---|---|---|---|---|
| Monitoring Data | M | 1 . . . * | Monitoring Data | |

By using the CSM monitoring job termination interface, the SONAC can terminate (a) monitoring job(s).

Figure 23:
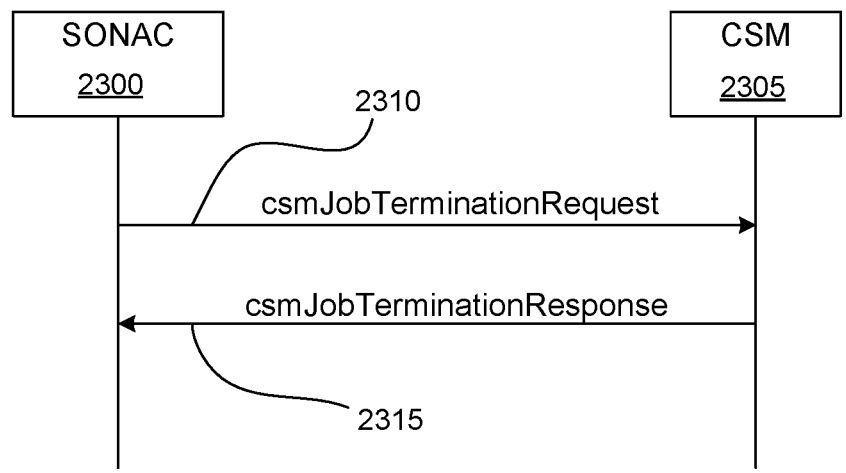
FIG. 23 is an illustration of the signaling exchange for monitoring job termination, according to embodiments of the present invention.

FIG. 23 is an illustration of the signaling exchange for monitoring job termination. SONAC 2300 sends csmJobTerminationRequest 2310 to CSM 2305. CSM 2305 sends csmJobTerminationResponse 2315 to SONAC 2300.

Table 25 provides information on the message, requirement, and direction for monitoring job termination. A message named csmJobTerminationRequest is transmitted from SONAC to CSM. csmJobTerminationRequest is a message that is used to request monitoring job termination. A response named csmJobTerminationResponse may be transmitted by CSM to SONAC to notify SONAC that CSM has received a monitoring job termination request message. When SONAC requests monitoring job termination, these messages are mandatory and thus which function can be realized and which technical effect can be achieved.

TABLE 25

| Message | Requirement | Direction |
|---|---|---|
| csmJobTerminationRequest | Mandatory | SONAC -> CSM |
| csmJobTerminationResponse | Mandatory | CSM -> SONAC |

Table 26 provides information on the input parameters for monitoring job termination. For example, the JobId information in Table 26 can be understood as follows. JobId is transmitted by SONAC to CSM as a part of a monitoring job termination request. JobId contains an ID, with qualifier M and cardinality 1 . . . *.

TABLE 26

| Parameter | Qualifier | Cardinality | Content | Description |
|---|---|---|---|---|
| JobId | M | 1 . . . * | Id | |

Table 27 provides information on the output parameters for monitoring job termination. For example, the csmJobId information in Table 27 can be understood as follows. csmJobId is transmitted by CSM to SONAC as a part of a monitoring job termination request. csmJobId contains an ID, with qualifier M and cardinality 1.

TABLE 27

| Parameter | Qualifier | Cardinality | Content | Description |
|---|---|---|---|---|
| csmJobId | M | 1 | Id | |

Figure 24:
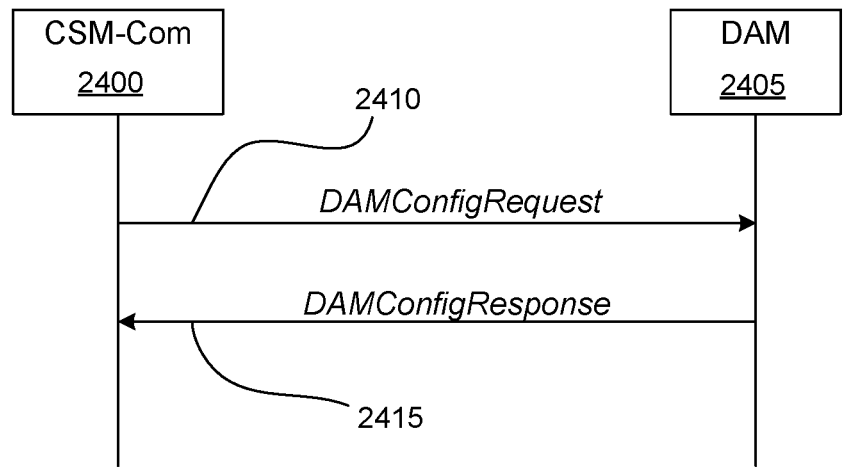
FIG. 24 is an illustration of the signaling exchange for DAM configuration, according to embodiments of the present invention.

FIG. 24 is an illustration of the signaling exchange for DAM Initial Configuration. CSM 2400 sends DAMConfigRequest 2410 to DAM 2405. DAM 2405 sends DAMConfigResponse 2415 to CSM 2400.

Table 28 provides information on the message, requirement, and direction for DAM Initial Configuration. A message named DAMConfigRequest is transmitted from CSM to DAM. DAMConfigRequest is a message that is used to request for DAM initial configuration. A response named DAMConfigResponse may be transmitted by DAM to CSM to notify CSM that DAM has received a DAM initial configuration request message. When CSM requests DAM initial configuration, these messages are mandatory and thus which function can be realized and which technical effect can be achieved.

TABLE 28

| Message | Requirement | Direction |
|---|---|---|
| DAMConfigRequest | Mandatory | CSM -> DAM |
| DAMConfigResponse | Mandatory | DAM -> CSM |

Table 29 provides information on the input parameters for DAM Initial Configuration. For example, the LocationID information in Table 29 can be understood as follows. LocationID is transmitted by CSM to DAM as a part of DAM initial configuration request. LocationID contains an identifier, with qualifier M and cardinality 1. LocationID describes where DAM logs data and analytics.

TABLE 29

| Parameter | Qualifier | Cardinality | Content | Description |
|---|---|---|---|---|
| LocationID | M | 1 | Identifier | Where DAM logs data and analytics |
| LogAnalyticsID | O | | Identifier | Use if analytics are stored at a different location than log data |
| InformationID | M | | Identifier | What data to is going to be logged |
| ReportingModeID | M | | Identifier | Reporting policy |
| LogModeID | M | | Identifier | How to log data, e.g., periodicity |

Table 30 provides information on the output parameters for DAM Initial Configuration. For example, the DAMConfigResponse information in Table 30 can be understood as follows. DAMConfigResponse is transmitted by DAM to CSM as a part of DAM initial configuration request. DAMConfigResponse contains a configuration acknowledgment, with qualifier M and cardinality 1. LocationID describes where DAM configuration operations are complete.

TABLE 30

| Parameter | Qualifier | Cardinality | Content | Description |
|---|---|---|---|---|
| DAMConfigResponse | M | 1 | ConfigAck | All configurations are completed |

Figure 25:
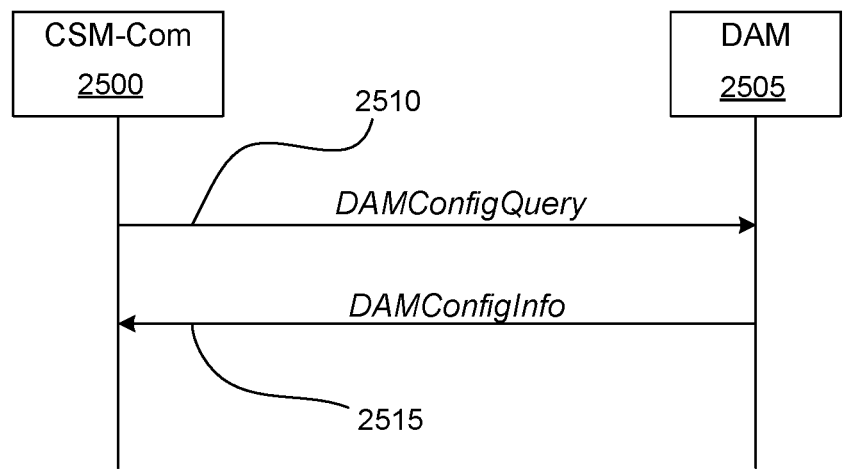
FIG. 25 is an illustration of the signaling exchange for DAM configuration information retrieval, according to embodiments of the present invention.

FIG. 25 is an illustration of the signaling exchange for DAM Initial Configuration Retrieval. CSM 2500 sends DAMConfigQuery 2510 to DAM 2505. DAM 2505 sends DAMConfigInfo 2515 to CSM 2500.

Table 31 provides information on the message, requirement, and direction for DAM Initial Configuration Retrieval. A message named DAMConfigQuery is transmitted from CSM to DAM. DAMConfigQuery is a message that is used to request for DAM initial configuration retrieval. A response named DAMConfigInfo may be transmitted by DAM to CSM to notify CSM that DAM has received a DAM initial configuration retrieval request message. When CSM requests DAM initial configuration, these messages are mandatory and thus which function can be realized and which technical effect can be achieved.

TABLE 31

| Message | Requirement | Direction |
|---|---|---|
| DAMConfigQuery | Mandatory | CSM -> DAM |
| DAMConfigInfo | Mandatory | DAM -> CSM |

Table 32 provides information on the input parameters for DAM Initial Configuration Retrieval. For example, the DAMConfigQuery information in Table 32 can be understood as follows. DAMConfigQuery is transmitted by CSM to DAM as a part of DAM initial configuration retrieval request. DAMConfigQuery contains a configuration acknowledgment, with qualifier M and cardinality 1. DAMConfigQuery describes a query of existing DAM configuration.

TABLE 32

| Parameter | Qualifier | Cardinality | Content | Description |
|---|---|---|---|---|
| DAMConfigQuery | M | 1 | ConfigAck | Query existing configuration of DAM |

Table 33 provides information on the output parameters for DAM Initial Configuration Retrieval. For example, the DAMConfigInfo information in Table 33 can be understood as follows. DAMConfigInfo is transmitted by DAM to CSM as a part of DAM initial configuration retrieval request. DAMConfigInfo contains configuration information, with qualifier M. DAMConfigInfo describes a summary of configuration information that can be exposed.

TABLE 33

| Parameter | Qualifier | Cardinality | Content | Description |
|---|---|---|---|---|
| DAMConfigInfo | M | | Config Info | Summary of configuration info that can be exposed |

Figure 26:
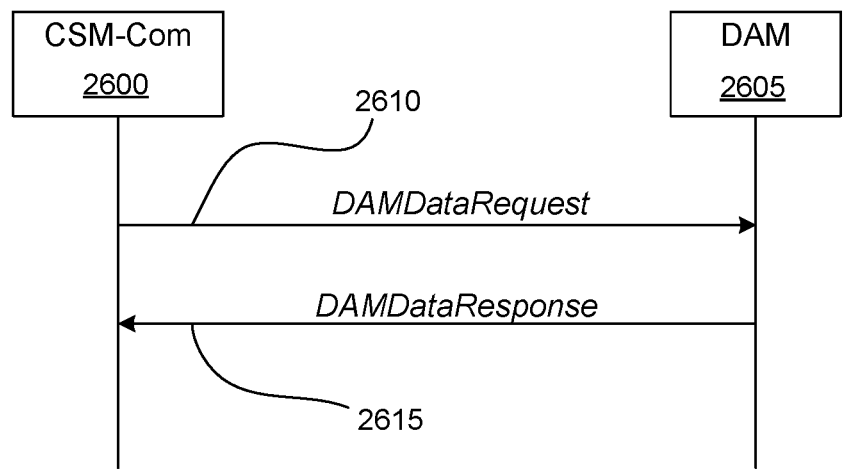
FIG. 26 is an illustration of the signaling exchange for DAM data retrieval, according to embodiments of the present invention.

FIG. 26 is an illustration of the signaling exchange for DAM Data Retrieval. CSM 2600 sends DAMDataRequest 2610 to DAM 2605. DAM 2605 sends DAMDataResponse 2615 to CSM 2600.

Table 34 provides information on the message, requirement, and direction for DAM Data Retrieval. A message named DAMDataRequest is transmitted from CSM to DAM. DAMDataRequest is a message that is used to request for DAM data retrieval. A response named DAMDataResponse may be transmitted by DAM to CSM to notify CSM that DAM has received a DAM data retrieval request message. When CSM requests DAM data retrieval, these messages are mandatory and thus which function can be realized and which technical effect can be achieved.

TABLE 34

| Message | Requirement | Direction |
|---|---|---|
| DAMDataRequest | Mandatory | CSM -> DAM |
| DAMDataResponse | Mandatory | DAM -> CSM |

Table 35 provides information on the input parameters for DAM Data Retrieval. For example, the DataID information in Table 35 can be understood as follows. DataID is transmitted by CSM to DAM as a part of DAM data retrieval request. DataID contains an identifier, with qualifier M and cardinality 1. DataID describes the ID of the data to be retrieved for one time.

TABLE 35

| Parameter | Qualifier | Cardinality | Content | Description |
|---|---|---|---|---|
| DataID | M | 1 | Identifier | ID of the data to be retrieved for one time |

Table 36 provides information on the output parameters for DAM Data Retrieval. For example, the DAMDataResponse information in Table 36 can be understood as follows. DAMDataResponse is transmitted by DAM to CSM as a part of DAM data retrieval request. DAMDataResponse contains data to be retrieved, with qualifier M and cardinality 1. DAMDataResponse sends the request for data for one time.

TABLE 36

| Parameter | Qualifier | Cardinality | Content | Description |
|---|---|---|---|---|
| DAMDataResponse | M | 1 | Data to be retrieved | Send the requested data for one time |

Figure 27:
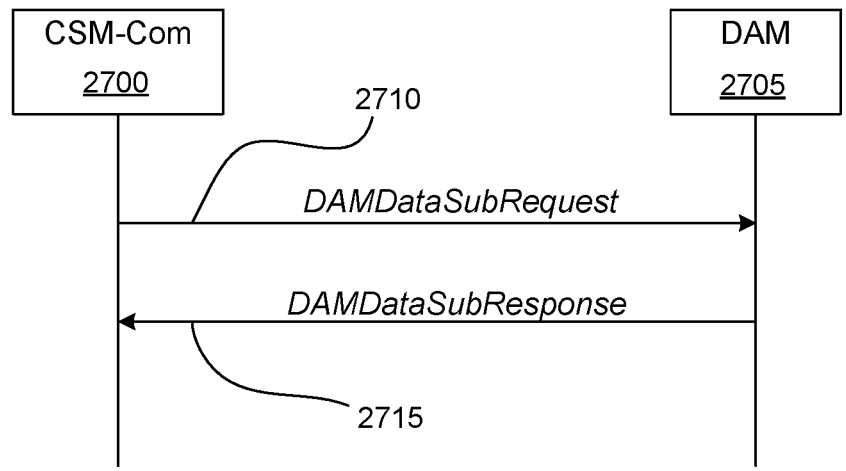
FIG. 27 is an illustration of the signaling exchange for establishing or configuring a subscription for receiving DAM data, according to embodiments of the present invention.

FIG. 27 is an illustration of the signaling exchange for DAM Data Subscription. CSM 2700 sends DAMDataSubRequest 2710 to DAM 2705. DAM 2705 sends DAMDataSubResponse 2715 to CSM 2700.

Table 37 provides information on the message, requirement, and direction for DAM Data Subscription. A message named DAMDataSubRequest is transmitted from CSM to DAM. DAMDataSubRequest is a message that is used to request for DAM data subscription. A response named DAMDataSubRequest may be transmitted by DAM to CSM to notify CSM that DAM has received a DAM data subscription request message. When CSM requests DAM data subscription, these messages are mandatory and thus which function can be realized and which technical effect can be achieved.

TABLE 37

| Message | Requirement | Direction |
|---|---|---|
| DAMDataSubRequest | Mandatory | CSM -> DAM |
| DAMDataSubResponse | Mandatory | DAM -> CSM |

Table 38 provides information on the input parameters for DAM Data Subscription. For example, the DataID information in Table 38 can be understood as follows. DataID is transmitted by CSM to DAM as a part of DAM data subscription request. DataID contains an identifier, with qualifier M and cardinality 1. DataID is the ID of the data to be subscribed.

TABLE 38

| Parameter | Qualifier | Cardinality | Content | Description |
|---|---|---|---|---|
| DataID | M | 1 | Identifier | ID of the data to be subscribed |
| SubsFrequency | O | | Time | How frequently the data should be sent to CSM |

Table 39 provides information on the output parameters for DAM Data Subscription. For example, the DAMDataSubResponse information in Table 39 can be understood as follows. DAMDataSubResponse is transmitted by DAM to CSM as a part of DAM data subscription request. DAMDataSubResponse contains a subscription acknowledgement, with qualifier M and cardinality 1. DAMDataSubResponse is the acknowledgement for the requested subscription.

TABLE 39

| Parameter | Qualifier | Cardinality | Content | Description |
|---|---|---|---|---|
| DAMDataSubResponse | M | 1 | Subs. Ack | Acknowledgement for the requested subscription |

Figure 28:
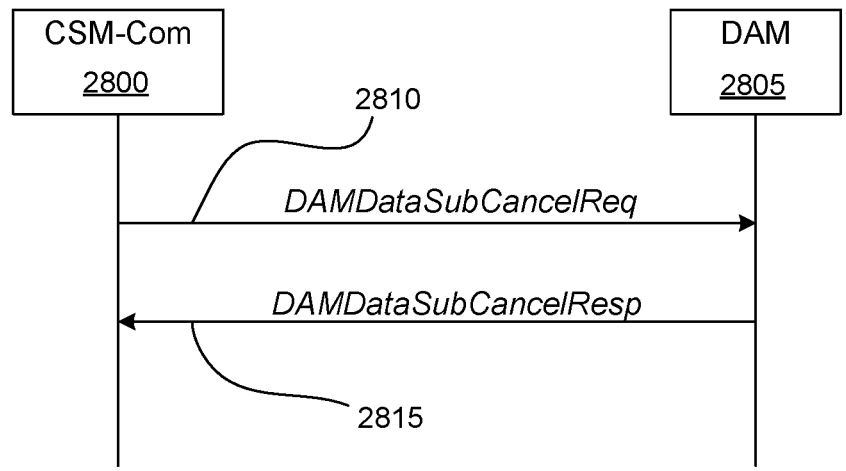
FIG. 28 is an illustration of the signaling exchange for cancelling a subscription to DAM data, according to embodiments of the present invention.

FIG. 28 is an illustration of the signaling exchange for DAM Data Subscription Cancellation. CSM 2800 sends DAMDataSubCancelReq 2810 to DAM 2805. DAM 2805 sends DAMDataSubCancelResp 2815 to CSM 2800.

Table 40 provides information on the message, requirement, and direction for DAM Data Subscription Cancellation. A message named DAMDataSubCancelReq is transmitted from CSM to DAM. DAMDataSubCancelReq is a message that is used to request for DAM data subscription cancellation. A response named DAMDataSubCancelResp may be transmitted by DAM to CSM to notify CSM that DAM has received a DAM data subscription cancellation request message. When CSM requests DAM data subscription cancellation, these messages are mandatory and thus which function can be realized and which technical effect can be achieved.

TABLE 40

| Message | Requirement | Direction |
|---|---|---|
| DAMDataSubCancelReq | Mandatory | CSM -> DAM |
| DAMDataSubCancelResp | Mandatory | DAM -> CSM |

Table 41 provides information on the input parameters for DAM Data Subscription Cancellation. For example, the DataID information in Table 41 can be understood as follows. DataID is transmitted by CSM to DAM as a part of DAM data subscription cancellation request. DataID contains an identifier, with qualifier M and cardinality 1. DataID is the ID of the data to be unsubscribed.

TABLE 41

| Parameter | Qualifier | Cardinality | Content | Description |
|---|---|---|---|---|
| DataID | M | 1 | Identifier | ID of the data to be unsubscribed |

Table 42 provides information on the output parameters for DAM Data Subscription Cancellation. For example, the DAMDataSubCancelResp information in Table 42 can be understood as follows. DAMDataSubCancelResp is transmitted by DAM to CSM as a part of DAM data subscription cancellation request. DAMDataSubCancelResp contains a subscription acknowledgement, with qualifier M and cardinality 1. DAMDataSubCancelResp is the acknowledgement of the requested unsubscription.

TABLE 42

| Parameter | Qualifier | Cardinality | Content | Description |
|---|---|---|---|---|
| DAMDataSubCancelResp | M | 1 | Subs. Ack | Acknowledgement for the requested unsubscription |

Figure 29:
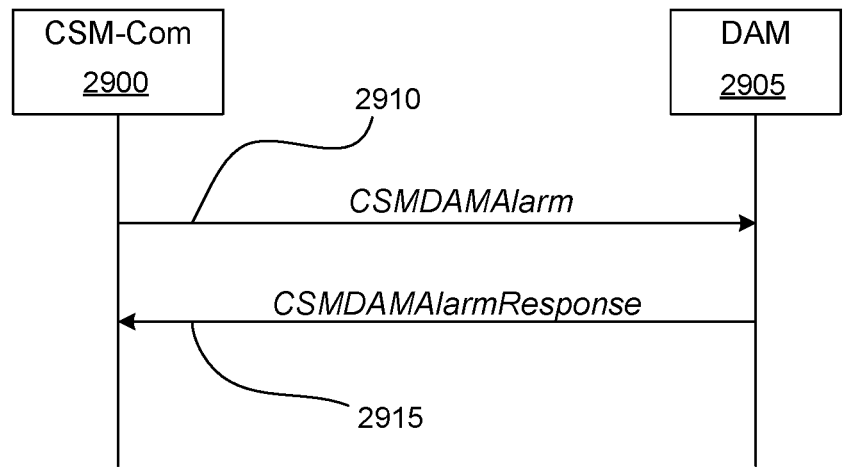
FIG. 29 is an illustration of the signaling exchange for establishing or configuring an alarm operation by a DAM, according to embodiments of the present invention.
Figure 30A:
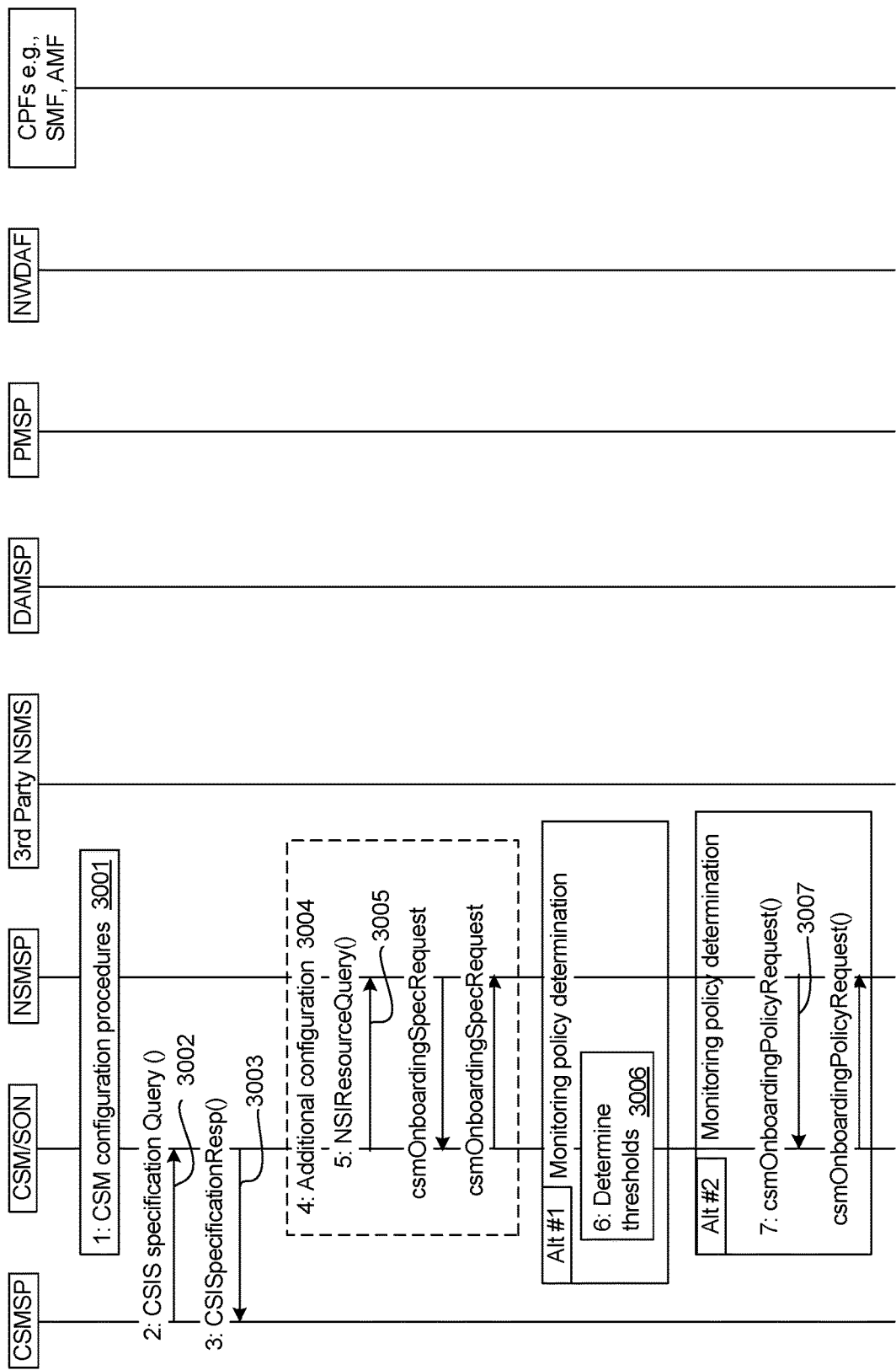
Figure 30C:
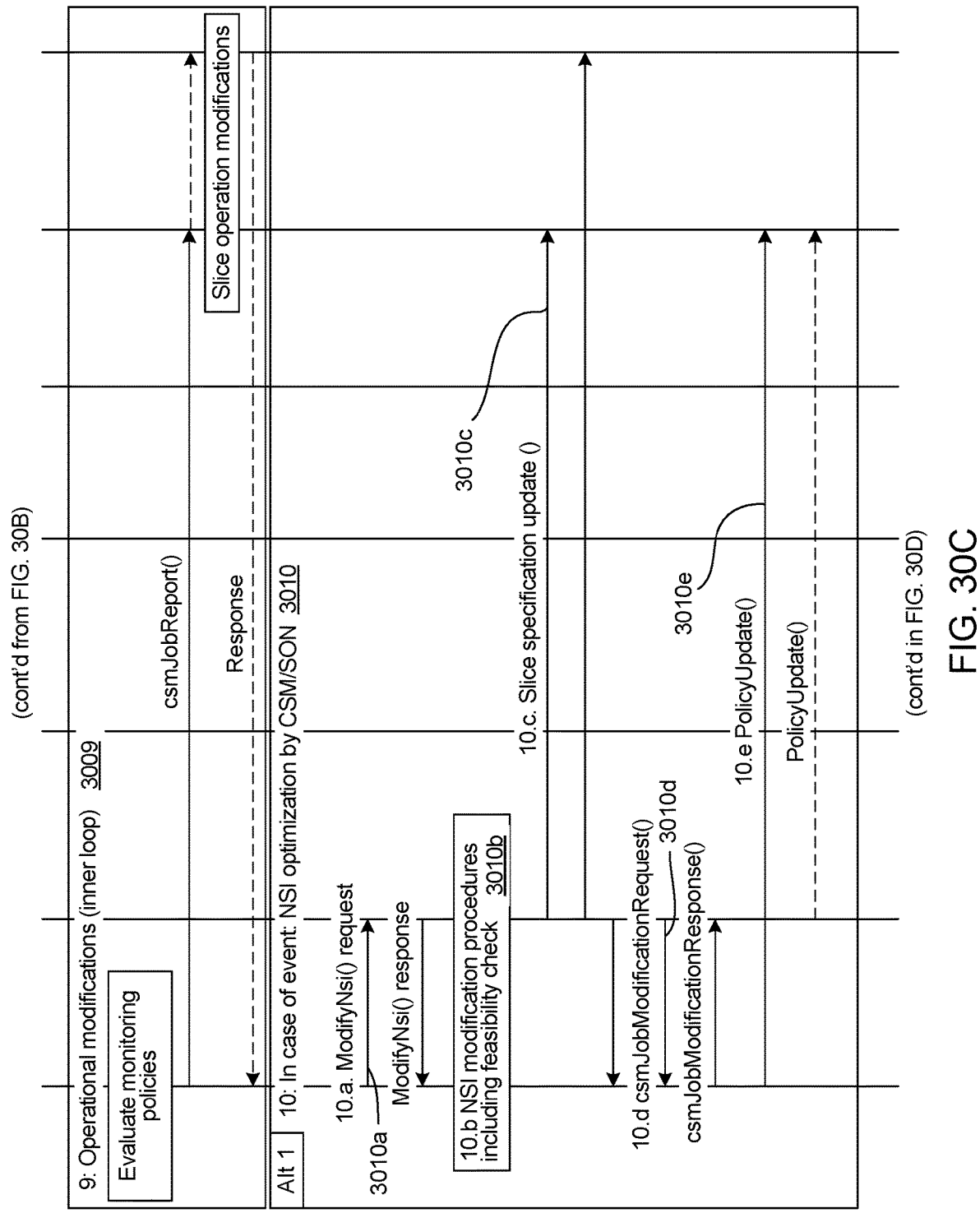
Figure 30D:
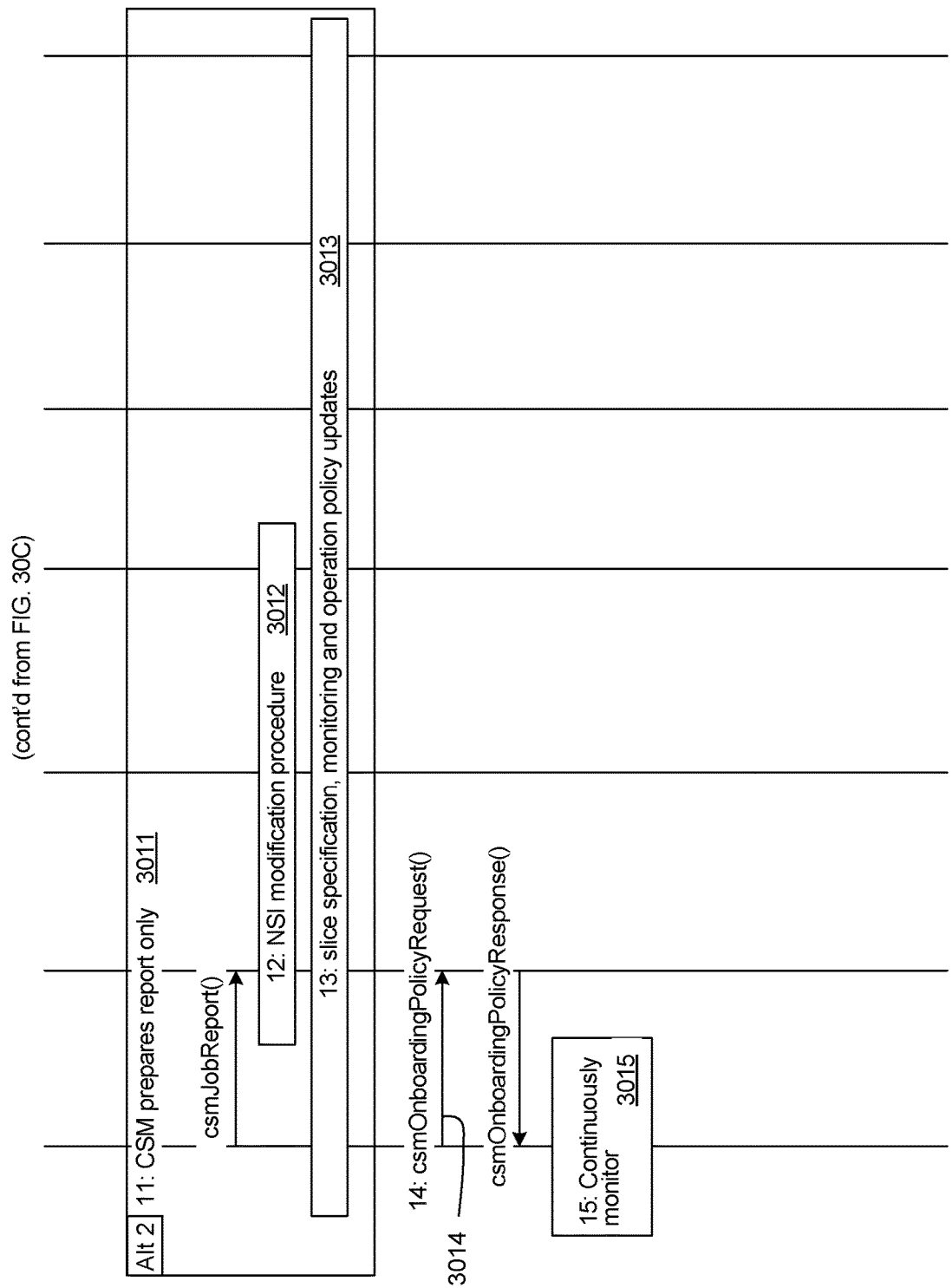

FIG. 29 is an illustration of the signaling exchange for CSM receiving DAM alarm. DAM 2905 sends CSMDA-MAlarm 2910 to CSM 2900. CSM 2900 sends CSMDA-MAlarmResponse 2915 to DAM 2900.

Table 43 provides information on the message, requirement, and direction for CSM receiving DAM alarm. A message named CSMDAMAlarm is transmitted from DAM to CSM. CSMDAMAlarm is a message that is used to request for CSM receiving DAM alarm. A response named CSMDAMAlarmResponse may be transmitted by CSM to DAM to notify DAM that CSM has received a CSM receiving DAM alarm request message. When DAM requests CSM receiving DAM alarm, CSMDAMAlarm is mandatory and CSMDAMAlarmResponse is optional and thus which function can be realized and which technical effect can be achieved.

TABLE 43

| Message | Requirement | Direction |
|---|---|---|
| CSMDAMAlarm | Mandatory | DAM -> CSM |
| CSMDAMAlarmResponse | Optional | CSM -> DAM |

Table 44 provides information on the input parameters for CSM receiving DAM alarm. For example, the AlarmID information in Table 44 can be understood as follows. AlarmID is transmitted by DAM to CSM as a part of CSM receiving DAM alarm. AlarmID contains an identifier, with qualifier M and cardinality 1. AlarmID is the ID of the alarm (for example the pattern change, usage).

TABLE 44

| Parameter | Qualifier | Cardinality | Content | Description |
|---|---|---|---|---|
| AlarmID | M | 1 | Identifier | ID of the alarm, e.g., traffic pattern change, usage |
| AlarmContent | O | 1 | Number etc. | Content of the alarm, e.g., usage percentage |
| PolicyID | O | 1 | Identifier | ID of the violated policy |

Table 45 provides information on the output parameters for CSM receiving DAM alarm. For example, the CSMDA-MAlarmResponse information in Table 45 can be understood as follows. CSMDAMAlarmResponse is transmitted by CSM to DAM as a part of CSM receiving DAM alarm. CSMDAMAlarmResponse contains an identifier, with qualifier O and cardinality 1. CSMDAMAlarmResponse requests more analysis.

TABLE 45

| Parameter | Qualifier | Cardinality | Content | Description |
|---|---|---|---|---|
| CSMDAMAlarmResponse | O | 1 | Identifiers | Ask for more analysis |

A network policy management function (NPM) is an entity that is able to dynamically adjust the network policies used to enforce the behaviors of network operations. In present 5G network or similar networks where network policies are handled by a particular entity or entities, an NPM may process the network policies and reactions to the reports.

In some embodiments the system can be configured to monitor, record and analyze the network/slice/device/traffic performance and behaviors based on predefined policies and methodologies. An NPM, for example, a Policy Control Function (PCF) in 3GPP 5G may include the following functionalities: (1) Support unified policy framework to govern network behaviour; (SA2). (2) Provide policy rules to Control Plane function(s) to enforce them; (SA2). (3) Provide policy rules to CSM to monitor the network behaviour. (4) React to the monitoring results from CSM. (5) Access subscription information relevant for policy decisions in a Unified Data Repository (UDR); (SA2). (6) Access monitoring information relevant for new policy decision in a Unified Data Repository (UDR). Examples of the functionality "react to the monitoring results from CSM" may include: dynamically changing the policy rules provided to CPF; form new policy rules such as making new QoS levels.

Various additional examples and use cases, related to CSM-Com and CSM-Op usage, are described below.

A first use case relates to NSI resource allocation optimization using CSM. The CSM can work as the SON service provider as described for example in the 3rd Generation Partnership Project (3GPP) document numbered TR 28.861 and entitled "Telecommunication management; Study on the Self-Organizing Networks (SON) for 5G networks." One of the services of the SON service provider (SP) is optimizing NSI resource allocation to improve the resource utilization performance. Providing this service requires the CSM/SON service provider to interact with data analytics entities and network slice management service providers (SPs—used herein as a suffix to acronyms as necessary). Note that the latter is also referred to as network management or network management system as described previously herein. In an alternative embodiment, the CSM/SON can be co-located with either the Network Slice Management Service Provider (NSMSP) or the Communication Service Management Service Provider (CSMSP). In that case the messaging is between NSMSP and CSMSP. Note that the NSMSP also corresponds to the SONAC-COM as described previously herein. Service and customer functionalities of SONAC- COM are represented by the CSMSP. FIGS. 30A to 30D illustrate a detailed call flow for this use case.

In step 3001, the CSM is configured with the NSI ID and NSI resource information to be optimized for resource allocation. This configuration may include steps 1-4 (615-630) in FIG. 6, in which the CSM job is created with csmJobCreationRequest( ) from SONAC to CSM, and SONAC and/or CP entities receive job ID.

In step 3002, CSISpecificationQuery( ) is used to query the CSI specifications using the NSI. It is especially useful if there are multiple CSIs sharing the same NSI. CSM obtains resource and service requirements with this message. Two options for query are specified below. First, if NSMSP pre-configures the CSM with the CSI identifiers, e.g., CSI-IDs, that are using the NSI, the CSI-IDs are sent to query specifications. The CSI IDs are in the Agent ID field of monitoring policy message. Details of service and resource based monitoring are indicated in the Value fields (F6 and subfields) of the monitoring policy message. For instance, average latency for a network segment that is indicated in Network Segment field can be described as F1 set to "latency" and F6-1 set to "Derivation: mean". Note that corresponding numeric values or standardized strings can be used to indicate values of fields, such as KPI and analysis types. Second, if CSM is only configured for the NSI, it can query which CSIs are deployed on this NSI and their specifications by using the NSI-ID only. NSI ID is configured either with Agent ID or Network Segment fields.

In step 3003, CSISpecificationResp( ) is provided as the response to the above message which includes resource and service requirements of each service utilizing the NSI. The service requirements include percentage of users satisfied, the bandwidth requirements, service areas, capacity for each geographical area (e.g., in terms of users that can be supported), service type, UE mobility, service latency requirements, policies, reliability requirements (e.g., % time/location availability), priority, required service functions and other service-level requirements. The resource requirements include the following and more: network function requirements (in relation to service type), network link and function capacity requirements (per slice and/or per geographical area), transport requirements, priority, network function topology, policies, service chains, UE mobility requirements, network function IDs, utilization percentage, amount/percentage of redundant resources (in relation to reliability) and other resource-related requirements.

Referring now to step 3004, it is noted that CSMSP may not be able to provide all of this information, e.g., network function IDs and topology. The information beyond the resource facing aspects of CSMSP is provided by NSMSP. If such information is not provided by NSMSP during initial configuration of the CSM/SON, NSIResourceQuery( ) 3005 is used to obtain all necessary resource information. Resource related information is provided via the network segment field of the monitoring policy. NSIResourceResp( ) is the response with the requested resource information in the above step. Note that although CSM is shown as one logical entity in the following figure, it can have CSM-Op and CSM-Com parts/functionalities. In this case, the slice specification is shared with both CSM-Op and CSM-Com. In other words, a CN analytics entity is has network slice resource related information to perform monitoring efficiently.

In step 3006, if CSM/SON is not already configured according to the policies of NSI and services utilizing the NSI during the initial configuration in step 3001, CSM/SON determines the thresholds with respect to the information it obtained in the steps 3002-3004 and/or available policies.

Alternatively to step 3006, NSMSP, e.g., NSMF and/or NSSMF, can configure the CSM/SON with the monitoring policies in step 3007.

In step 3008, according to the policies, CSM/SON collects performance data and analysis. For example, if network-slice load or the load of a specific network slice segment is needed, it is requested from DAMSP. Note that for the message to DAMSP, which aspect of load is determined. From performance management service provider (PMSP), KPIs, including utilization percentage of virtual resources, or measurements, including total uplink PRB usage of a DU and CU, and SMF, AMF and UPF measurements can be obtained. CPNFs such as SMF and AMF can provide UE mobility event notifications, and UE behavior statistics.

In step 3009, CSM/SON compares the data and analytics (e.g. current, historical and prediction based data and analytics) to the monitoring policies, e.g., thresholds and performance optimization targets. CSM/SON prepares the csmJobReport( ) for CP/NSC entities. The report can be time-triggered, event-triggered, streaming based, or any combination of those. The CSM/SON prepares and delivers the job report continuously. CSM/SON also continues receiving data (i.e., monitoring) that is described in step 3008. The CSM/SOM report can trigger slice operation modification. Especially if reporting is triggering based, it indicates an event and modifications are very likely. The CSM/SON may receive a response from the NSC/CP indicating success of the modifications, no modifications are possible, or counters for error/performance degradation or similar occurrences.

In step 3010, in one embodiment, CSM/SON determines the event. In addition, CSM/SON also prepares the modification request. In step 3010a, CSM/SON determines the event and performs the necessary modifications with NSMSP by sending the ModifyNsi( ) request to the NSMSP. For ModifyNsi( ) request, CSM/SON determines resource allocation adjustments for the NSI based on the evaluation results. In step 3010b, the ModifyNsi( ) request triggers the NSI modification procedures, including the feasibility check. If the modification is not feasible, and no other feasible modification can be determined by CSM or NSM, the procedure finishes here without any slice modification. That may trigger CSM monitoring job termination or modification. NSM and NSC are made aware that improving the performance is not possible by CSMjobReport( ). In step 3010c, CSM/SON and NSC/CP receives the updated slice specification. In step 3010d, NSM/NSMSP updates the monitoring jobs, if needed. In step 3010e, CSM/SON or NSM/NSMSP updates the operation policies for CP NFs, such as NWDAF, SMF, AMF, NSSF and PCF, if needed. In alternative embodiments, instead of (or in addition to) modification of NSI(s), NSSI(s), NF(s), network segments, network links etc. can be modified.

In step 3011, as an alternative to step 3010, CSM/SON prepares a report and sends it to NSMSP. NSMSP then determines the necessary modifications. The necessary modifications are determined by the NSMSP. alternative embodiments, instead of (or in addition to) modification of NSI(s), NSSI(s), NF(s), network segments, network links etc. can be modified. Network resource lifecycle and allocation operations are performed by NSMSP. Slice specification, monitoring policy and operation policy updates take place as in step 3010.

In step 3012, in case of modifications on the NSI, e.g. new resources allocated, redundant resources removed, policies updated, CSM/SON receives updated monitoring policies.

In step 3013, unless NSMSP terminates the monitoring and optimization by CSM/SON, the CSM/SON continues monitoring and optimization. If needed, CSM/SON can update the measurement and analysis jobs based on the new policies, e.g. DAMConfigRequest( ).

A second use care relates to optimization of the quality of communication services. This is in contrast to the first use case, in which the resource utilization was the focus of optimization. In this use case, the CSM provides quality (one or more of QoS, QoE, KPI, SLA) optimization for communication services. The optimization parameters depends on the type of service (e.g., URLLC, eMBB etc.), requirements provided by the tenant, SLA and/or SLS, and so on. In this embodiment, CSM interacts with both CSMSP and NSMSP, similar to a SON function. However, the CSM can be co-located with either one the CSMSP and NSMSP. Especially for this embodiment, CSM/SON may be co-located with CSMSP, rather than NSMSP (if it is not a separate function/entity). Note that more than one NSI may be used for the communication service instance (CSI).

Figure 31A:
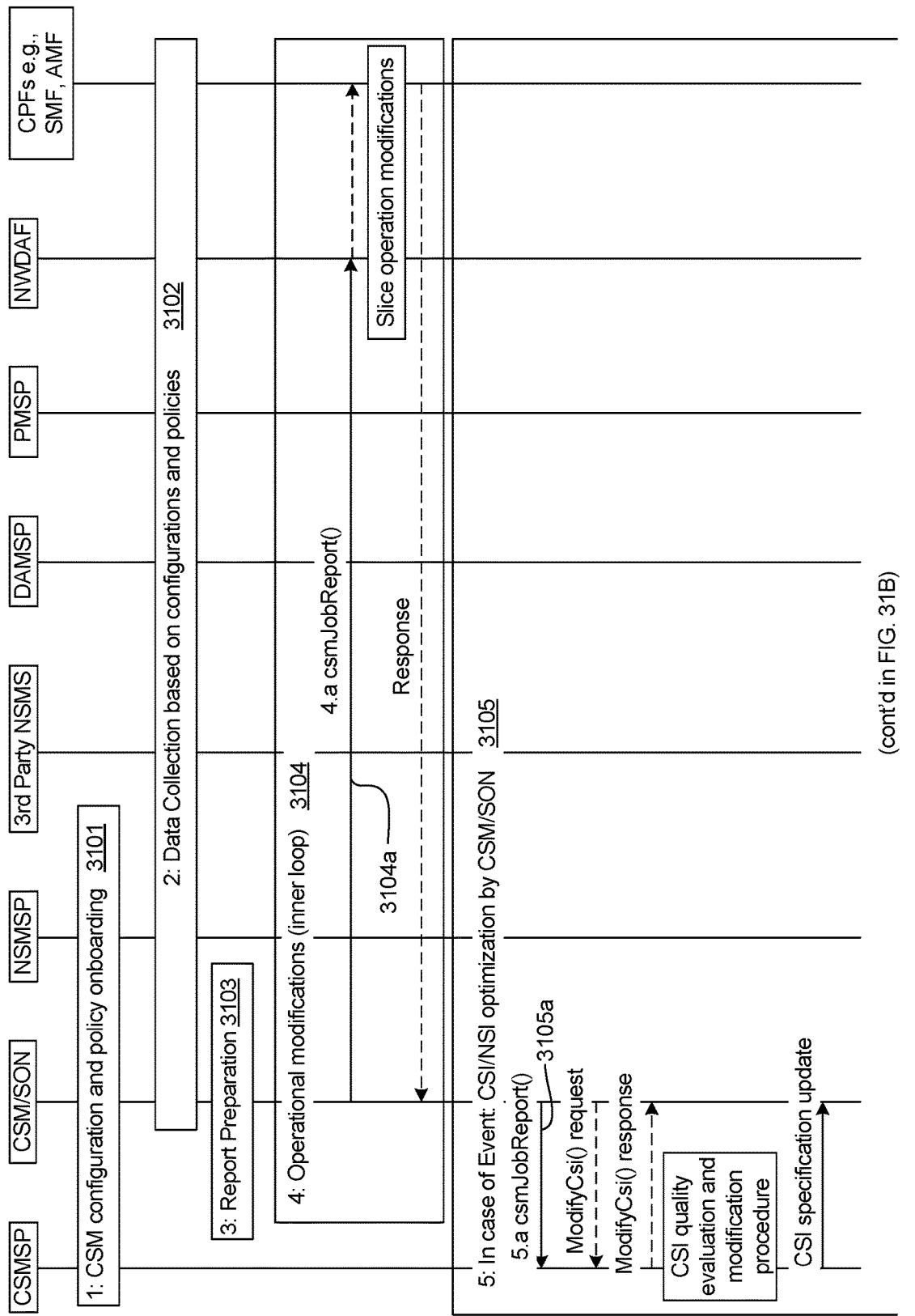
FIGS. 31A and 31B illustrate a call flow for an example use case involving optimization of communication service quality, according to an embodiment of the present invention.
Figure 31B:
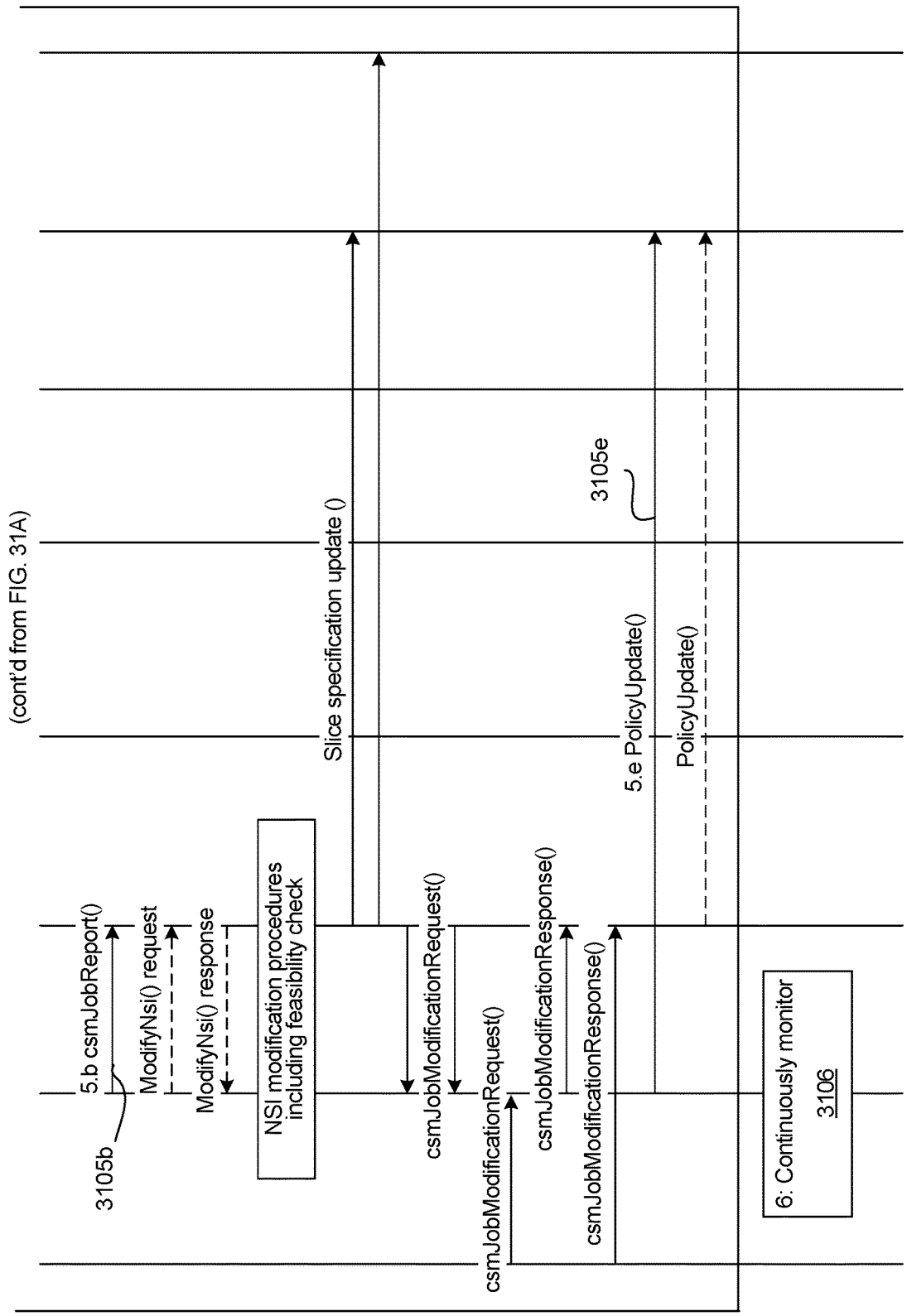

Referring now to FIGS. 31A and 31B, in step 3101, the CSM/SON is configured by a management service provider (MSP) with respect to the quality requirements of the CSI. Details of step 3101 are similar to Steps 3001 to 3007 of FIG. 30A. This is an initial step, which can be regarded as a pre-condition. The MSP that configures the CSM/SON is aware of all or a sufficient set of quality requirements for the CSI. The MSP also has the capability to derive monitoring policies from service requirements. Determining monitoring policies include but not limited to the monitoring policies for example as described with respect to FIG. 11. Some of those policies that apply to this case are listed include, but are not necessarily limited to: determining the network segment(s)/slice(s)/function(s)/ingress-egress points to be monitored; determining the KPIs and QoS requirements (if not given), e.g., average end-to-end or network segment/slice based latency, end-to-end data rate; and determining resource (e.g., network slice utilization percentage etc.) and service facing aspects (e.g., service users' QoE) of the monitoring requirements. In some embodiments, if CSM/SON is a separate entity (i.e., no colocation), the configuring entity is CSMSP. However, in some embodiments NSMSP may also be able to configure CSM/SON, or some aspects, e.g., resource-related policies can be configured by the NSMSP (assuming no co-location).

In step 3102, based on the established monitoring policies, CSM/SON collects performance data and monitors the performance. Details of this step, as well as some examples on data collection methods, can be found in step 3008 of FIG. 30B. Performance measurements/data can be processed to obtain the required performance insight. For instance, latency of network segments, nodes or slices (when multiple NSIs are utilized to serve the CSI) can be aggregated to obtain end-to-end latency. Utilization percentage of NSIs or NSI components can be collected to determine the bottleneck areas. PDU session or QoS based measurements can be aggregated to obtain slice-level performances. CSM/SON can also obtain data processing and prediction services from management data analytical service providers (MDAS/DAM/MDAF), other domain analytical service providers (NWDAF, RAN DAM), or third party analytics service providers (3rd party DASP).

In step 3103, depending on the report frequency setting in the monitoring policy (e.g., time-triggered, event-triggered, continuous, etc.), CSM/SON prepares the monitoring reports and sends them to the subscribed entities. Subscribed entities are determined with the Report Type field of the monitoring policy with corresponding entity/NF IDs. For service optimization, the relevant NSM entity is CSMSP, and the related NSC entities are PCF, SMF, NSSF, AMF and NWDAF. In other embodiments, NSMSP can also be a relevant NSM entity.

In step 3104, if there is performance degradation indicated in the CSM report (potentially upon CSM-Op report), CN adjusts network policies. In an alternative embodiment, OAM alone, or OAM and CN together, can adjust network policies. These policies relate to the operation of the network, and network resources are not modified at this point.

In step 3105, if the performance does not improve as indicated in a CSM report (-Op or -Com), CN entities or CSM-Com functionality of the CSM, trigger network resource optimization by OAM. Unless modification requirements are determined by the CSM (e.g., by using DAM services), OAM determines the necessary changes and performs lifecycle operations.

In step 3105a, the csmJobReport( ) that is prepared by the OAM/NSM can be received by the CSMSP. In this case, the job report contents include CSI-level, i.e., communication service level information. This information can include percentage of satisfied users with respect to CSI policies, overall KPIs of CSI etc. The report triggers CSI quality evaluation and modification. If there are any updates regarding the CSI specification, those are sent to CSM/SON and some monitoring policies can be updated. CSI specification includes service updates. In an alternative embodiment, csmJobReport( ) can be accompanied by ModifyCsi( ) request from CSM/SON. The ModifyCsi( ) request includes some or all of CSI ID, tenant ID, CSI SLA criteria to indicate which service aspect or aspects are due for change, CSI resource facing aspect to be changed, and/or CSI service facing aspect to be changed, and any other relevant parameter. ModifyCsi response includes some or all of ack/nack, reasons for nack, updates (if ack), and other relevant parameters.

In step 3105b, another csmJobReport( ) can be received by the NSM, similar to the first use case above, NSI resource allocation optimization with CSM (see step 3011). This triggers NSI quality evaluation and modification. In an alternative embodiment, csmJobReport( ) is accompanied by the ModifyNsi( ) request as prepared by the CSM/SON. The modification of the CSI/NSI resources can be triggered by CSM/SON in an alternative embodiment. Above steps 3105a and 3105b can take place at the same time, or follow one another as needed.

In step 3105e, Policies are updated either by CSM/SON or NSMSP for the CN.

In step 3106, CSM continues to monitor and prepare reports unless the CSM job is terminated.

A third use case relates to cross-slice network resource optimization. In this use case, CSM optimizes the resource allocation across multiple NSIs of the total available physical and virtual resources. This includes all the components of the NSIs, including the ones from different domains, i.e., RAN, CN, TN. This case is valued when multiple NSIs have been deployed.

Figure 32A:
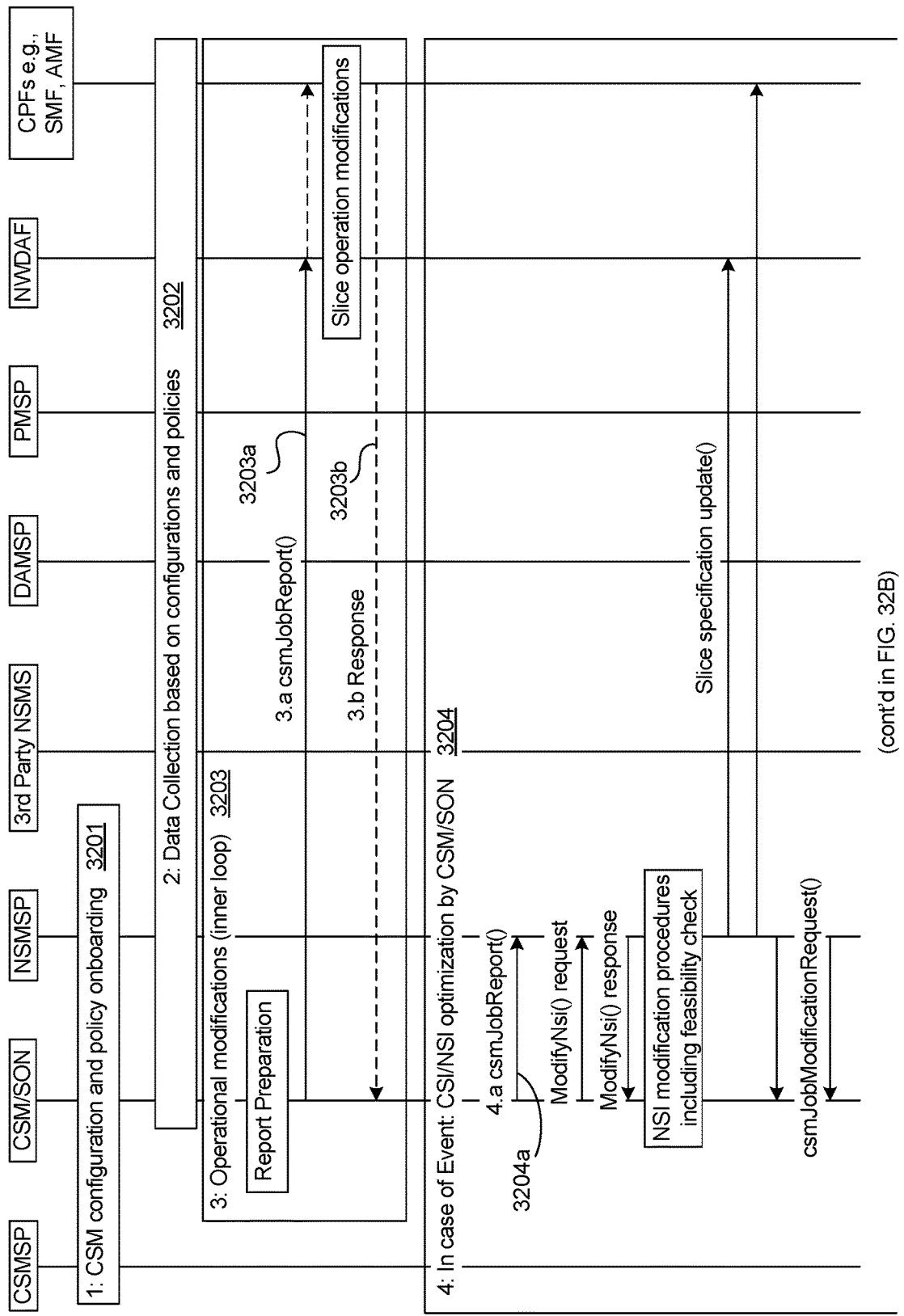
FIGS. 32A and 32B illustrate a call flow for an example use case involving cross-slice network resource optimization, according to an embodiment of the present invention.
Figure 32B:
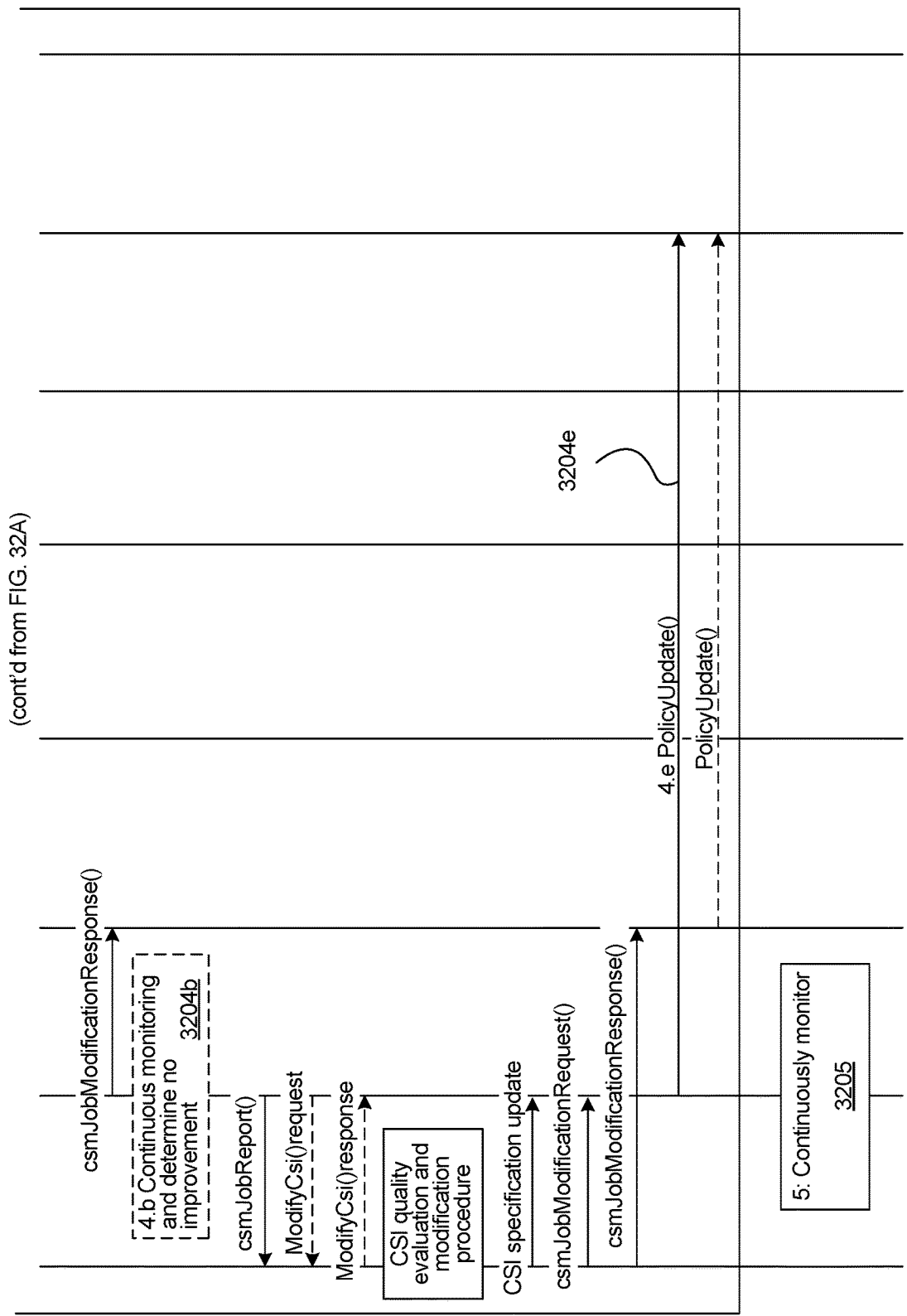

Referring now to FIGS. 32A and 32B, in step 3201, configuration is performed. This may be performed as in steps 3001 to 3007 of FIG. 30A.

In step 3202, data collection is performed. This may be performed as in step 3008 of FIG. 30B.

In step 3203, CSM/SON prepares the report for NSC. This report indicates the performance of the NSIs with the current resource allocations. The performance criteria are indicated in the policy configurations during step 3201. In step 3203a, the report is sent to NSC for further evaluation and triggering slice operation modifications by the NSC. The report can include the policy change requests, e.g., traffic priority changes. In step 3203b, a response can be sent back from the NSC. The report indicates any changes to network monitoring policies, or performance bottlenecks, e.g., to indicate that it is not possible to improve the performance, e.g., latency, number of registered UEs etc.

In step 3204, while continuing monitoring and (optionally) considering the report from the NSC, CSM prepares the report for the NSM and sends it to the subscribed entities as in the first and second use cases described above. The report can be prepared and sent to the NSM for example when the actions of the NSC have failed to resolve a performance issue. The report can be accompanied with the Modify Nsi( ) request from CSM/SON. The ModifyNsi( ) request parameters feasibility is checked by the CSM/SON. Still, the feasibility check can also be applied from the NSMSP during NSI modification procedure. The operations in Step 3402 may follow the same principles as step 3105 of FIGS. 31A and 31B, where a report the CSMSP can also be sent with ModifyCsi( ) request. The report and request to CSMSP can follow the report and request to the NSMSP, or be sent in advance, or at the same time. If CSMSP report and request follows the ones to NSMSP, it can indicate that it was not possible to improve the service performance with NSI resource modifications. As a result, modifying service requirements is needed.

Further according to step 3204, all CSI and NSI specification updates are sent to CSM and NSC. If needed, csmJobModificationRequest( ) is also sent be CSMSP and NSMSP. Note that, the contents of both modification requests are limited by the capabilities of CSMSP and NSMSP. For instance, CSMSP can update CSI monitoring threshold criteria, e.g., percentage of satisfied UEs from of a tenant. On the other hand, NSMSP updates monitoring regarding the NSI, e.g., virtual resource utilization percentage of a new network segment. The changes in CSI specification can trigger additional modifications on NSI specifications. Furthermore at the end of step 3204, CSM/SON updates the NSC policies. Alternatively, NSC policies are updated by NSMSP.

In step 3205, CSM/SON continues monitoring unless the CSM/SON job is terminated.

Figure 33:
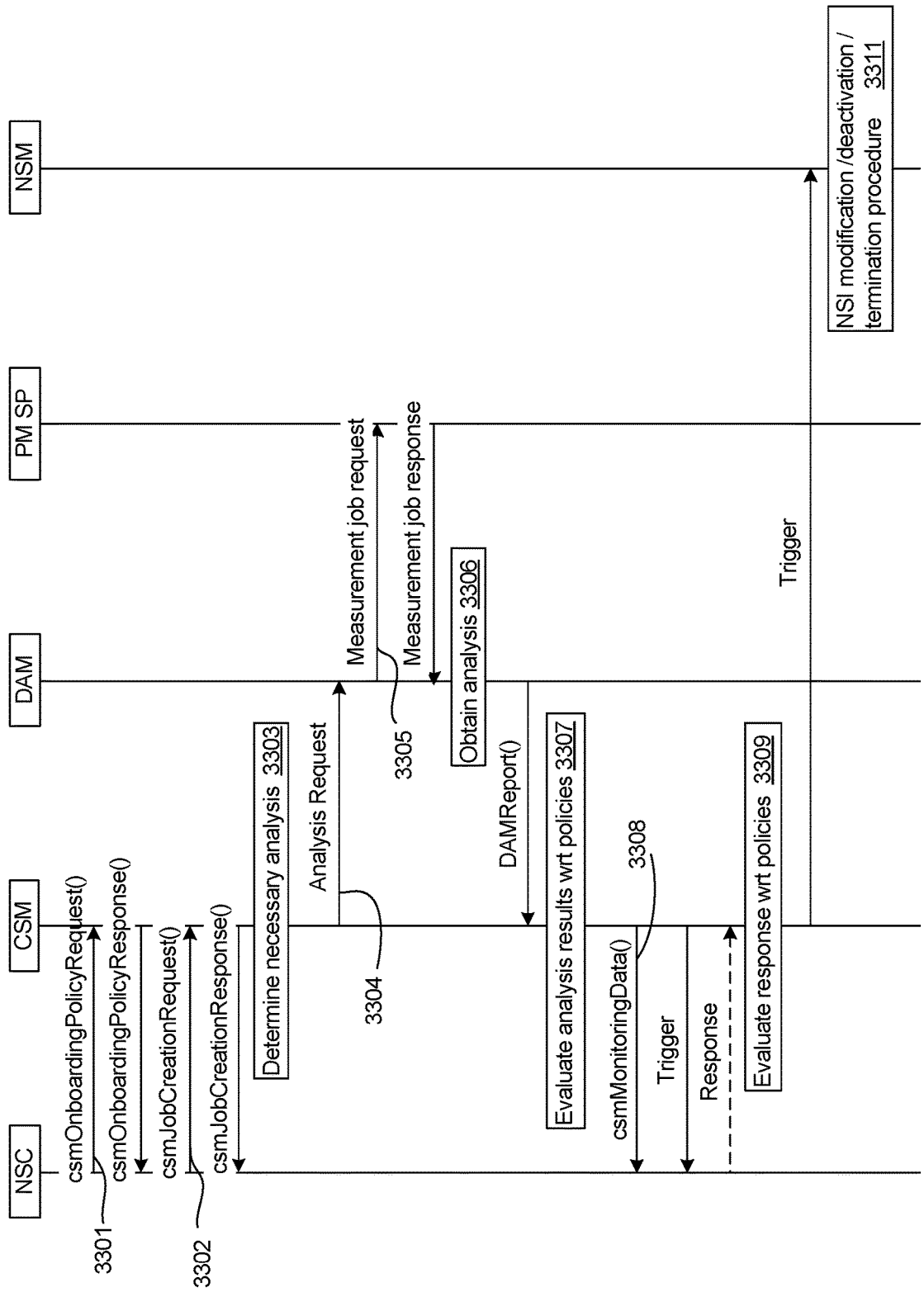
FIG. 33 illustrates a call flow for an example use case involving QoS monitoring using a CSM operations component, according to an embodiment of the present invention.

A fourth use case relates to QoS monitoring, optimization, or both, using CSM-Op. This use case, described below, is similar to AF influenced QoS monitoring, in which NSC configures the CSM-Op for monitoring. FIG. 33 illustrates a detailed call flow for this use case.

Referring now to FIG. 33, in step 3301, NSC onboards the policies to CSM. Note that CSM is pre-configured by NSM with NSI specification etc. as described in the first, second and third use cases above. All monitoring types as described with respect to field 1100 of FIG. 11 are valid for this case. Agent ID can be ID of a slice, ID of a user or a group of users, ID of a traffic flow, ID of a PDU session, etc. The Network ID and Subnet ID fields of Network component indicator field 1115 do not apply in this case, as they are NSM-related parameters. The Slice ID, NF ID, Link ID, and [ID, ID] fields of Network component indicator field 1115 can be filled by the NSC based on the monitoring needs. Reporting type includes NSM and NSC entities. All options in other fields of the policy message are available.

In step 3302, the NSC creates the monitoring jobs.

In step 3303, the CSM determines necessary analysis.

In step 3304, CSM sends the analysis requests to DAM entities. These DAM entities can be third party, management-level, CN-level, RAN-level DAM providers, or other DAM providers, or a combination thereof.

In step 3305, DAM service providers (SP) can also create additional measurement jobs, if the existing measurement jobs are not adequate to produce the requested analysis.

In step 3306, the DAM SP obtains analysis. The CSM can also receive measurements from PM SP directly, or these measurements are provided/relayed from the DAM SP. Note that CSM and DAM SP can be a single entity, e.g., CN DAM SP can be one logical entity with CSM. The CSM receives the DAM reports.

In step 3307, the CSM evaluates analysis results and measurements with respect to policies.

In step 3308, the CSM send the monitoring data (if requested), job report, and (optionally) a trigger to modify the NSI operation.

In step 3309, the CSM evaluates the response from the NSC. The response includes some or all of the following: an indication if the performance cannot be improved; updates in slice operation policies; updates in monitoring job polices (csmJobModificationRequest( ) and csmJobModification-Response( ) are sent and received in this case as indicated in the first to third use cases above); and other relevant responses.

Additionally, the CSM continues to monitor and evaluate the network performance. By considering the network performance after NSC adjustments and optionally the NSC response, the CSM sends a trigger to the NSM. The trigger can be accompanied by a csmJobReport( ). The trigger indicates that the slice performance did not improve after NSC modifications and network slice resource related modifications may be needed.

In step 3311, the trigger by the CSM can initiate NSI modification, termination, deactivation etc. lifecycle operations to adjust the NSI resources.

A fifth use case relates to user context monitoring, device assurance, or both, using CSM-Op. User context monitoring can be location based or traffic based. If it is traffic/session based, SMF is responsible, and if it is location based, AMF is responsible. In this case, CSM responsibilities are similar to the NWDAF responsibilities in CN. This example in particular focuses on the following usages of the user context data, but it is also applicable to other usages: Determining load of a network function (e.g., at base station) in terms of sessions or number of users; Percentage of satisfied users, e.g., in terms percentage of users violating the restrictions. Some of the restrictions are listed in the detailed steps, but there can be other restrictions as well.

Figure 34A:
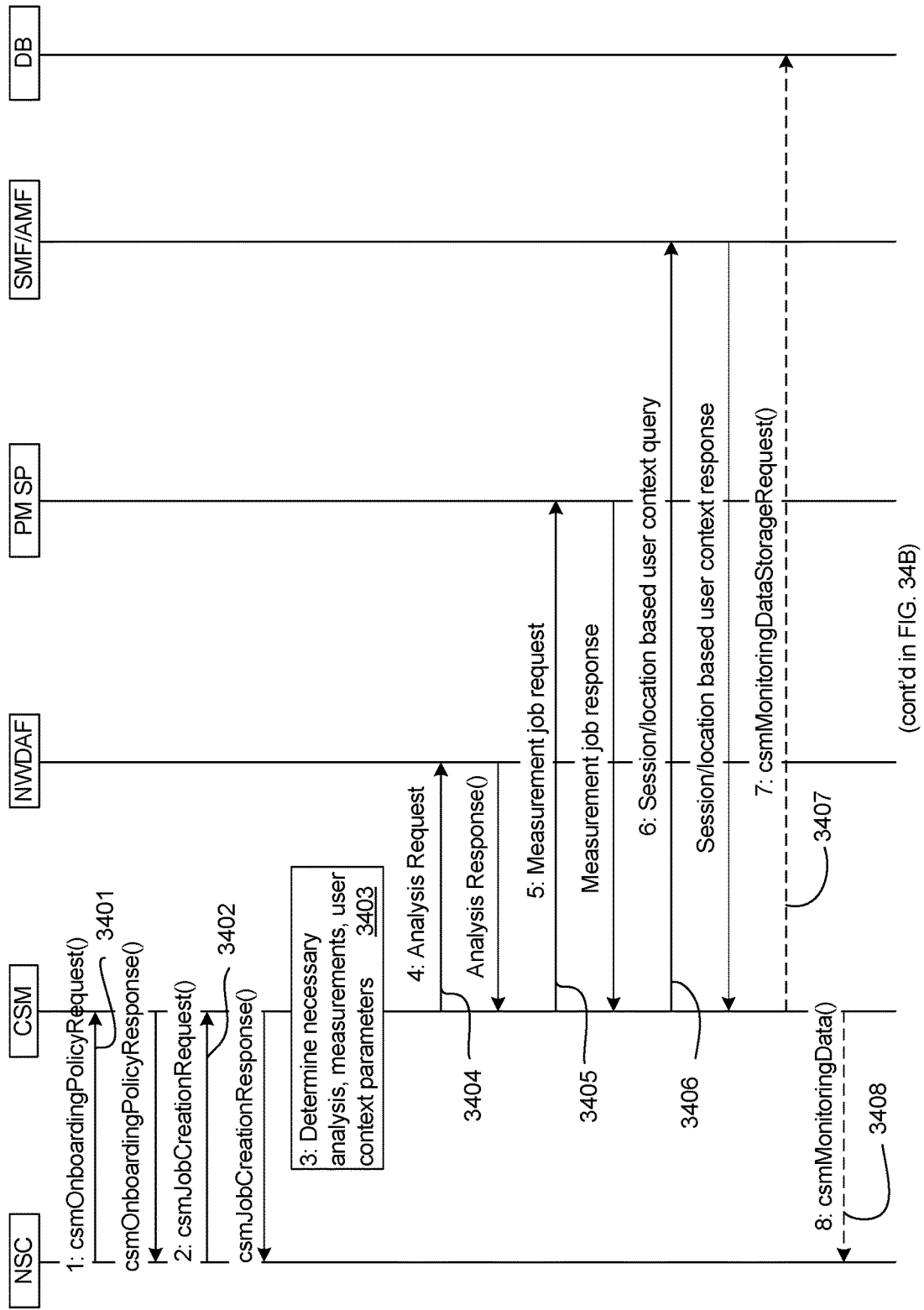
FIGS. 34A and 34B illustrate a call flow for an example use case involving user context monitoring and device behavior assurance using a CSM operations component, according to an embodiment of the present invention.
Figure 34B:
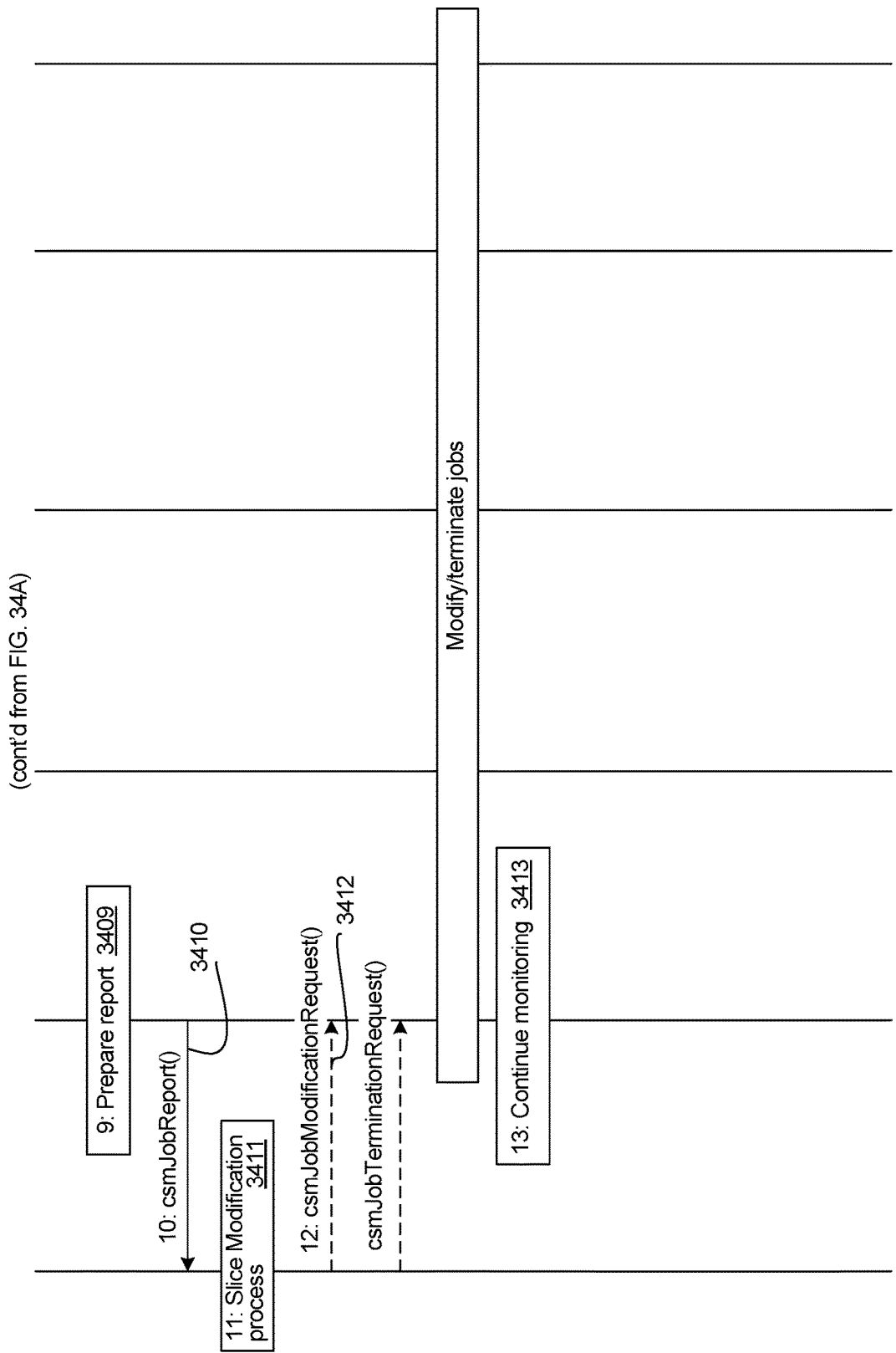

FIGS. 34A and 34B illustrate the detailed call flow for this use case.

In step 3401, CSM is onboarded with policies by NSC. Alternatively, the configuration may be made before by SONAC or NSM. Data collection and analytics request: [NSI/CSI ID, NSI/CSI Spec (includes topology, capacity requirements on all NFs and links of the NSI/CSI (performance threshold), slice device behavior restriction (moving area restriction, applications/servers access restriction, etc.), DA process ID=1 (e.g., device moving out of the restriction), DA mode=periodic (xx m); DA report=event trigger (if DA result=found)]

In step 3402, NSC sends a job creation request for user context monitoring. Note that SliceId and UserId are indicated in the message. The request can also include additional details to indicate if the monitoring will be session based or location based. These are indicated in the PolicyMonitoring field. PolicyMonitoring can include moving area restrictions, application/server access restriction, slice ID and NF access restrictions (either one or more of per user, per area, per QoS flow), CU or DU access restrictions/selections, RAT restrictions/selections, roaming restriction/selection, and which user context parameters will be used. Alternatively, all of the user context parameters can be determined by CSM in Step-3, or additional parameters can be determined in Step-3. PolicyMonitoring can also include the threshold values, e.g., percentage or number of users not satisfying the performance criteria in (a), percentage or number of time a violation is observed, percentage or number of users remaining in the restriction area (if the slice is covering several restriction areas) and so on. Alternatively, the threshold values in (b) can be set up during initial configuration in Step-1 by NSC, NSM or SONAC.

In step 3403, CSM determines the necessary analysis, measurement, and user context parameters for the monitoring job. For instance, if the user context data will be used to determine the load of a BS or network segment in terms of number of users, user-BS association information needs to be obtained by AMF. If the user context data will be used to determine the load of a BS or network segment in terms of number of sessions, user session data is collected from SMF. The user mobility pattern may be needed to predict the violations, e.g., access area restriction violation, or load exceeding for a certain BS.

In step 3404, CSM requests analysis from NWDAF or any other data analytics service provider. The analysis requests include user-behavior analysis, traffic load analysis, and any other analysis that helps with the user-context monitoring. The analysis can be requested per SliceID, per userID, per QoS level, per CSI (ID), per tenant (ID), per service type (across CSI/NSI is possible) (one or multiple of those can be chosen). Analysis for multiple slices and users can be requested. In this case, several analysis request messages may be sent, and corresponding analysis responses are received. If the analysis cannot be done, the analysis response indicates negative ack.

In step 3405, CSM requests measurement jobs from performance management service providers (PM SP), and receives the information in the measurement job response. The request indicates if the PM data is needed continuously (streaming), or one-time. The request indicate the IDs of the network elements, the network segment indicators, CSI ID(s), tenant ID(s), QoS flow level(s), and slice ID(s), whichever is applicable. If the requested measurement cannot be provided, the response includes negative ack. If the requested measurement is provided via a database, the response includes the DB ID/address.

In step 3406, CSM requests session based user context information from SMF, and location based user context information from AMF, whichever is applicable for the requested analysis. CSM receives the information from either SMF or AMF.

In step 3407, CSM can store the monitoring data in a DB with csmMonitoringDataStorageRequest message.

In step 3408, if requested/configured to do so by NSC, CSM streams the monitoring data to the NSC.

In step 3409, CSM prepares the job report. The job report indicates threshold violations.

In step 3410, CSM sends the job report to the NSC.

In step 3411, NSC evaluates the job report and triggers slice modification process. The process can also trigger actions in NSM and SONAC.

In step 3412, According to the modifications, CSM monitoring job can stay the same or, be modified or terminated. Accordingly, CSM performs modifications or termination on the jobs requested from other entities.

In step 3413, until the monitoring job is terminated, CSM continues monitoring.

Figure 35:
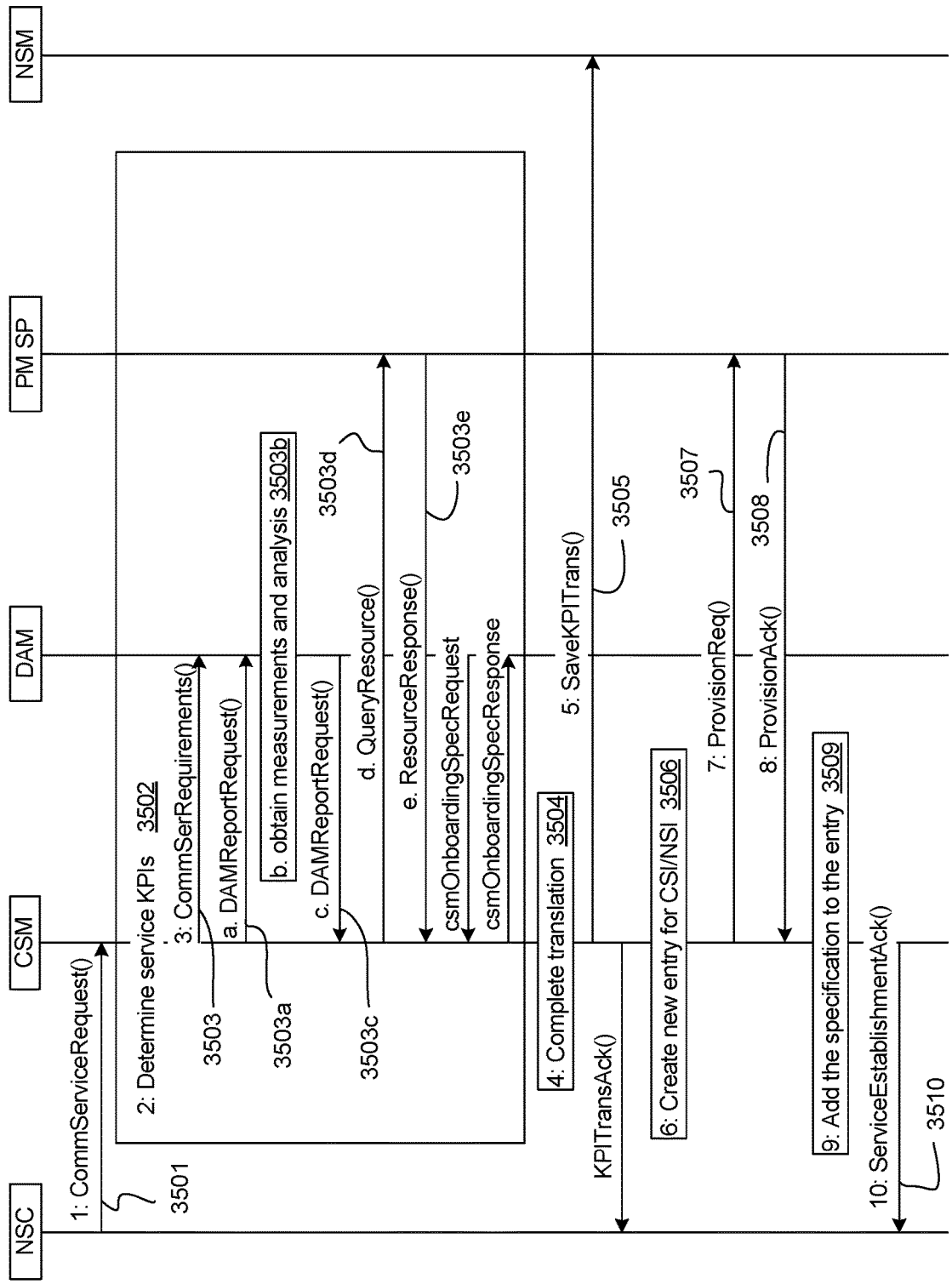
FIG. 35 illustrates a call flow for an example use case involving Network Slice Instance (NSI) or Communication Service Instance (CSI) establishment using a CSM slice composition component, according to an embodiment of the present invention.

A sixth use case relates to NSI or CSI establishment using CSM-Com. That is, CSM can be used to establish an NSI or CSI. It is noted that the CSI uses the NSI to provide the communication service. FIG. 35 illustrates the detailed call flow for this use case.

In step 3501, CSM-COM receives a NSI/CSI request including: Service description (may be in terms of QoS), service type, device distributions, allowed moving area, permitted application types, permitted accessible server, NF chains, if an isolated NSI is requested or if it can be shared, service area, service capacity (e.g., in terms of number of users, number of sessions etc. for CSI, and (in addition) in terms of NF chain capacities for NSI), service reliability, exposure level (i.e., no exposure, only data, data and management. If management exposure is provided, an indication is made as to whether it is one or a combination of monitoring management, configuration management, lifecycle management, data analytics management etc.).

In step 3502, CSM-COM determines service KPIs. In this step, the service requirements are converted to network resource requirements.

In step 3503, CSM-COM may request analysis and historical data from DAM providers.

In step 3503*a*, CSM-COM may share the service requirements, e.g., requested service type and capacity, with DAM to obtain analysis and data to map the service requirements into network requirements.

In step 3503*b*, if the existing measurement services are not adequate, DAM provider may utilize additional measurement services, or interact with other analytical service providers to determine capability of the network, e.g., RAN analytical services and NWDAF.

In step 3503*c*, CSM-COM obtains network capability related information from DAM.

In step 3503*d*, CSM-COM may request additional information from network slice and network slice subnet management service providers regarding the resource facing aspects, if that information cannot be provided by DAM providers.

Alternatively, in step 3503*e*, CSM-COM utilizes its resource facing aspects to query NSMS and NSSMS providers with the service requirements to determine the amount of resources required.

In step 3504, CSM-COM completes the translation.

In step 3505, CSM-COM can send an acknowledgement (KPITransAck( )) or update a database with the conversion results to facilitate future translations. SaveKPITrans( ) message includes NSI/CSI requirements matching the service request, DB ID, and optionally it can include one or more of: customer ID, service type, service specifications, KPIs, QoS requirements. NSI/CSI requirements include NF types, NF chains, NF and link topology requirements, NF and link capacity requirements, E2E and segment-based latency requirements, reliability requirements, service area requirements, exposure requirements, DB needs, isolation requirements, data analytics capability requirements, and other requirements that can be listed for NSI/CSI services.

In step 3506, CSM-COM creates a new entry for the NSI/CSI, where NSI/CSI ID, KPIs, latency, device behavior expectation, NF and link topology (with or without capacity), reliability, service area, permitted application types, exposure levels, NF chains, and other NSI/CSI specifications are determined. Alternative to Step-5, the DB can be updated at this step.

In step 3507, the prepared specification is sent to SONAC-COM (or equivalent function for network slice creation/configuration) for NSI/CSI provisioning (ProvisionReq( )).

In step 3508, NSI/CSI provisioning response with NSI/CSI specification is received (ProvisionAck( )). The NSI/CSI specification includes NF IDs, NF types, topology (with or without NF and link capabilities), traffic priority settings, isolation and exposure level settings, exposure interface information, isolation acknowledgement, and other NSI/CSI specific information that is needed to provision and operate the NSI/CSI.

In step 3509, CSM-COM adds the specification information to the entry of the NSI/CSI.

In step 3510, CSM-COM sends an acknowledgement to the Customer. If the provisioning is successful, the ServiceEstablishmentAck( ) includes the necessary information on NSI/CSI, such as, S-NSSAI IDs, precise service areas, precise capacity (e.g., in terms of number of sessions), and any exposure information. If the provisioning is not successful, that is indicated in the message. The indication may or may not include reason for failure.

In accordance with an embodiment of the present invention, there is provided a communication service manager (CSM) apparatus including a computer processor, a memory and a network interface. The apparatus is configured to receive, via the network interface, a configuration instruction message from a higher-level communication service manager, a network slice manager, a network slice controller, a SONAC device, or a third-party device and create or modify a set of tasks based on the configuration instruction message. According to a first one or more of the set of tasks, the apparatus is configured to interact, via the network interface, with one or more data provider network devices to obtain specified information therefrom based on the configuration instruction message. According to a second one or more of the set of tasks, the apparatus is configured to process, by the computer processor, the obtained specified information according to processing operations configured based on the configuration instruction message. In addition, according to a third one or more of the set of tasks, the apparatus is configured to transmit, via the network interface, results of the processing operations toward a database, the higher-level communication service manager, the network slice manager, the network slice controller, the SONAC device, or the third-party device, based on the configuration instruction message.

In some embodiments, the above apparatus is further configured to create or modify the set of tasks based on a monitoring type or a measurement type field of the configuration instruction message, wherein the set of tasks are created or modified to carry out operations for monitoring a particular attribute of the communication network as indicated by a corresponding value carried in the monitoring type field.

In some embodiments, the above apparatus is further configured to create or modify the set of tasks based on an Agent ID field of the configuration instruction message, wherein the set of tasks are created or modified to carry out monitoring of a particular object of the communication network as indicated by a corresponding value carried in the Agent ID field.

In some embodiments, for the above apparatus, the set of tasks are created or modified to carry out monitoring at one or more levels of the communication network based on the corresponding value carried in the Agent ID field, wherein the one or more levels include: the communication network overall; a network slice of the communication network; a service provided by the communication network; a service instance provided by the communication network; a mobile device served by the communication network; and an application supported by the communication network.

In some embodiments, the above apparatus is further configured to create or modify the set of tasks based on a Network Component Indicator field of the configuration instruction message, wherein the data provider network devices are selected based on a corresponding value carried in the Network Component Indicator field.

In some embodiments, the above apparatus is further configured to create or modify the set of tasks based on a Reporting Type field of the configuration instruction message, wherein one or both of: a recipient of the results of the processing operations; and a manner in which the results of the processing operations are reported are selected based on a corresponding value carried in the Reporting Type field. It is noted that the entity or entities receiving the report can include a control plane entity (e.g. NSC), a management plane entity (e.g. NSM), or both.

In some embodiments, for the above apparatus, the manner in which the results of the processing operations are reported are selected from a plurality of potential manners including: periodic reporting of the results at a defined frequency; and reporting of the results in response to a trigger condition, the trigger condition created based on the configuration instruction message. The trigger condition may occur when a condition violation occurs, or the trigger condition may occur when the condition violation occurs a predetermined number of times, or the trigger condition may occur when the condition violation persists for a predetermined length of time.

In some embodiments, for the above apparatus, the processing operations operate only to organize or format the obtained specified information, or wherein the processing operations operate to process the obtained specified information into resultant information.

In some embodiments, for the above apparatus, the first one or more of the set of tasks comprises a first plurality of tasks for obtaining different information from different respective ones of the data provider network devices, and the second one or more of the set of tasks are configured to process together the different information from the different respective ones of the data provider network devices to generate aggregate or combined information forming at least part of said specified information.

In some embodiments, for the above apparatus, the apparatus comprises a plurality of component CSM sub-apparatuses arranged in a hierarchical manner.

In some embodiments, for the above apparatus, the plurality of component CSM sub-apparatuses includes a global CSM sub-apparatus, one or more CSM sub-apparatuses associated with one or more different respective subnets of the communication network, and optionally one or more CSM sub-apparatuses associated with one or more different nodes, links or functions located within the one or more different respective subnets.

In accordance with another embodiment of the present invention, there is provided a method for establishing communication network monitoring operations. The method includes transmitting a configuration instruction message to a communication service manager (CSM) apparatus, the CSM apparatus being configured to perform the network monitoring operations based on the configuration instruction message. Optionally, the method also includes generating the configuration instruction message before transmitting it to the CSM apparatus. The configuration of the instruction message includes one or more fields which may be selected from: a Monitoring Type field indicative of a particular attribute of the communication network to be monitored; an Agent ID field indicative of a particular object of the communication network to be monitored and optionally a particular level of the communication network at which monitoring is to be performed; a Monitoring Trigger Condition field indicative of conditions under which the network monitoring operations are to begin; a Network Component Indicator field indicative of data provider network devices to be queried directly or indirectly by the CSM apparatus as part of the network monitoring operations; and a Reporting Type field indicative of one or more of: a recipient to be informed by the CSM apparatus of results of the network monitoring operations; conditions under which the results of the network monitoring operations are to be reported by the CSM apparatus; and a manner in which the results of the network monitoring operations are to be reported by the CSM apparatus. In accordance with another embodiment of the present invention, an apparatus configured to perform each step of the method for establishing communication network monitoring operations above is also provided.

In some embodiments of the above method, the configuration instruction message further comprises one or more of the following additional fields, optionally as sub-fields of a Value field: an Analyze Method field indicative of a method of data analysis to be performed by the CSM apparatus or a subordinate apparatus as part of the network monitoring operations; a Collect Method field indicative of a method of requesting data by the CSM apparatus or a subordinate apparatus as part of the network monitoring operations; a Report Frequency field indicative of a time frequency at which results of the network monitoring operations are to be periodically reported when time-triggered reporting is implemented; a Threshold field indicative of a threshold value at which reporting of the results of the network monitoring operations is triggered when event-triggered reporting is implemented; and a Report trigger Condition field indicative of a condition to be evaluated by the CSM apparatus for triggering reporting of the results of the network monitoring operations, when event-triggered reporting is implemented.

In some embodiments of the above method, content of one of the fields is interpreted based at least partially on content of another one or more of the fields. In some embodiments of the above method, the configuration instructions include instructions to cause the CSM apparatus to monitor subscriber mobility patterns, subscriber traffic patterns, or a combination thereof. In some embodiments of the above method, the configuration instructions include instructions to cause the CSM apparatus to report a result of the network monitoring operations as one or more statistical distributions, one or more trends in network-descriptive variables, or a combination thereof.

In accordance with another embodiment of the present invention, there is provided a system including a plurality of apparatuses, wherein each of the plurality of apparatuses being a CSM sub-apparatus, the plurality of CSM sub-apparatuses arranged in a hierarchical manner such that higher-level CSM sub-apparatuses obtain specified information from lower-level CSM sub-apparatuses, lower-level CSM sub-apparatuses perform the respective set of tasks to provide the specified information to the higher-level CSM sub-apparatuses, and optionally wherein higher-level CSM sub-apparatuses transmit configuration instruction messages to lower-level CSM sub-apparatuses.

A network slice manager (NSM) apparatus managing a network slice in a communication network. The NSM including a computer processor, a memory and a network interface and configured to receive, from a communication service manager (CSM) monitoring the network slice, an event report indicative of a deficiency in performance of the network slice, the event report being subsequent to a previous event report sent by the CSM to a network slice controller (NSC) and the event report further being subsequent to a determined failure, by the CSM, of the NSC to mitigate an undesired network circumstance related to the network slice. The NSM further configured to adjust the network slice to mitigate the undesired network circumstance in response to the event report.

A communication service manager (CSM) apparatus for facilitating resource utilization performance for a network slice instance of a communication network. The apparatus including a computer processor, a memory and a network interface and configured to obtain resource and service requirements for a communication service instance (CSI) for the network slice and determine one or more service thresholds with respect to the resource and service requirements. The apparatus further configured to collect performance data indicative of performance of the network slice with respect to the CSI and determine, based the performance data, whether a first trigger condition is satisfied, the first trigger condition indicative of failure of the performance data to satisfy a corresponding one of the service thresholds. When the first trigger condition is satisfied, transmit a first event report to a network slice controller service provider, the apparatus is further configured to determine, based on the performance data, whether a second trigger condition is satisfied, the second trigger condition indicative of failure of the performance data to satisfy another corresponding one of the service thresholds following the first event report. When the second trigger condition is satisfied, the apparatus is further configured to transmit a second event report to a network slice manager service provider.

Figure 36:
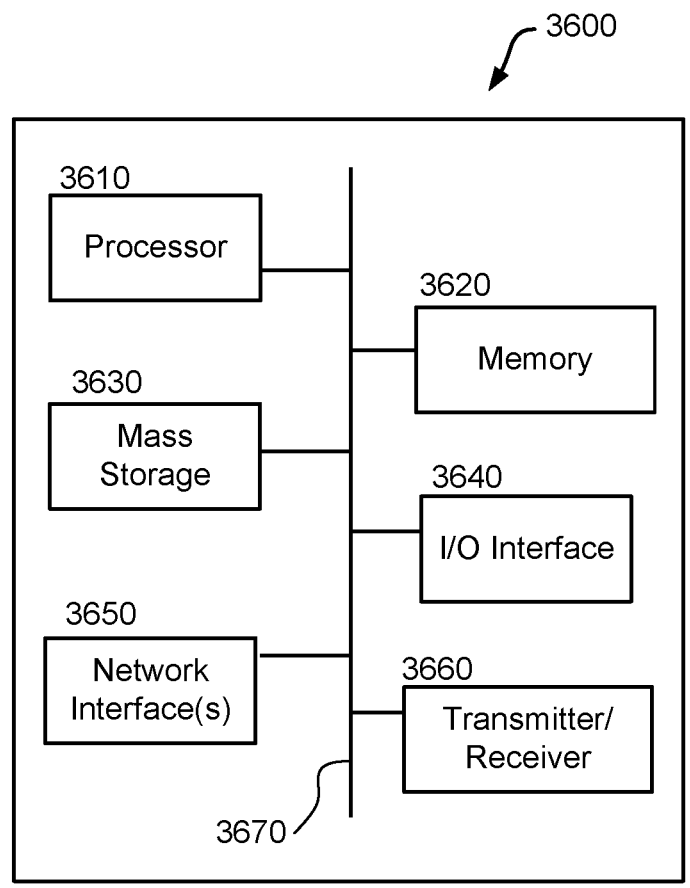
FIG. 36 illustrates an electronic device for implementing an apparatus, or a sub-apparatus of a networked system of apparatuses, or for carrying out a method, according to embodiments of the present invention.

FIG. 36 illustrates an exemplary block diagram of a processing system 3600 that may be used for deploying or instantiating components of the wireless communication network, such as the CSM apparatus, CSM sub-apparatus, etc. As shown in FIG. 36, processing system 3600 includes a processor 3610, memory 3620, non-transitory mass storage 3630, I/O interface 3640, network interface 3650, and transceiver 3660, all of which are communicatively coupled via bi-directional bus 3670. The processing system 3600 further includes input terminals and output terminals, for receiving inputs and outputs, respectively, from other network components (not shown). The processing system may operate directly to support entities such as the CSM. Alternatively, the processing system may operate indirectly to support such entities. For example, one or more resource virtualization layers may be provided offering computer processing resources, memory resources, and network communication resources, which are ultimately provided at least in part by the processing system. Multiple such processing systems may cooperate to support embodiments of the present invention.

The memory 3620 may include any type of non-transitory memory such as static random access memory (SRAM), dynamic random access memory (DRAM), synchronous DRAM (SDRAM), read-only memory (ROM), any combination of such, or the like. The mass storage element 3630 may include any type of non-transitory storage device, such as a solid state drive, hard disk drive, a magnetic disk drive, an optical disk drive, USB drive, or any computer program product configured to store data and machine executable program code. According to certain embodiments, the memory 3620 or mass storage 3630 may have recorded thereon statements and instructions executable by the processor 3610 for performing any of the aforementioned method steps described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A communication service manager (CSM) apparatus for use in monitoring of a communication network, the apparatus comprising: a computer processor, a memory and a network interface and configured to:
   collect performance data indicative of performance of a network slice provided by the communication network;
   determine, based on the performance data, whether a first trigger condition is satisfied, the first trigger condition indicative of a deficiency in performance of the network slice;
   when the first trigger condition is satisfied, transmit a first event report to a network slice controller;
   determine, based on the performance data, whether a second trigger condition is satisfied, the second trigger condition indicative of failure of the network slice controller to mitigate an undesired network circumstance related to the deficiency in performance of the network slice; and
   when the second trigger condition is satisfied, transmit a second event report to a network slice manager.

2. The apparatus of claim 1, further configured to, before said collecting performance data, receive a policy related to the network slice and configuring collection of said performance data based on the policy.

3. The apparatus of claim 2, wherein the policy includes one or more of: a specification for the network slice; key performance indicator (KPI) requirements for the network slice; monitoring requirements for the network slice; the first trigger condition; and the second trigger condition.

4. The apparatus of claim 2, wherein the policy includes one or more monitoring requirements, said one or more monitoring requirements indicative of one or more of: monitoring type; an agent ID field including NSI, CSI and tenant IDs; the first trigger condition; the second trigger condition; a network component indicator field including the list of network entity IDs, ingress and egress point identifiers; a reporting type field including management plane control plane entities; and a customizable value field, the customizable value field having one or more subfields including: an analyze method field; a collect method field including indications of management plane and control plane databases; a report frequency field; a threshold field; a triggered reporting condition field; and a reserved field.

5. The apparatus of claim 1, wherein satisfying the second trigger condition comprises satisfying the first trigger condition a predetermined number of times, or wherein satisfying the second trigger condition comprises satisfying the first trigger for at least a predetermined threshold amount of time following the first event report.

6. The apparatus of claim 1, wherein the network slice controller is configured to take an action to mitigate the undesired network circumstance in response to the first event report.

7. The apparatus of claim 6, wherein the action to mitigate the undesired network circumstance comprises one or more of: adjusting an operating policy of the network slice to enforce a new Quality of Service (QoS) requirement; adjusting an operating policy of the network slice to adjust a routing strategy; adjusting traffic steering in the network slice; adjusting scheduling in the network slice; rebalancing of allocated resources; adjusting admission control operations of the network slice; and adjusting resource allocation in the network slice.

8. The apparatus of claim 1, wherein the network slice manager is configured to adjust the network slice to mitigate the undesired network circumstance in response to the second event report.

9. The apparatus of claim 8, wherein adjusting the network slice comprises one or more of: adjusting resources allocated to the network slice in order to mitigate the undesired network circumstance; adjusting a policy of the network to mitigate the undesired network circumstance; and modifying a configuration of the network slice in order to mitigate the undesired network circumstance.

10. The apparatus of claim 1, wherein the performance data is collected directly or indirectly from one or more data analytics modules located in one or more of: management domains, control domains, or other network domain.

11. The apparatus of claim 1, wherein the first trigger condition, the second trigger condition, or both, are indicative of a deficiency in one or more of: performance of the network slice; Quality of Service delivered by the network slice; status of the network slice; and a predetermined event in service delivery by the network slice.

12. The apparatus of claim 11, wherein the predetermined event is one of: user end-to-end latency exceeding a latency threshold; network function load exceeding a load threshold;

receipt of a congestion report; slice load exceeding the a slice load threshold; an alarm; a prediction indicating possible network slice performance deficiency; statistical characteristics of network observations deviating from expected characteristics by a characteristic threshold amount; receipt of an unknown packet; and occurrence of an unknown trend in one or both of network performance and user behavior status.

13. The apparatus of claim 1, wherein the first trigger condition, the second trigger condition, or both, comprise one or more of: a timer, a time of day, a date, an analysis from a DAM entity for possible network performance degradation, a network condition, a threshold violation, a message from a network entity, a traffic flow start or end, and an alarm.

14. The apparatus of claim 1, wherein collecting the performance data comprises:
when some or all of the performance data required for determining whether the first trigger condition, the second trigger condition, or both, is satisfied is not currently available, requesting one or more data analytics management functions from one or more network domains to collect said some or all of the performance data, and subsequently receiving reports from the one or more data analytics management functions, the reports indicative of said some or all of the performance data.

15. A system comprising:
the apparatus of claim 1;
the network slice controller, the network slice controller further configured to adjust operation of the network slice in response to the first event report;
the network slice manager, the network slice manager further configured to modify the network slice in response to the second event report.

16. The system of claim 15, wherein the network slice controller adjusts operation of the network slice to mitigate the undesired network circumstance, and wherein the action to mitigate the undesired network circumstance comprises one or more of: adjusting an operating policy of the network slice to enforce a new Quality of Service (QoS) requirement; adjusting an operating policy of the network slice to adjust a routing strategy; adjusting traffic steering in the network slice; adjusting scheduling in the network slice; rebalancing of allocated resources; adjusting admission control operations of the network slice; and adjusting resource allocation in the network slice.

17. The system of claim 15, wherein modifying the network slice comprises one or more of: adjusting resources allocated to the network slice in order to mitigate the undesired network circumstance; adjusting a policy of the network to mitigate the undesired network circumstance; and modifying a configuration of the network slice in order to mitigate the undesired network circumstance.

18. A method performed by a communication service manager (CSM) comprising:
collecting performance data indicative of performance of a network slice in the communication network;
determining, based on the performance data, whether a first trigger condition is satisfied, the trigger condition indicative of a deficiency in performance of the network slice;
when the first trigger condition is satisfied, transmitting a first event report to a network slice controller;
determining, based on the performance data, whether a second trigger condition is satisfied, the second trigger condition indicative of failure of the network slice controller to mitigate an undesired network circumstance related to the deficiency in performance of the network slice; and
when the second trigger condition is satisfied, transmitting a second event report to a network slice manager.

19. The method of claim 18, further comprising, before said collecting performance data, receiving a policy related to the network slice and configuring collection of said performance data based on the policy.

20. The method of claim 19, wherein the policy includes one or more of: a specification for the network slice; key performance indicator (KPI) requirements for the network slice; monitoring requirements for the network slice; the first trigger condition; and the second trigger condition.

* * * * *